United States Patent
Murata et al.

(10) Patent No.: US 7,313,289 B2
(45) Date of Patent: *Dec. 25, 2007

(54) IMAGE PROCESSING METHOD AND APPARATUS AND COMPUTER-READABLE STORAGE MEDIUM USING IMPROVED DISTORTION CORRECTION

(75) Inventors: Norihiko Murata, Kanagawa (JP); Takashi Kitaguchi, Kanagawa (JP); Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 528 days.

This patent is subject to a terminal disclaimer.

(21) Appl. No.: 09/940,432

(22) Filed: Aug. 29, 2001

(65) Prior Publication Data

US 2002/0041717 A1     Apr. 11, 2002

(30) Foreign Application Priority Data

Aug. 30, 2000   (JP) ............................. 2000-261565

(51) Int. Cl.
    *G06K 9/40*  (2006.01)
(52) U.S. Cl. ..................................... 382/275
(58) Field of Classification Search ............... 382/275, 382/285, 294, 154; 356/12
    See application file for complete search history.

(56) References Cited

U.S. PATENT DOCUMENTS

| | | | |
|---|---|---|---|
| 5,444,478 A * | 8/1995 | Lelong et al. ................. 348/39 |
| 5,646,679 A | 7/1997 | Yano et al. |
| 5,668,595 A * | 9/1997 | Katayama et al. ....... 348/218.1 |
| 5,727,093 A * | 3/1998 | Uchiyama et al. .......... 382/294 |
| 5,798,791 A | 8/1998 | Katayama et al. |
| 5,982,951 A | 11/1999 | Katayama et al. |
| 6,005,987 A * | 12/1999 | Nakamura et al. .......... 382/294 |
| 6,038,074 A * | 3/2000 | Kitaguchi et al. .......... 359/618 |
| 6,075,905 A * | 6/2000 | Herman et al. ............. 382/284 |
| 6,104,840 A * | 8/2000 | Ejiri et al. .................. 382/284 |
| 6,278,460 B1 * | 8/2001 | Myers et al. ............... 345/424 |
| 6,304,313 B1 * | 10/2001 | Honma ......................... 355/18 |
| 6,389,179 B1 | 5/2002 | Katayama et al. |
| 6,445,814 B2 * | 9/2002 | Iijima et al. ................ 382/154 |
| 6,449,004 B1 * | 9/2002 | Okisu et al. .................. 348/44 |
| 6,507,366 B1 * | 1/2003 | Lee ............................ 348/352 |

(Continued)

OTHER PUBLICATIONS

Pending U.S. Appl. No. 09/645,511, filed Aug. 25, 2000.

*Primary Examiner*—Matthew C. Bella
*Assistant Examiner*—Charles Kim
(74) *Attorney, Agent, or Firm*—Oblon, Spivak, McClelland, Maier & Neustadt, P.C.

(57) ABSTRACT

In image processing method and apparatus of the present invention, image distortions caused by oblique imaging are corrected. A feature point of one of a plurality of partially overlapping images corresponding to a common location of an original image, shared by the plurality of partially overlapping images, is determined. A matched point of one of the other partially overlapping images corresponding to the feature point is determined so that a direction of the object plane is calculated based on the feature point and the matched point. One of the plurality of partially overlapping images is selected as a standard image whose image distortions are to be corrected. A distortion-corrected image is generated on a projection plane by projecting the standard image onto the projection plane based on the direction of the object plane such that image distortions in the standard image are eliminated.

42 Claims, 42 Drawing Sheets

U.S. PATENT DOCUMENTS

| | | | |
|---|---|---|---|
| 6,507,665 B1 * | 1/2003 | Cahill et al. | 382/154 |
| 6,532,036 B1 * | 3/2003 | Peleg et al. | 348/36 |
| 6,535,250 B1 * | 3/2003 | Okisu et al. | 348/345 |
| 6,590,704 B1 * | 7/2003 | Yano et al. | 359/466 |
| 6,597,468 B1 * | 7/2003 | Inuiya | 358/1.15 |
| 6,806,903 B1 * | 10/2004 | Okisu et al. | 348/254 |
| 2001/0010546 A1 | 8/2001 | Chen | |
| 2003/0133019 A1 | 7/2003 | Higurashi et al. | |

* cited by examiner

FIG. 1 PRIOR ART
(a)
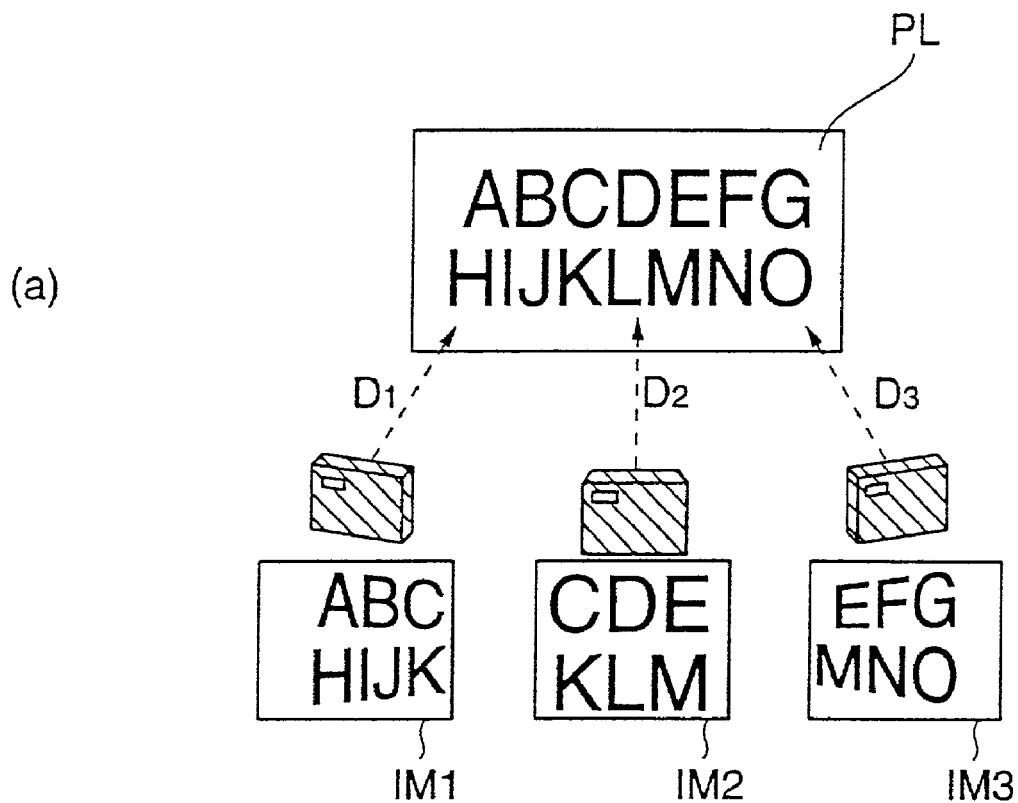
(b)
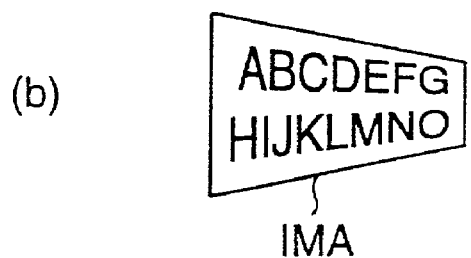
(c)
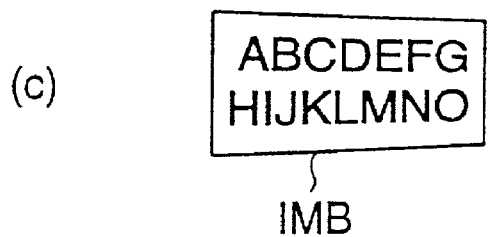

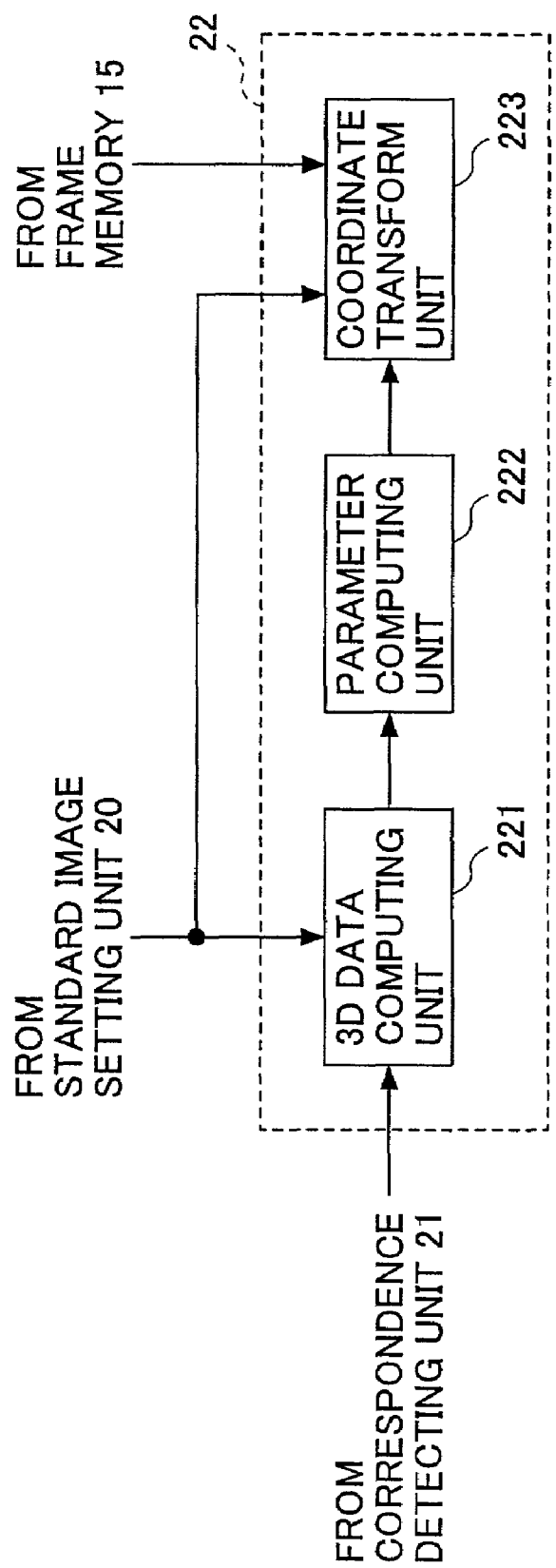

IMAGE SURFACE

IMAGE PROCESSING METHOD AND APPARATUS AND COMPUTER-READABLE STORAGE MEDIUM USING IMPROVED DISTORTION CORRECTION

The present invention is based on Japanese priority application No. 11-375651, filed on Dec. 28, 1999, and Japanese priority application No. 2000-261565, filed on Aug. 30, 2000, the entire contents of which are hereby incorporated by reference.

BACKGROUND OF THE INVENTION

1. Field of the Invention

The present invention relates to an image processing method and apparatus and a computer-readable storage medium. More particularly, the present invention relates to an image processing method and an image processing apparatus that correct image distortions caused by oblique imaging in which an original image on the object plane is taken from an oblique direction. Further, the present invention relates to a computer-readable storage medium that causes a computer to perform the image distortion correction processing to correct image distortions caused by the oblique imaging.

2. Description of the Related Art

With a rapid progress in the development of recent computer networks, there is an increasing demand for quickly acquiring important information in all aspects of computer systems. Attention is being given to portable image input devices that can easily and accurately capture an image of a document or a photograph and transfer it into the storage of a computer system. As the practical application, an image input device, such as a digital still camera, is used to capture a document or photographic image by taking the original image on the object plane (or the paper).

However, when the original image on the object plane is taken by the image input device from an oblique direction with the imaging plane of the image input device being not parallel to the object plane, image distortions may take place due to the oblique imaging. The readability of the captured information will be deteriorated, and it is desired to provide means for correcting such image distortions. Hereinafter, the image distortions of this kind will be called the oblique-type image distortions.

Several image processing techniques for correcting the oblique-type image distortions to increase the readability of the captured information are known. First, one major approach is that, when capturing an original image of an object having an A4 or larger size (such as a poster), the image distortions due to oblique imaging are corrected in order to increase the readability of the captured information. For this purpose, it is required that the object image to be corrected contains a desired region of the object. Namely, it is necessary to perform the capturing of the original image such that at least one of a plurality of object images which are taken by the user from the object contains the desired region of the object. It is desirable to provide the user with means for selecting one of the plurality of object images that is a standard image on which the correction of the image distortions due to the oblique imaging is based. In addition, it is desirable to provide means for notifying the user that the standard image is currently taken as one of the object images when capturing the object images.

Secondly, it is demanded that images of large-size objects, such as a newspaper, having a size larger than A4 size, be captured with a high resolution by using a portable image input device or image processing apparatus. For this purpose, an image processing technique is proposed in which a composite image is created with a certain high resolution by combining together a plurality of partially overlapping images which are taken by using an image processing apparatus. In cases in which the object is assumed to be planar, the image processing technique applies geometrical transformation formulas, such as affine transformation or perspective affinity, for the combination of a plurality of partially overlapping images so as to create a composite image. The technique is summarized in "Computer Vision—Technological Comments and Future Trends" by T. Matsuyama et al., published in June 1998 by New Technology Communications Co., Ltd. in Japan.

The basic concept of the above technique is that the respective split images are transformed into partial object images on a standard image surface, and they are combined together based on the standard image to form a composite image. However, there is a problem that if the partial object images on the standard image surface contain the oblique-type image distortions, the resulting composite image also contains the image distortions. In other words, the magnitude of the image distortions in the composite image is varied depending on the standard image which is selected from among the split images and used to create the composite image from the split images. The problem of the conventional image processing method will now be described with reference to FIG. 1.

As indicated in FIG. 1(a), it is supposed that the object plane PL is imaged from three different directions D1, D2 and D3, and the respective split images IM1, IM2 and IM3 are obtained. When the split image IM1 is selected as the standard image, a composite image IMA is created from the split images based on the standard image IM1 as indicated in FIG. 1(b). In this case, the original image on the object plane PL is taken from the left-handed oblique direction D1. When the split image IM2 is selected as the standard image, a composite image IMB is created from the split images based on the standard image IM2 as indicated in FIG. 1(c). In this case, the original image on the object plane PL is taken from the substantially front direction D2. As shown in FIGS. 1(b) and (c), the magnitude of the image distortions in the composite image IMA is quite different from the magnitude of the image distortions in the composite image IMB.

As is apparent from the foregoing, in order to effectively correct the image distortions, it is desirable to provide the user of the image processing apparatus with a means for selecting an appropriate standard image having the substantially front direction from among the split images. Further, it is desirable to provide the user of the image processing apparatus with a means for notifying, when taking one of the split images from the original image, the user that a selected one of the split images is currently taken as the standard image.

SUMMARY OF THE INVENTION

An object of the present invention is to provide an image processing method that effectively corrects the image distortions caused by oblique imaging in which an original image on the object plane is taken from an oblique direction, and provides an improved operability for the user.

Another object of the present invention is to provide an image processing method that easily creates a composite image with an acceptable level of visual quality from a plurality of partially overlapping images such that the image distortions caused by the oblique imaging are effectively corrected and an improved operability is provided for the user.

Another object of the present invention is to provide an image processing apparatus that carries out the image processing method to effectively correct the image distortions caused by the oblique imaging and provide an improved operability for the user.

Another object of the present invention is to provide a computer-readable storage medium storing program code instructions for causing a computer to execute the image distortion correction processing that effectively corrects the image distortions caused by the oblique imaging and provides an improved operability for the user.

The above-mentioned objects of the present invention are achieved by an image processing method for correcting image distortions caused by oblique imaging in which an original image of an object on an object plane is taken from different oblique directions to obtain a plurality of partially overlapping images, the image processing method comprising the steps of: determining a feature point of one of the plurality of partially overlapping images corresponding to a common location of the original image, shared by the plurality of partially overlapping images, and determining a matched point of one of the other partially overlapping images corresponding to the feature point so that a direction of the object plane is calculated based on the feature point and the matched point; selecting one of the plurality of partially overlapping images as a standard image whose image distortions are to be corrected; and generating a distortion-corrected image on a projection plane by projecting the standard image onto the projection plane based on the direction of the object plane such that image distortions in the standard image are eliminated.

The above-mentioned objects of the present invention are achieved by an image processing apparatus for correcting image distortions caused by oblique imaging in which an original image of an object on an object plane is taken from different oblique directions to obtain a plurality of partially overlapping images, the image processing apparatus comprising: a correspondence detecting unit which determines a feature point of one of the plurality of partially overlapping images corresponding to a common location of the original image, shared by the plurality of partially overlapping images, and determining a matched point of one of the other partially overlapping images corresponding to the feature point of said one of the plurality of partially overlapping images so that a direction of the object plane is calculated based on the feature point and the matched point; a standard image setting unit which selects one of the plurality of partially overlapping images as a standard image that contains a smallest amount of image distortions among the plurality of partially overlapping images; and an image composition unit which combines the other partially overlapping images, which are projected onto an image surface of the standard image with respect to each of the other partially overlapping images, so that a composite image is generated on the image surface so as to correct image distortions in the standard image.

The above-mentioned objects of the present invention are achieved by a computer-readable storage medium storing program code instructions for causing a computer to execute an image distortion correction processing to correct image distortions caused by oblique imaging is corrected, which comprises: a first program code device which causes the computer to determine a feature point of one of the plurality of partially overlapping images corresponding to a common location of the original image, shared by the plurality of partially overlapping images, and to determine a matched point of one of the other partially overlapping images corresponding to the feature point so that a direction of the object plane is calculated based on the feature point and the matched point; a second program code device which causes the computer to select one of the plurality of partially overlapping images as a standard image whose image distortions are to be corrected; and a third program code device which causes the computer to generate a distortion-corrected image on a projection plane by projecting the standard image onto the projection plane based on the direction of the object plane such that image distortions in the standard image are eliminated.

In the image processing method and apparatus of the present invention, even when an image of the object on an arbitrary object plane is taken from an arbitrary oblique direction, the correction of the image distortion can be carried out by taking at least two images of the object. The image processing method and apparatus of the present invention are effective in easily and accurately correcting the image distortions caused by the oblique imaging. Further, the image processing method and apparatus of the present invention are effective in easily creating a composite image with an acceptable level of visual quality from a plurality of partially overlapping images such that the image distortions caused by the oblique imaging are corrected.

BRIEF DESCRIPTION OF THE DRAWINGS

Other objects, features and advantages of the present invention will be apparent from the following detailed description when read in conjunction with the accompanying drawings.

FIG. 1 is a diagram for explaining a problem of a conventional image processing method.

FIG. 11 is a block diagram of an image distortion correcting unit in the image processing apparatus of FIG. 3.

DETAILED DESCRIPTION OF PREFERRED EMBODIMENTS

A description will now be provided of preferred embodiments of the present invention with reference to the accompanying drawings.

Figure 2:
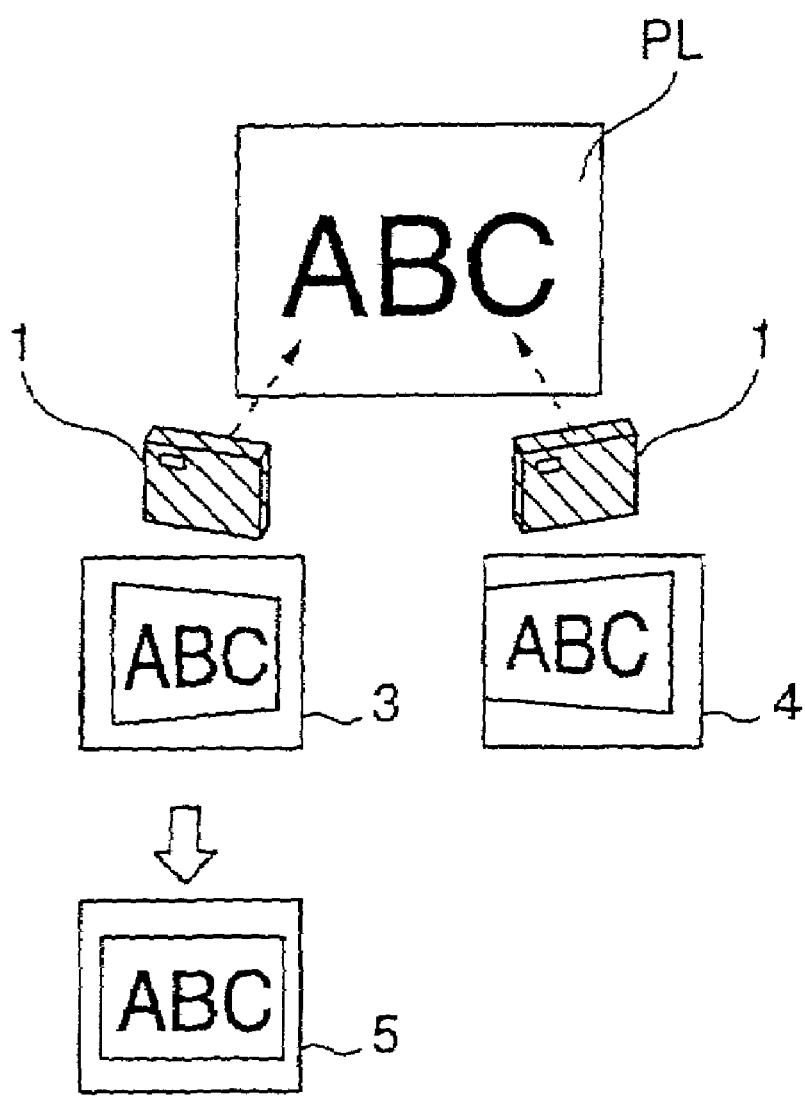
FIG. 2 is a diagram for explaining operation of a first preferred embodiment of the image processing method of the invention.

FIG. 2 shows an operation of a first preferred embodiment of the image processing method of the invention. As shown in FIG. 2, an image processing apparatus 1 takes an original image on the object plane PL from two different directions, and first and second images 3 and 4 are obtained such that the two images 3 and 4 share at least a common location of the original image on the object plane. Each of the first and second images 3 and 4 has image distortions caused by oblique imaging. According to the image processing method of the present embodiment, one of the first and second images 3 and 4 is selected as the standard image, and a distortion-corrected image is created based on the selected image. For example, when the split image 3 is selected as the standard image, a distortion-corrected image 5 is created by correcting the image distortions in the standard image 3, as shown in FIG. 2.

Figure 3:
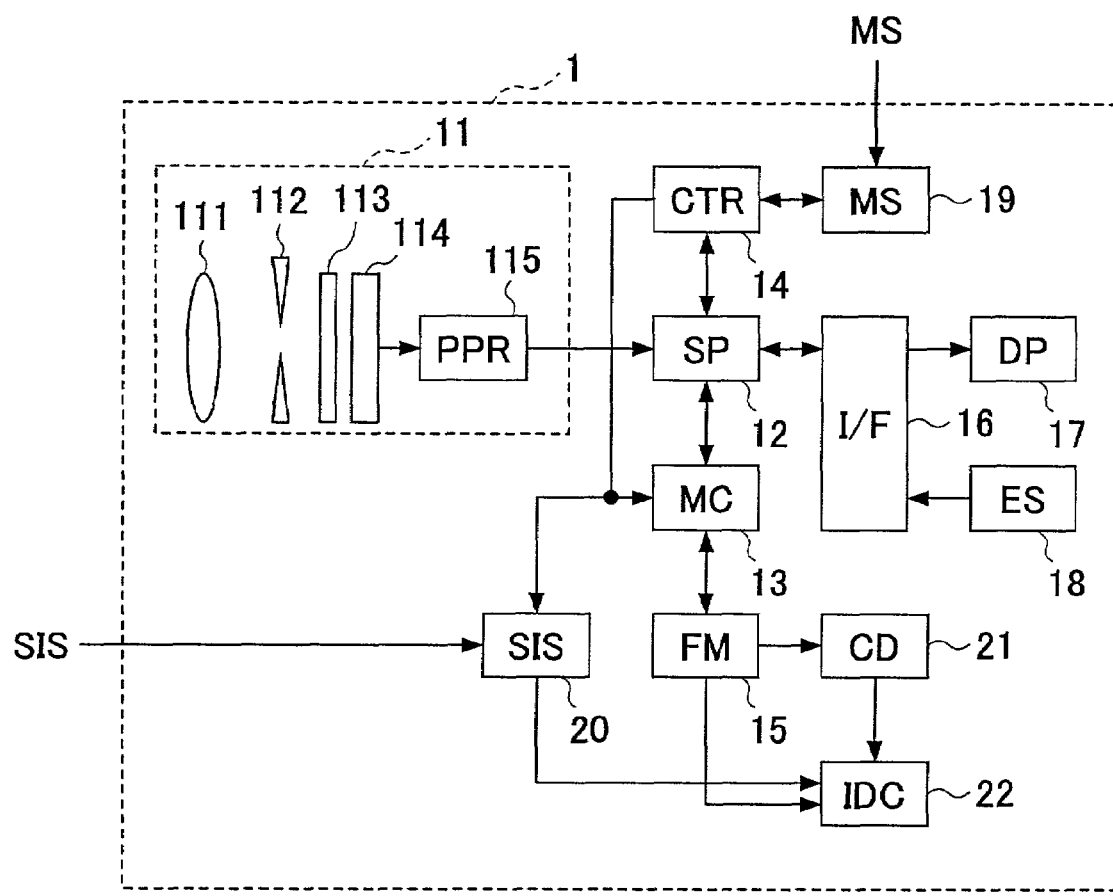
FIG. 3 is a block diagram of a first preferred embodiment of the image processing apparatus of the invention.

FIG. 3 is a block diagram of a first preferred embodiment of the image processing apparatus of the invention. As shown in FIG. 3, the image processing apparatus 1 of the present embodiment generally includes an imaging unit 11, a signal processing unit (SP) 12, a memory control unit (MC) 13, a main control unit (CTR) 14, a frame memory (FM) 15, an interface unit (I/F) 16, a display unit (DP) 17, an external storage (ES) 18, a mode setting unit (MS) 19, a standard image setting unit (SIS) 20, a correspondence unit (CD) 21, and an image distortion correcting unit (IDC) 22. The imaging unit 11 generally includes a lens 111, a stop 112, a shutter 113, a photoelectric conversion unit 114, and a pre-processor (PPR) 115.

In the image processing apparatus 1, an output of the pre-processor 115 is connected to the SP 12. The SP 12 is connected to each of the CTR 14, the MC 13 and the I/F 16. The MC 13 is connected to each of the FM 15 and SIS 20. The CTR 14 is connected to each of the MC 13, the MS 19 and the SIS 20.

Further, in the image processing apparatus 1, the FM 13 is connected to each of the MC 13, the CD 21 and the IDC 22. The I/F 16 is connected to each of the DP 17 and the ES 18. The SIS 20 is connected to the IDC 22. Further, the CD 21 is connected to the IDC 22.

In the imaging unit 11, the lens 111, the stop 112, the shutter 113 and the photoelectric conversion unit 114 are arranged in this order along the optical axis thereof. An output of the photoelectric conversion unit 114 is connected to the PPR 115. The imaging unit 11 generates a digital image signal by taking an original image of an object on the object plane, the digital image signal indicating the image of the object. The image processing apparatus 1 is configured to process the image signal supplied by the imaging unit 11 and correct image distortions caused by oblique imaging.

In the image processing apparatus 1, a mode setting signal (MS) is input to the MS 19, and one of a normal imaging mode and a distortion correcting mode is selected by the MS 19 in response to the input mode setting signal. A standard image setting signal (SIS) is input to the SIS 20, and one of a plurality of partially overlapping images of the object is selected as the standard image by the SIS 20 in response to the input standard image setting signal.

In the image processing apparatus 1, the FM 15 stores image signals, indicating respective images of the object taken from two or more viewpoints, which are supplied by the imaging unit 11. The image signals stored in the FM 15 include at least a pair of partially overlapping images of the object, the partially overlapping images sharing a common location on the object plane. The CD 21 determines a feature point of one of the partially overlapping images that corresponds to the common location of the object plane, and determines a matched point of the other of the partially overlapping images that corresponds to the feature point. The IDC 22 calculates a direction of the object plane based on the feature point and the matched point determined by the CD 21. The IDC 22 generates a distortion-corrected image on a projection plane by projecting one of the partially overlapping images onto the projection plane based on the calculated direction of the object plane. The distortion-corrected image generated by the IDC 22 is stored into the FM 15. The operations of these elements of the image processing apparatus 1 will be described in detail later.

In the present embodiment, the photoelectric conversion unit 114 of the imaging unit 11 is formed by using a charge-coupled device (CCD). The PPR 115 is formed by using an analog signal processor or analog-to-digital converter including a preamplifier and an automatic gain control (AGC) circuit. The PPR 115 serves to convert an analog image signal, supplied by the photoelectric conversion unit 114, into a digital image signal.

In the image processing apparatus 1, the CTR 14 controls the entire image processing apparatus 1. The CTR 14 is formed by a microprocessor. The SP 12 processes the image signal supplied by the imaging unit 11, and supplies the processed image signal to the MC 13. The FM 15 stores the processed image signal under control of the CTR 14. The SP 12 transfers the processed image signal to the DP 17 through the I/F 16 so that the image is displayed on the DP 17. The SP 12 transfers the processed image signal and other signals to the ES 18 through the I/F 16 for storage of these signals. The image signal and the other signals are written to or read from the ES 18 under control of the CTR 14.

In the present embodiment, the SP 12 is formed by using a digital signal processor (DSP) or the like. The digital image signal, supplied by the imaging unit 11, is subjected to several kinds of signal processing in the SP 12, including color decomposition, white balance adjustment and gamma correction, as it is required. The MC 13 controls the FM 15 such that the processed image signal, supplied by the SP 12, is written to the FM 15, or, conversely, it is read from the FM 15. In the present embodiment, the FM 15 is formed by a semiconductor memory, such as a VRAM, SRAM or DRAM. The FM 15 is capable of storing an amount of image signals corresponding to at least two images of the object.

In the image processing apparatus 1, an image signal, read from the FM 15, is transferred to the SP 12. In the SP 12, the image signal is processed through image compression and other signal processing. After the signal processing is performed, the SP 12 transfers the compressed image signal to the ES 18 via the I/F 16 for storage of the image signal. In the present embodiment, the ES 18 is formed by an IC memory card or a magneto-optical disk. Alternatively, by using a modem card or an ISDN card, the compressed image signal may be transmitted to an external terminal at a remote location via a communication network, where the compressed image signal is recorded to a storage medium of the terminal, instead of storing it in the ES 18.

On the other hand, the compressed image signal read from the ES 18 is transferred to the SP 12 via the I/F 16. In the SP 12, the image signal is processed through signal decompression and other signal processing.

Further, in the image processing apparatus 1, an image signal read from either the ES 18 or the FM 15 is transferred to the SP 12 for displaying of the image signal. In the SP 12, the image signal is processed through digital-to-analog (DA) conversion, amplification and/or other kinds of signal processing. After the signal processing is performed, the processed image signal is transferred to the DP 17 via the I/F 16, so that the image is displayed on the DP 17. In the present embodiment, the DP 17 is formed by a liquid crystal display (LCD) device attached to an enclosure of the image processing apparatus 1.

Figure 4:
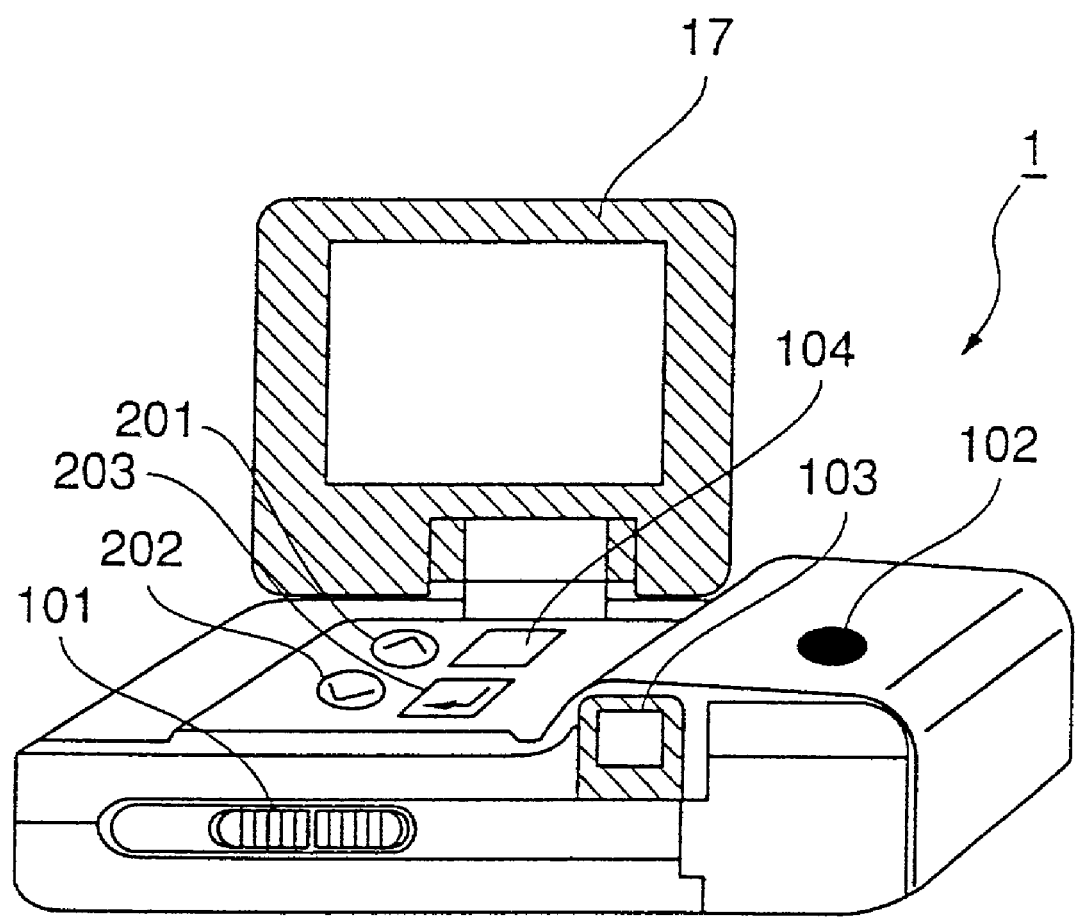
FIG. 4 is a perspective view of the image processing apparatus of FIG. 3.

FIG. 4 is a perspective view of the image processing apparatus 1 of FIG. 3. As shown in FIG. 4, the image processing apparatus 1 of the present embodiment is a digital still camera which generally includes a power switch 101, a shutter 102, a finder 103, a mode setting key 104, an up scroll key 201, a down scroll key 202, and an enter key 203, in addition to the elements of the image processing apparatus 1 described above with reference to FIG. 3. The mode setting key 104 is provided for the user to select one of the normal imaging mode and the distortion correcting mode, and the mode setting signal (MS) indicating the user's selection on the mode setting key 104 is supplied to the MS 19. The up scroll key 201 is provided for the user to scroll up the image indicated on the display unit 17. The down scroll key 202 is provided for the user to scroll down the image indicated on the display unit 17. The standard image setting signal (SIS) indicating the selected standard image is supplied to the SIS 20 upon pressing of the enter key 203.

Figure 5:
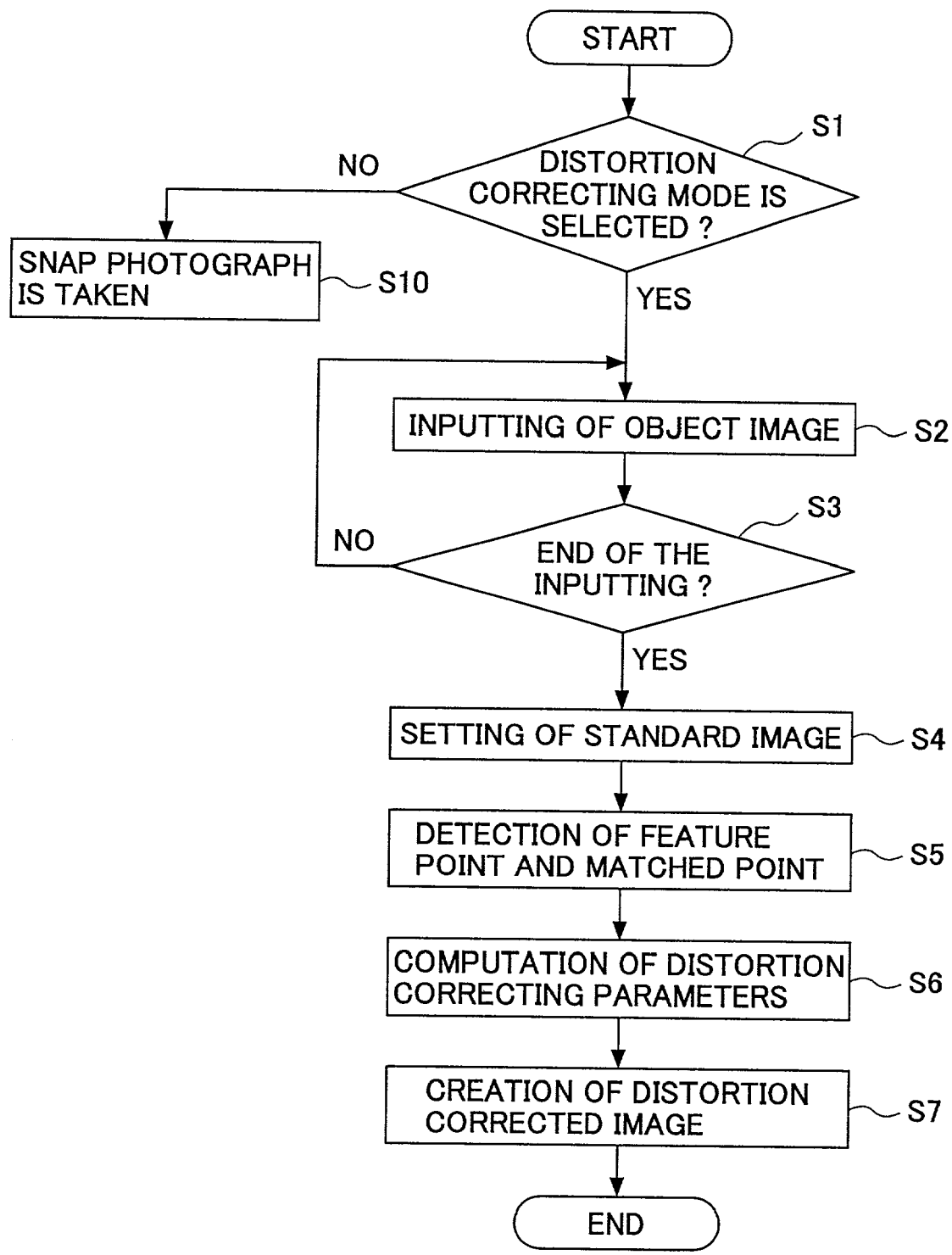
FIG. 5 is a flowchart for explaining operation of the image processing apparatus of the present embodiment.

FIG. 5 is a flowchart for explaining operation of the image processing apparatus 1 of the present embodiment.

When the power switch 101 is turned ON, the image processing apparatus 1 starts operation. By using the mode setting key 104, the user selects one of the normal imaging mode and the distortion correcting mode. When the normal imaging mode is selected, the image processing apparatus 1 serves to take a snap photograph of an object. When the distortion correcting mode is selected, the image processing apparatus serves to generate a distortion-corrected image. In the present embodiment, the mode setting unit (MS) 19 is provided to receive the mode setting signal output by the mode setting key 104. The MS 19 may be formed by using the hardware or the software which is provided separately from the main body of the image processing apparatus 1.

As shown in FIG. 5, at a start of the operation of the image processing apparatus 1, the main control unit 14 at step S1 determines whether the distortion correcting mode is selected by the user by turning ON the mode setting key 104. When the result at the step S1 is negative, step S10 sets the image processing apparatus 1 in the normal imaging mode wherein a snap photograph of a desired object is taken.

When the result at the step S1 is affirmative, step S2 requests the user to input the object image, which is taken from the original image of an object on the object plane PL by using the imaging unit 11. It is necessary that a plurality of object images be input to the image processing apparatus 1, the plurality of object images including at least a pair of partially overlapping first and second images that are taken from different oblique directions, and the two images sharing a common location of the original image on the object plane PL.

Step S3 determines whether the inputting of the object image to the image processing apparatus 1 is finished according to the user's operation. When the result at the step S3 is negative, the control is transferred to the step S2. The inputting of the object image to the image processing apparatus 1 is repeated until the result at the step S3 is affirmative. When the result at the step S3 is affirmative, the control is transferred to the next step S4. In the present embodiment, the above-mentioned operation is performed by turning ON the mode setting key 104 again. Alternatively, another key that is used to finish the inputting of the object image may be provided on the image processing apparatus 1.

Figure 6:
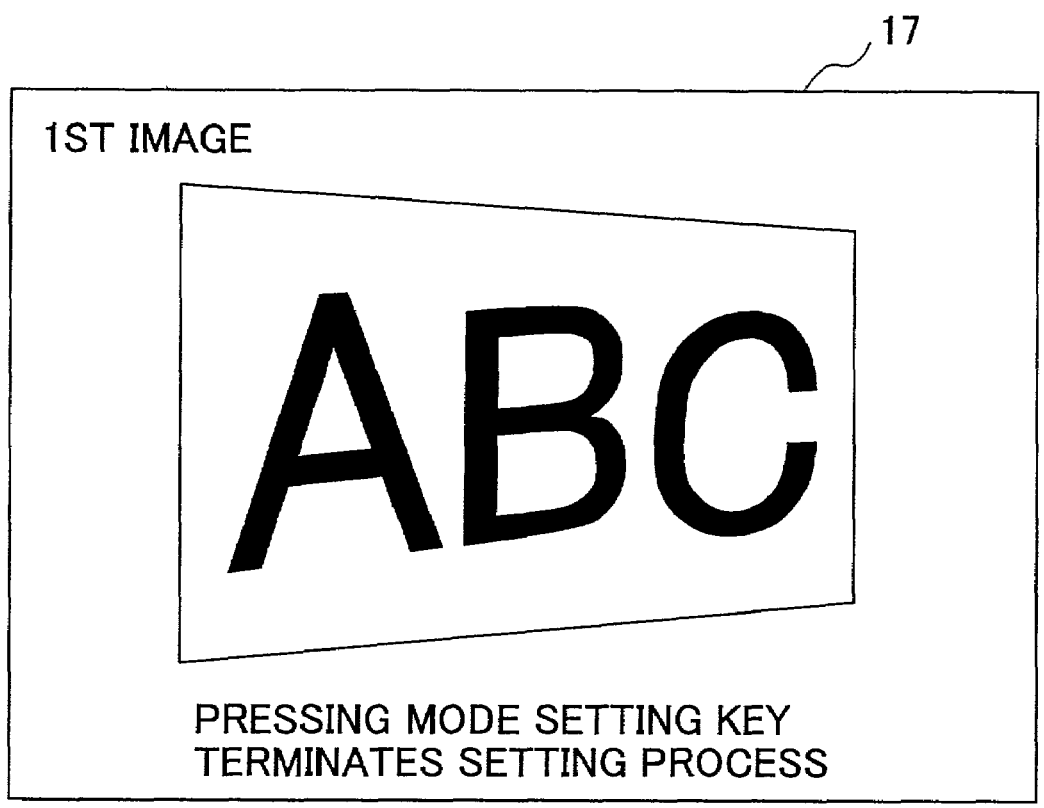
FIG. 6 is a diagram showing an operational indication of a display unit of the image processing apparatus of FIG. 3 when inputting an object image.

FIG. 6 shows an operational indication of the display unit 17 of the image processing apparatus of FIG. 3 when inputting an object image. As shown, in order to allow the user to confirm the inputting of the object images, the operational indication of the display unit 17, which is overlaid with the object image, may include the sequential number (e.g., "first image") of the object image currently taken, as well as an operational message like "pressing mode setting key again terminates inputting process".

After the inputting of the plurality of object images (or the partially overlapping first and second images) to the image processing apparatus 1 is performed, step S4 performs the setting of a standard image. In this step, one of the plurality of object images is manually or automatically selected as the standard image whose image distortions are to be corrected. In the present embodiment, the standard image setting unit (SIS) 20 carries out the setting of the standard image, which will be described later.

Figure 7:
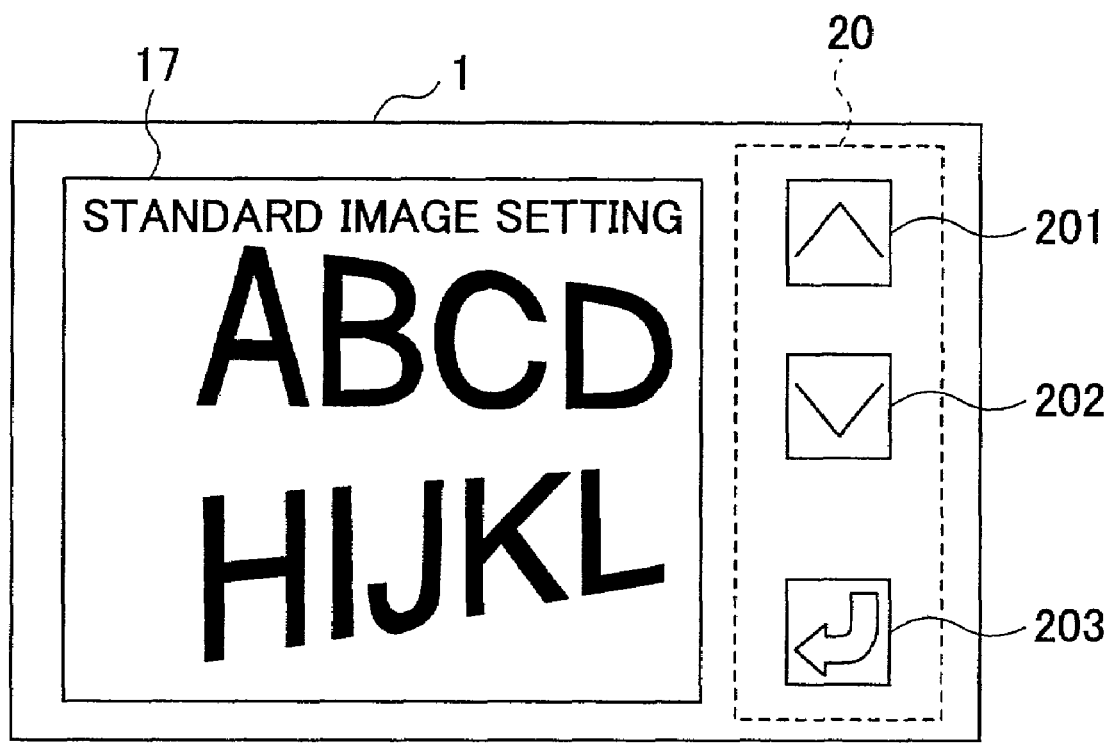
FIG. 7 is a diagram showing the layout of a standard image setting unit of the image processing apparatus of FIG. 3.

FIG. 7 shows the layout of the standard image setting unit (SIS) 20 of the image processing apparatus of FIG. 3. As shown in FIG. 7, the SIS 20 is provided with the up scroll key 201, the down scroll key 202 and the enter key 203. Upon depression of the mode setting key 104 to terminate the inputting of the object image at the step S3 shown in FIG. 5, an operational message, such as "STANDARD IMAGE SETTING", which is overlaid with the object image, appears on the display unit 17 as shown in FIG. 7. Hence, the user is requested at this time to select one of the plurality of object images (or the partially overlapping first and second images) as the standard image whose image distortions are to be corrected.

By using the up and down scroll keys 201 and 202, the user searches for the desired standard image among the plurality of object images captured at the step S2 while viewing the object image indicated on the display unit 17. When the up scroll key 201 is depressed, the preceding object image that was taken prior to the currently displayed object image appears on the display unit 17. When the down scroll key 202 is depressed, the following object image that was taken after the currently displayed object image appears on the display unit 17. With the desired standard image indicated on the display unit 17, the user depresses the enter key 203 to finalize the setting of the standard image at step S4 shown in FIG. 5.

When selecting one of the plurality of object images as the standard image, it is needed for accurate image distortion correction that an object image having a largest ratio of an area of an object region to an entire area of the image be selected from the plurality of object images. Further, it is needed for accurate image distortion correction that an object image having a smallest inclination angle of the viewing direction to the object plane PL be selected from the plurality of object images. In the above-described embodiment, the standard image is manually selected by the user, bearing in mind that these matters are necessary.

Figure 8:
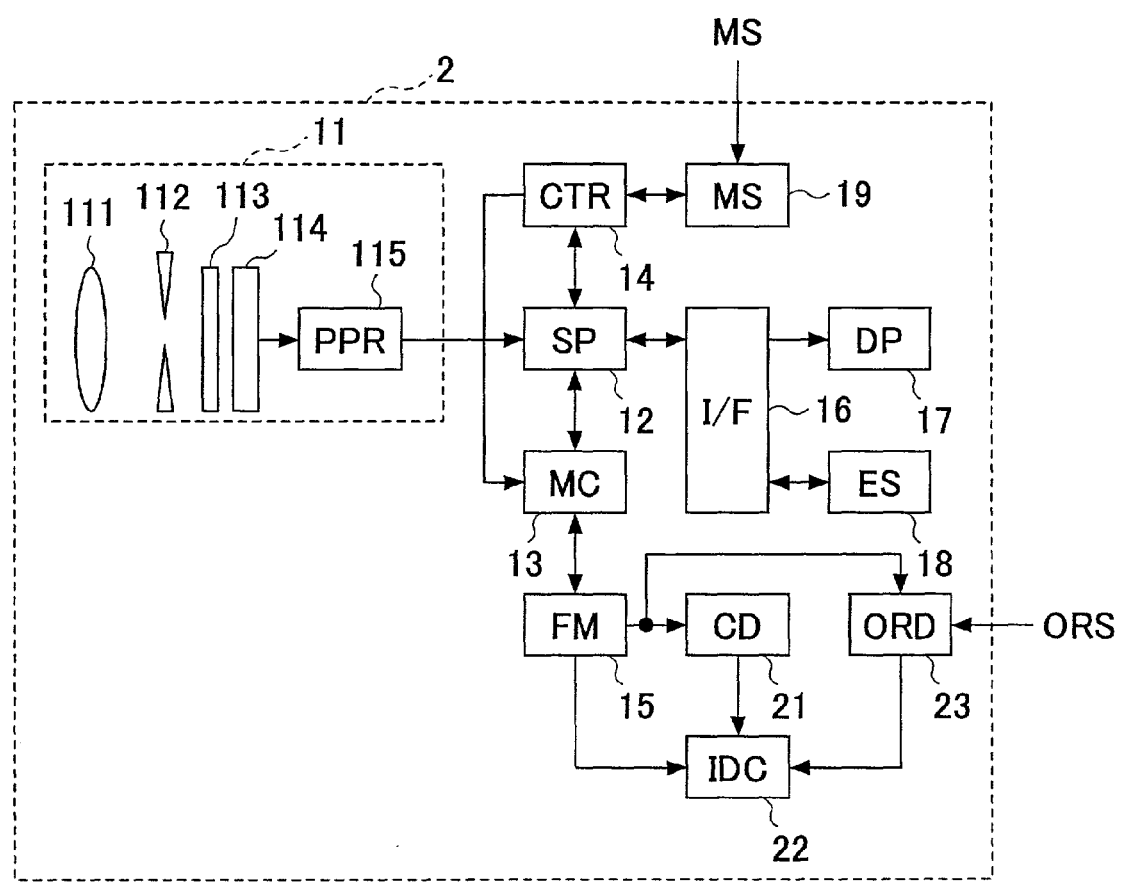
FIG. 8 is a block diagram of a variation of the image processing apparatus of the present embodiment.

FIG. 8 is a block diagram of a variation of the image processing apparatus of the present embodiment. The image processing apparatus 2 of the present embodiment is configured so that an object image having a largest ratio of an area of an object region to an entire area of the image is automatically selected from the plurality of object images (or the partially overlapping first and second images).

As shown in FIG. 8, an object region determining unit (ORD) 23 is provided in the image processing apparatus 2, instead of the standard image setting unit 20 in the image processing apparatus 1 of FIG. 3. An output of the FM 15 is connected to the ORD 23. The ORD 23 receives an object region setting signal (ORS) output by an external control unit (not shown), and determines a ratio of the area of an object region to the entire area of each image of the plurality of object images by performing a known image segmentation process.

Generally, any of images, such as the standard image or the reference image, means an image of an object on the object plane PL that is taken by the imaging device. The image of the object, taken by the imaging device, is acquired by using the image segmentation process, which is known, for example, from "Computer Image Processing and Recognition", Chapter 9, pp.128-139, by Takeshi Agui and Tomoharu Nagao, published in November 1992 from Shokoudo Co. Ltd. in Japan. In the document, four kinds of the image segmentation method: (a) clustering is performed on the image (e.g., the region division method); (b) clustering is performed on the characteristic space (e.g., the histogram based region division method); (c) edges of the image are used (e.g., contour line tracing); (d) texture analysis are explained. An appropriate one of the image segmentation methods is applied to the ORD 23 of the image processing apparatus 2. When the image segmentation is performed, the image of the object is divided into regions of picture elements, the individual regions having distinctive intensity characteristics depending on the image taken by the imaging device. If the object surface is rectangular and the coordinates of the vertexes of the four corners of the object in the image are externally input to the ORD 23, the object region can be uniquely determined.

In the image processing apparatus 2 of FIG. 8, the data signal indicating the object region determined by the ORD 23 is supplied to the IDC 22. In response to the received data signal, the IDC 22 automatically selects the object image having the largest ratio of the area of the object region to the entire area of the image as the standard image from among the plurality of object images (or the partially overlapping first and second images).

Further, in the image processing apparatus 2 of FIG. 8, the IDC 22 calculates a direction of the object plane with respect to the image surface of each image. The inclination angle of the viewing direction of each image to the object plane PL can be determined based on the calculated direction of the object plane. If there are two or more object images that have the largest ratio of the object region area to the entire image area, the ORD 23 automatically selects the object image having the smallest inclination angle among such object images, as the standard image. The above automatic selecting function of the ORD 23 in the present embodiment can be applied to another preferred embodiment of the image processing apparatus of the invention which will be described later.

Referring back to the flowchart of FIG. 5, after the step S4 is performed, the main control unit (CTR) 14 at step S5 controls the correspondence detecting unit (CD) 21 so that the CD 21 determines a feature point of the standard image (or the selected one of the plurality of partially overlapping images) corresponding to the common location of the original image, and determines a matched point of one of the other partially overlapping images corresponding to the feature point. A description will now be given of the configuration and operation of the CD 21 in the image processing apparatus 1 of FIG. 3.

Figure 9:
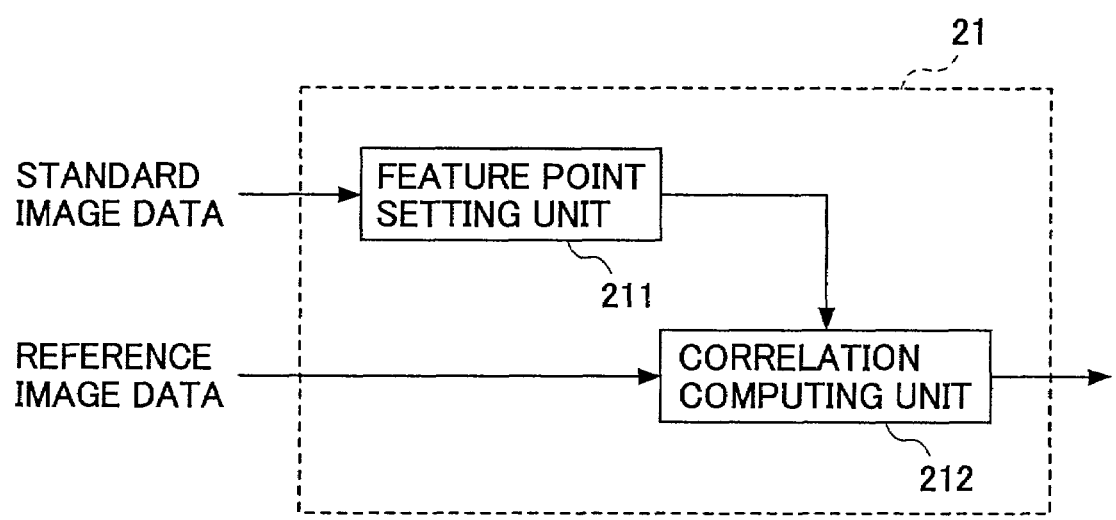
FIG. 9 is a block diagram of a correspondence detecting unit in the image processing apparatus of FIG. 3.

FIG. 9 is a block diagram of the correspondence detecting unit (CD) 21 in the image processing apparatus of FIG. 3. In the present embodiment, the CD 21 uses a correlation computation method to determine a feature point of the standard image that corresponds to the common location of the original image on the object plane PL shared by the standard image and the reference image (or the partially overlapping first and second images) among the stored image signals in the FM 15, and to determine a matched point of the reference image that corresponds to the feature point of the standard image.

As shown in FIG. 9, the CD 21 generally includes a feature point setting unit 211 and a correlation computing unit 212. As described above, the frame memory (FM) 15 in the image processing system 1 of FIG. 3 stores the standard image and the reference image (or the partially overlapping first and second images of the object), the standard image and the reference image sharing the common location of the original image on the object plane.

In the CD 21 of FIG. 9, the feature point setting unit 211 receives the data of the standard image from the FM 15, and determines a feature point of the standard image that corresponds to the common location of the original image on the object plane. The feature point setting unit 211 extracts a pattern of gray-scale intensities of (2N+1)(2P+1) pixels (or picture elements) within a corresponding block of the standard image wherein the feature point is located at the center of the block. The extracted pattern of the intensities of the pixels within the block of the standard image will be referred to as the correlation window. Each of "N" and "P" denotes a non-negative integer that specifies a size of the correlation window. The position of the feature point in the standard image is chosen from a corner or an edge of the image of the object, which shows a distinctive pattern of gray-scale intensities of the neighboring pixels around the corner or the edge. The extracted pattern of the intensities of the pixels within the correlation window, obtained by the feature point setting unit 211, is transferred to the correlation computing unit 212.

In the CD 21 of FIG. 9, the correlation computing unit 212 receives the data of the reference image from the FM 15, and determines a matched point of the reference image corresponding to the feature point of the standard image by finding, through a correlation computation process, a center point of a block of the reference image having a pattern of intensities which approximately accords with the extracted pattern within the correlation window of the standard image.

Figure 10A:
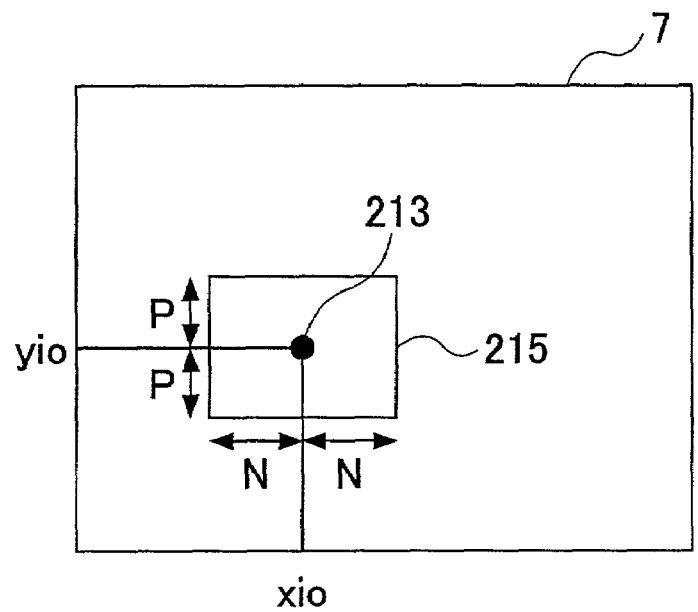
FIG. 10A and FIG. 10B are diagrams for explaining operation of a correlation computing unit in the correspondence detecting unit of FIG. 9.
Figure 10B:
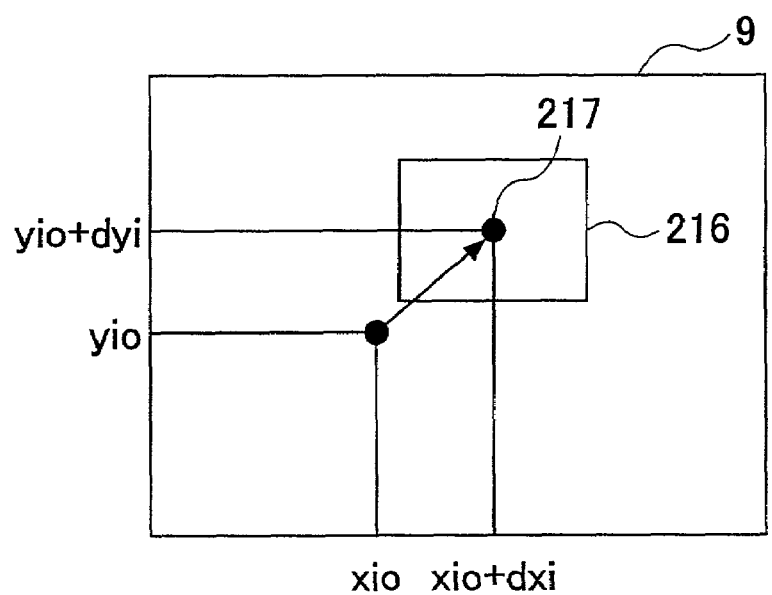

FIG. 10A and FIG. 10B show a block matching as an example of the correlation computation process performed by the correlation computing unit 212 in the present embodiment.

As shown in FIG. 10A and FIG. 10B, the block matching between a pattern of intensities of the (2N+1)(2P+1)-size correlation window 215 of the standard image 7 and a pattern of intensities of a corresponding correlation window 216 of the reference image 9 is performed by the correlation computing unit (CD) 212. Each of cross correlations $S_i$ in pixel value or intensity between the i-th possible feature point 213 ($x_{i0}$, $y_{i0}$) of the standard image 7 and a corresponding pixel 217 ($x_{i0}+dx_i$, $y_{i0}+dy_i$) of the reference image 9 is represented by $$S_i = \frac{1}{K} \sum_{x=-N}^{N} \sum_{y=-P}^{P} [I_s(x_{i0}+x, y_{i0}+y) - \overline{I_s(x_{i0}, y_{i0})}] \times \quad (1)$$

$$[I_r(x_{i0}+dx_i+x, y_{i0}+dy_i+y) - \overline{I_r(x_{i0}+dx_i, y_{i0}+dy_i)}]$$

In the above formula, "K" is a constant, "$I_s(x,y)$" denotes the pixel value or intensity of the pixel (x, y) of the standard image 7, "$I_r(x,y)$" denotes the pixel value or intensity of the pixel (x, y) of the reference image 9, "$\overline{I_s(x,y)}$" denotes the mean pixel value or mean intensity of the pixels within a (2N+1)(2P+1)-size correlation window 215 having the pixel (x, y) of the standard image 7 as the center of the window, and "$\overline{I_r(x,y)}$" denotes the mean pixel value or means intensity of the pixels within a (2N+1)(2P+1)-size correlation window 216 having the pixel (x, y) of the reference image 9 as the center of the window.

For all of the possible feature points 213 ($x_{i0}$, $y_{i0}$) of the standard image 7, the cross correlations $S_i$ are calculated according to the above formula (1). Then, it is determined whether the maximum of such cross correlations $S_i$ is larger than a predetermined threshold value. When the result of this determination is affirmative, the correlation computing unit 212 successfully determines a matched point 217 of the reference image 9 corresponding to the feature point of the standard image for the maximum cross correlation case. On the other hand, when the result of the determination is negative, the correlation computing unit 212 determines that there is no matched point of the reference image 9 that corresponds to any of the possible feature points of the standard image.

In the flowchart of FIG. 5, after the step S5 is performed, the main control unit (CTR) 14 at step S6 controls the image distortion correcting unit (IDC) 22 so that the IDC 22 performs the computation of distortion correcting parameters based the relation between the feature point of the standard image and the matched point of the reference image in order to calculate a direction of the object plane. After the step S6 is performed, the CTR 14 controls at step S7 the IDC 22 so that the IDC 22 generates a distortion-corrected image on the projection plane, which is parallel to the object plane, by projecting the standard image onto the projection plane through a perspective projection based on the calculated direction of the object plane. That is, the distortion-corrected image created by the IDC 22 is essentially the same as the image of the object that is taken by the imaging unit 11 from the direction perpendicular to the object plane, not from the oblique direction. After the step S7 is performed, the process of FIG. 5 ends.

Next, a description will be provided of the image distortion correcting unit (IDC) 22 in the image processing system 1. In the present embodiment, the image distortion correcting unit (IDC) 22 calculates a direction of the object plane based on the relation between the feature point of the standard image and the matched point of the reference image detected by the CD 21. The IDC 22 generates a distortion-corrected image on a projection plane, which is parallel to the object plane, by projecting the standard image onto the projection plane through a perspective projection based on the direction of the object plane.

FIG. 11 is a block diagram of the image distortion correcting unit (IDC) 22 in the image processing apparatus of FIG. 3.

As shown in FIG. 11, the image distortion correcting unit (IDC) 22 generally includes a three-dimensional (3D) data computing unit 221, a parameter computing unit 222, and a coordinate transform unit 223. The SIS 20 and the CD 21 are connected to inputs of the 3D data computing unit 221. An output of the 3D data computing unit 221 is connected to an input of the parameter computing unit 222. The parameter computing unit 222, the SIS 20 and the FM 15 are connected to inputs of the coordinate transform unit 223.

In the IDC 22 of FIG. 11, the 3D data computing unit 221 calculates 3D data of the object plane and 3D data of the image surfaces of the standard and reference images based on the relation between the feature point and the matched point supplied by the CD 21. The parameter computing unit 222 calculates distortion correction parameters based on the 3D data of the object plane and the 3D data of the image surfaces supplied by the 3D data computing unit 221. The coordinate transform unit 223 creates a distortion-corrected image on the projection plane by projecting the standard image onto the projection plane through the perspective projection based on the parameters supplied by the parameter computing unit 222.

Figure 12:
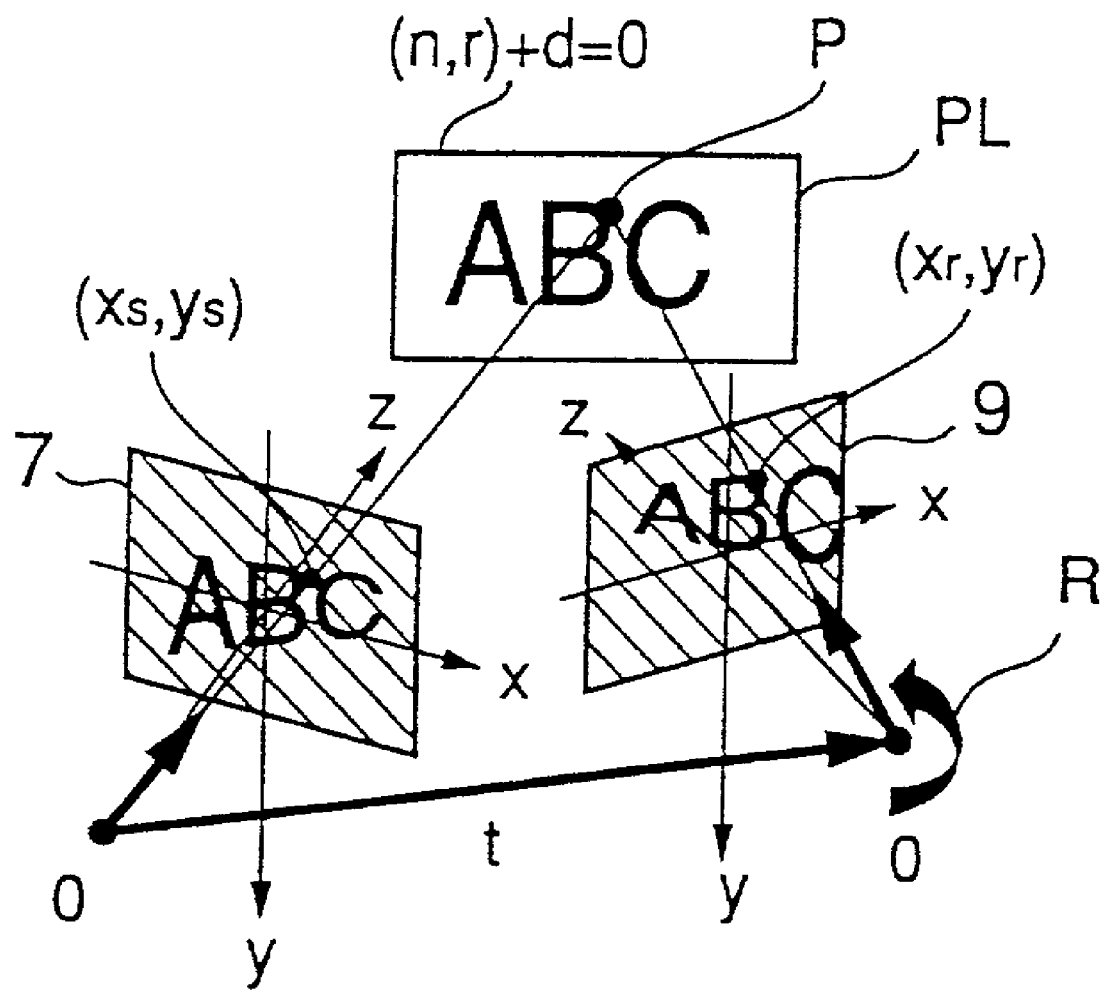
FIG. 12 is a diagram for explaining operation of the image distortion correcting unit of FIG. 3.
Figure 13:
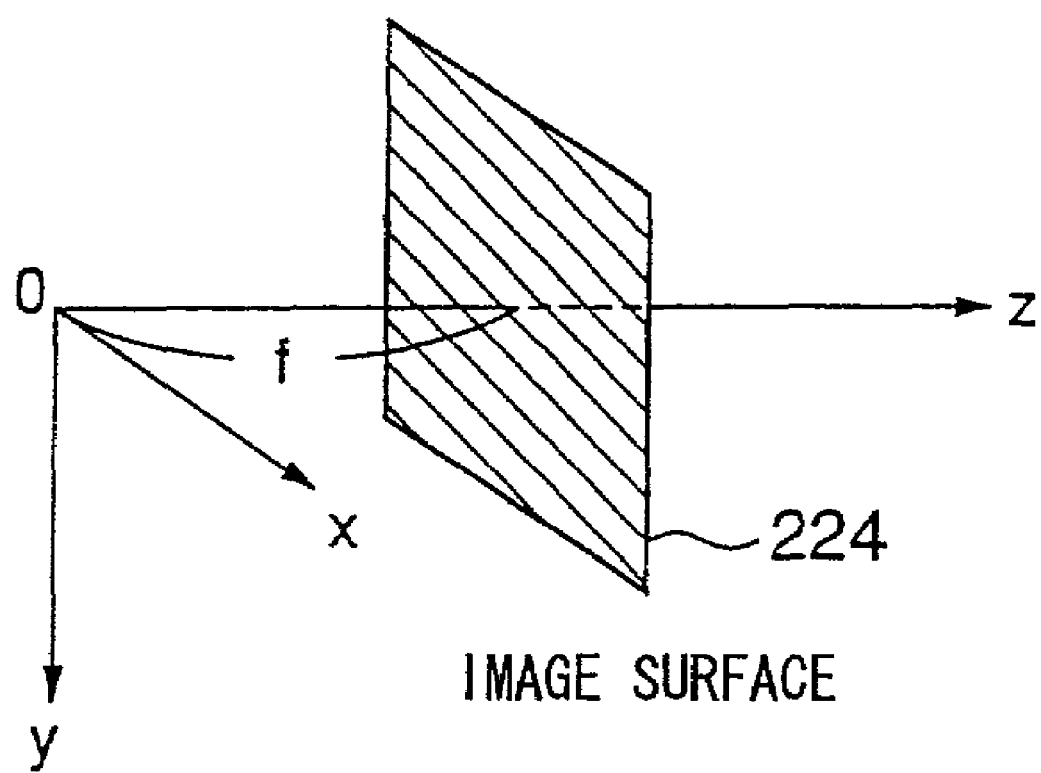
FIG. 13 is a diagram for explaining optical systems of an imaging unit in the image processing apparatus of FIG. 3.

FIG. 12 shows a relation model that represents the relation between the object plane PL and the image surfaces of the standard image 7 and the reference image 9. FIG. 13 shows an optical system model with respect to the image surface 224 for each of the standard image 7 and the reference image 9.

A detailed description will be given of the creation of a distortion-corrected image by the IDC 22 in the present embodiment with reference to FIG. 12 and FIG. 13.

In the present embodiment, the standard image 7 and the reference image 9 are obtained by taking an image of an object on the object plane with the imaging unit 11 from the two viewpoints with respect to the object plane PL, as shown in FIG. 12. The optical system of the imaging unit 11 in the present embodiment is supposed to be a perspective projection model as shown in FIG. 13.

As shown in FIG. 13, the coordinate system of the optical system as the perspective projection model is defined such that the positive direction of the "x" axis is chosen from the right-handed direction of each image surface of the standard and reference images, the positive direction of the "y" axis is chosen from the downward direction of each image surface of the standard and reference images, the positive direction of the "z" axis is chosen from the direction of the optical axis of the optical system facing the object, the origin "o" of the coordinate system is chosen from the center of the optical system, and the distance between the origin "o" of the coordinate system and the image surface is chosen as being equal to the focal length "f" of the optical system of the imaging unit 11. The following description of the creation of a distortion-corrected image by the IDC 22 is based on the above setting of the coordinate system.

In the IDC 22 of FIG. 11, the 3D data computing unit 221 calculates a set of 3D parameters {R, t, n} of the object plane and the image surfaces of the standard and reference images based on the relation between the feature point and the matched point supplied by the CD 21. More specifically, the 3D parameter "R" obtained by the 3D data computing unit 221 is indicative of the attitude of the imaging unit 11 at the viewpoint when taking the reference image 9 relative to that at the viewpoint when taking the standard image 7. The 3D parameter "t" obtained by the 3D data computing unit 221 is indicative of a unit translation vector of the imaging unit 11 from the viewpoint when taking the standard image 7 to the viewpoint when taking the reference image 9. The 3D parameter "n" obtained by the 3D data computing unit 221 is indicative of a direction of the object plane PL.

The following methods (a) and (b) are conceivable as the method of calculating the set of 3D parameters {R, t, n} based on the relation between the feature point and the matched point.

The method (a) is that the digital camera's position and attitude and the 3D coordinates of each corresponding points when taking each of the standard image and the reference image are calculated from eight or more combinations of the feature point and the matched point. In this method, it is assumed that the object plane is planar, and the calculated 3D coordinates are adapted to a single plane surface.

The above-mentioned method (a) is a multiple-purpose 3D computer vision measurement technique, and it is possible to uniquely determine the set of 3D parameters {R, t, n} by using the linear computations.

The method (b) is that the perspective projection matrix (which will be called the homography matrix) is calculated from four or more combinations of the feature point and the matched point, and then the digital camera's position and attitude when taking each of the standard image and the reference image and the direction of the object plane are calculated from the resulting perspective projection matrix.

In the above method (b), after the coordinate transformation formulas (or the homography matrix) which are satisfied under the restriction condition that the object plane is planar are determined, the direction of the digital camera and the direction of the object plane are calculated.

The 3D data computing unit 221 in the present embodiment may be configured to use either the method (a) or the method (b). In the following, a detailed description will be given of the case in which the 3D data computing unit 221 is configured to use the method (b).

Figure 14:
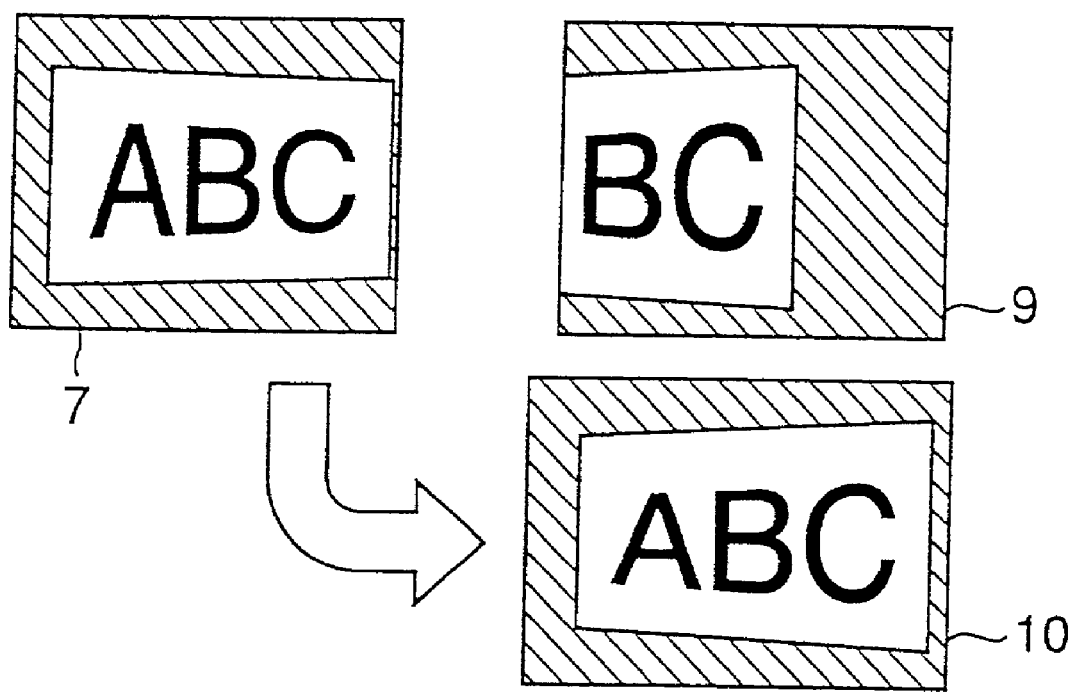
FIG. 14 is a diagram for explaining a perspective projection of a 3D data computing unit in the image distortion correcting unit of FIG. 11.

First, the procedure for the calculation of the perspective projection matrix (or the homography matrix) will be explained. FIG. 14 shows a perspective projection in which the pixels of the standard image are transformed into the pixels of the reference image.

As shown in FIG. 14, the perspective projection is that the pixels of the standard image 7 are transformed into the pixels of the reference image 9 so that a projected image 10 is created. Suppose that there is a correspondence between one (indicated by a point $(x_s, y_s)$) of the pixels of the standard image 7 and a corresponding one (indicated by a point $(x_r, y_r)$) of the pixels of the reference image 9. The perspective projection is represented by $$\begin{cases} x_r = \dfrac{b_1 x_s + b_2 y_s + b_3}{b_7 x_s + b_8 y_s + 1} \\ y_r = \dfrac{b_4 x_s + b_5 y_s + b_6}{b_7 x_s + b_8 y_s + 1} \end{cases} \quad (2)$$

In the above formula (2), the eight unknowns $b_1$ through $b_8$ are rewritten in the form of a matrix B as follows.

$$B = \begin{bmatrix} b_1 & b_2 & b_3 \\ b_4 & b_5 & b_6 \\ b_7 & b_8 & 1 \end{bmatrix} \quad (3)$$

In the present embodiment, the matrix B represented by the above formula (3) is called the perspective projection matrix (or the homography matrix). In order to calculate the perspective projection matrix B, the four or more combinations of the feature point $(x_{si}, y_{si})$ of the standard image and the matched point $(x_{ri}, y_{ri})$ of the reference image (where i=1, . . . , N; N≧4) are used.

Substituting the values of the feature point $(x_{si}, y_{si})$ and the matched point $(x_{ri}, y_{ri})$ into the above formula (2) will make it possible to obtain the solution of the unknowns $b_1$ through $b_8$. However, in practical applications, due to errors or noises contained in the images, the equality of the above formula (2) does not hold in the sense of strict accuracy. In order to eliminate this problem, the least square method, which is represented by the following formula, is used to obtain the approximations to the solutions of the unknowns $b_1$ through $b_8$, or the perspective projection matrix B.

$$\sum_{i=1}^{N} \left[ \left( \frac{b_1 x_{si} + b_2 y_{si} + b_3}{b_7 x_{si} + b_8 y_{si} + 1} - x_{ri} \right)^2 + \left( \frac{b_4 x_{si} + b_5 y_{si} + b_6}{b_7 x_{si} + b_8 y_{si} + 1} - y_{ri} \right)^2 \right] \to \min. \quad (4)$$

The above formula (4) is modified into the following formula.

$$\sum_{i=1}^{N} [(b_1 x_{si} + b_2 y_{si} + b_3 - (b_7 x_{si} + b_8 y_{si} + 1) x_{ri})^2 + \\ (b_4 x_{si} + b_5 y_{si} + b_6 - (b_7 x_{si} + b_8 y_{si} + 1) y_{ri})^2] \to \min. \quad (5)$$

The restriction conditions that the values of the derived functions as the partial differentials of the left-hand side of the above formula (5) with respect to the variables $b_1$ through $b_8$ are equal to zero are used so that the solution of the simultaneous equations of the variables $b_1$ through $b_8$ can be calculated. The perspective projection matrix B can be determined through simple linear calculations by using the above correlated combinations. Hence, the 3D data computing unit 221 can easily calculate the perspective projection matrix B by using the simple linear calculations based on the four or more combinations of the feature point $(X_{si}, y_{si})$ of the standard image and the matched point $(x_{ri}, y_{ri})$ of the reference image.

Next, the procedure of calculation of the 3D parameters {R, t, n} from the perspective projection matrix B will be described.

Suppose that the normal vector "n" to the object plane is represented by $$n = \begin{bmatrix} a \\ b \\ c \end{bmatrix} \quad (a^2 + b^2 + c^2 = 1, c > 0) \quad (6)$$

Suppose that the surface equation of the object plane on the basis of the viewpoint when taking the standard image is represented by the following formula.

$$(n, r) + d = 0 \quad (7)$$

In the above formula (7), |d| indicates the distance from the origin of the coordinate system to the object plane PL, and "r" is expressed by the equation $r = [x\ y\ z]^T$. By using the focal length "f" of the optical system, the above formula (2) is rewritten into the following form.

$$\begin{cases} x_r = f \dfrac{H_{11} x_s + H_{21} y_s + H_{31} f}{H_{13} x_s + H_{23} y_s + H_{33} f} \\ y_r = f \dfrac{H_{12} x_s + H_{22} y_s + H_{32} f}{H_{13} x_s + H_{23} y_s + H_{33} f} \end{cases} \quad (8)$$

The above formula (8) is further rewritten into the following formula.

$$\begin{bmatrix} x_r \\ y_r \\ f \end{bmatrix} = s \begin{bmatrix} H_{11} & H_{21} & H_{31} \\ H_{12} & H_{22} & H_{32} \\ H_{13} & H_{23} & H_{33} \end{bmatrix} \begin{bmatrix} x_s \\ y_s \\ f \end{bmatrix} = s H^T \begin{bmatrix} x_s \\ y_s \\ f \end{bmatrix} \quad (9)$$

In the above formula (9), the following condition is met.

$$s = \frac{1}{H_{13} x_s + H_{23} y_s + H_{33} f} \quad (10)$$

The relationship between the matrix H of the above formula (9) and the parameters {R, t, n, d} is represented by $$H^T = s' R^T (dI + tn^T) \quad (11)$$

In the above formula (11), "s'" is a constant, and each of the elements of the matrix H has the degree of freedom with respect to the scale factor. The transformation of the perspective projection matrix B (indicated by the above formula (3)) into the matrix H (indicated by the above formula (9)) is performed by using the following formula.

$$H^T = \begin{bmatrix} 1 & 0 & 0 \\ 0 & 1 & 0 \\ 0 & 0 & f \end{bmatrix} B \begin{bmatrix} 1 & 0 & 0 \\ 0 & 1 & 0 \\ 0 & 0 & 1/f \end{bmatrix} = \begin{bmatrix} b_1 & b_2 & b_3/f \\ b_4 & b_5 & b_6/f \\ fb_7 & fb_8 & 1 \end{bmatrix} \quad (12)$$

Next, the procedure of calculations for determining the values of the unknown parameters {R, t, n, d} from the matrix H will be described below.

The scale factors of the object plane's distance "d" and the unit translation vector "t" are indefinite, and it is assumed that the following condition is satisfied.

$$\|t\| = 1 \quad (13)$$

The procedure of calculations for determining the values of the unknown parameters {R, t, n, d} is also given by "Image Understanding—Theoretical Methods In 3D Recognition" by Kenichi Kanatani, published in May 1990 from Morikita Shuppan Co., Ltd. in Japan. The results (i) through (vi) of the calculations of the solutions of the parameters are provided as follows.

(i) The elements of the matrix H represented by the above formula (9) are multiplied by appropriate constants, det [H]=1 is held.

(ii) Suppose that the symmetric matrix $HH^T$ has the eigenvalues $\sigma_1^2$, $\sigma_2^2$, and $\sigma_3^2$, and that the corresponding eigenvectors $u_1$, $u_2$, and $U_3$ are mutually perpendicular unit vectors that form the right-handed system where $\sigma_1 \geq \sigma_2 \geq \sigma_3$.

(iii) When $\sigma_1=\sigma_2=\sigma_3$, the motion parameters are set as follows.

$$t=0, R=H \tag{14}$$

The object plane parameters {n, d} are indefinite. Otherwise the following two sets of the solutions can be determined as follows.

(iv) The object plane parameters {n, d} can be determined as follows.

$$n = \frac{\varepsilon}{\sqrt{\sigma_1^2 - \sigma_3^2}} \left( \pm \sqrt{\sigma_1^2 - \sigma_2^2}\, u_1 + \sqrt{\sigma_2^2 - \sigma_3^2}\, u_3 \right) \tag{15}$$

$$d = -\frac{\sigma_2}{\sigma_1 - \sigma_3} \tag{16}$$

In the above formula (15), the value of the coefficient $\epsilon$ is chosen such that $\epsilon = \pm 1$ and c>0.

(v) The unit translation vector "t" is determined as follows.

$$t = \frac{1}{\sigma_2\sqrt{\sigma_1^2 - \sigma_3^2}} \left( \pm \sigma_3\sqrt{\sigma_1^2 - \sigma_2^2}\, u_1 - \sigma_1\sqrt{\sigma_2^2 - \sigma_3^2}\, u_3 \right) \tag{17}$$

(vi) The rotation matrix "R" is determined as follows.

$$R = \frac{1}{\sigma_2}\left[ I - \frac{1}{(n,t)+d} nt^T \right] H \tag{18}$$

As described above, the two sets of the solutions of the 3D parameters {R, t, n, d} are calculated from the perspective projection matrix B. In most cases, it is apparent from the derived values of the solutions which of the two solutions is a true solution.

In the process of the above calculations, the focal length "f" of the imaging unit 11 is used. A predetermined value of the focal length "f" of the imaging unit 11 is pre-recorded in the internal memory (not shown) of the main control unit 14, and the value of the focal length "f" can be easily used when performing the above calculations.

Further, when the focal length of the imaging unit 11 is variable and different focal lengths are used in taking the standard image and in taking the reference image, such focal lengths can be detected by providing an encoder in the optical system of the imaging unit 11. The detected focal lengths can be easily used when performing the above calculations.

Next, in the IDC 22 of FIG. 11, the parameter computing unit 222 calculates distortion correction parameters based on the 3D data of the object plane and the 3D data of the image surfaces supplied by the 3D data computing unit 221.

Figure 15:
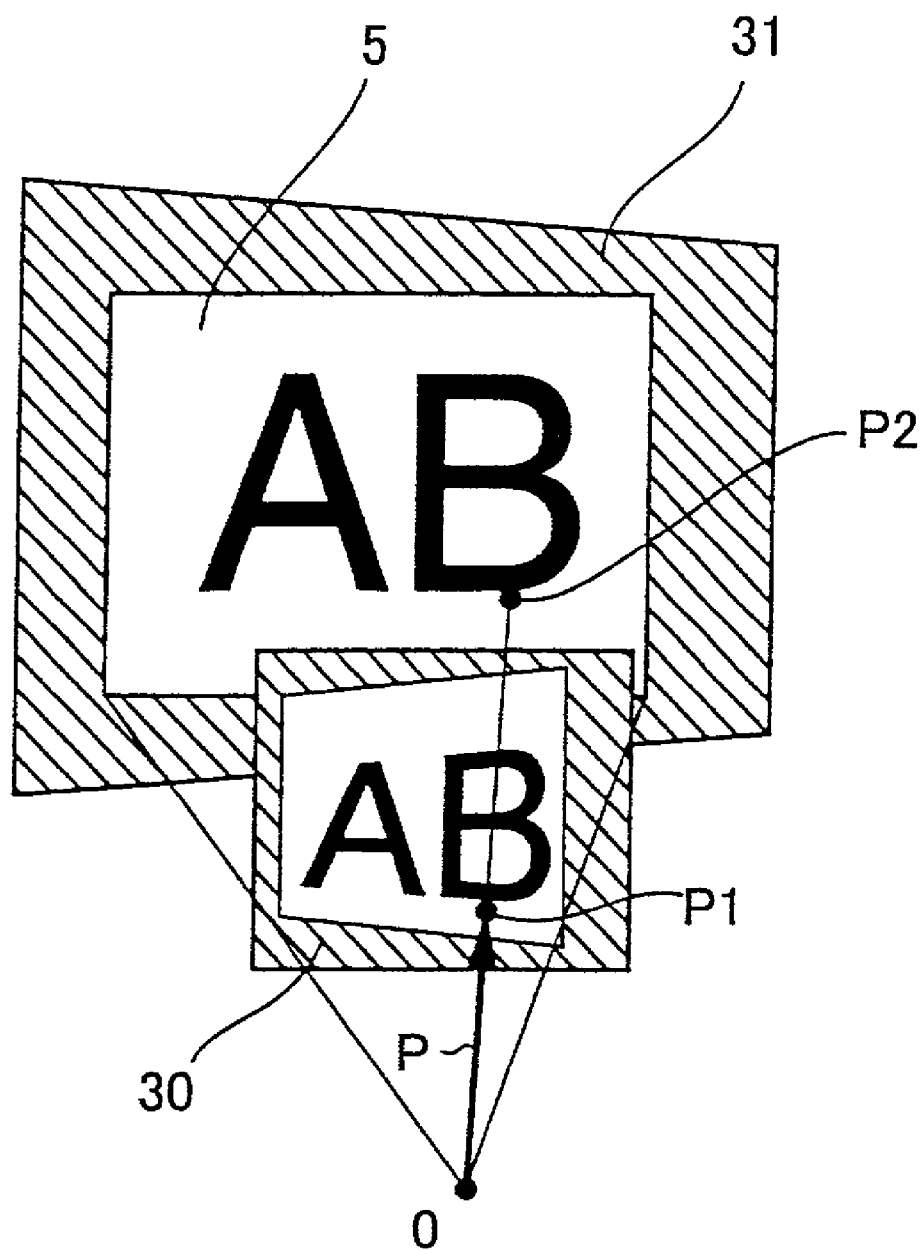
FIG. 15 is a diagram for explaining operation of the image distortion correcting unit of FIG. 3.

FIG. 15 shows the concept of the image distortion correction used by the first preferred embodiment of the image processing apparatus 1 of the present embodiment.

As shown in FIG. 15, in the present embodiment, the image distortions due to the oblique imaging are corrected by performing the perspective projection in which the standard image is projected onto the projection plane, which is parallel to the object plane, based on the direction of the object plane. The distortion-corrected image is created on the projection plane. For example, the point P1 on the image surface 30 is projected onto the projection plane 31 as the point P2 thereon through the perspective projection. In the present embodiment, the calculation of the distortion correction parameters is essentially the same as the determination of the perspective projection formula.

Figure 16:
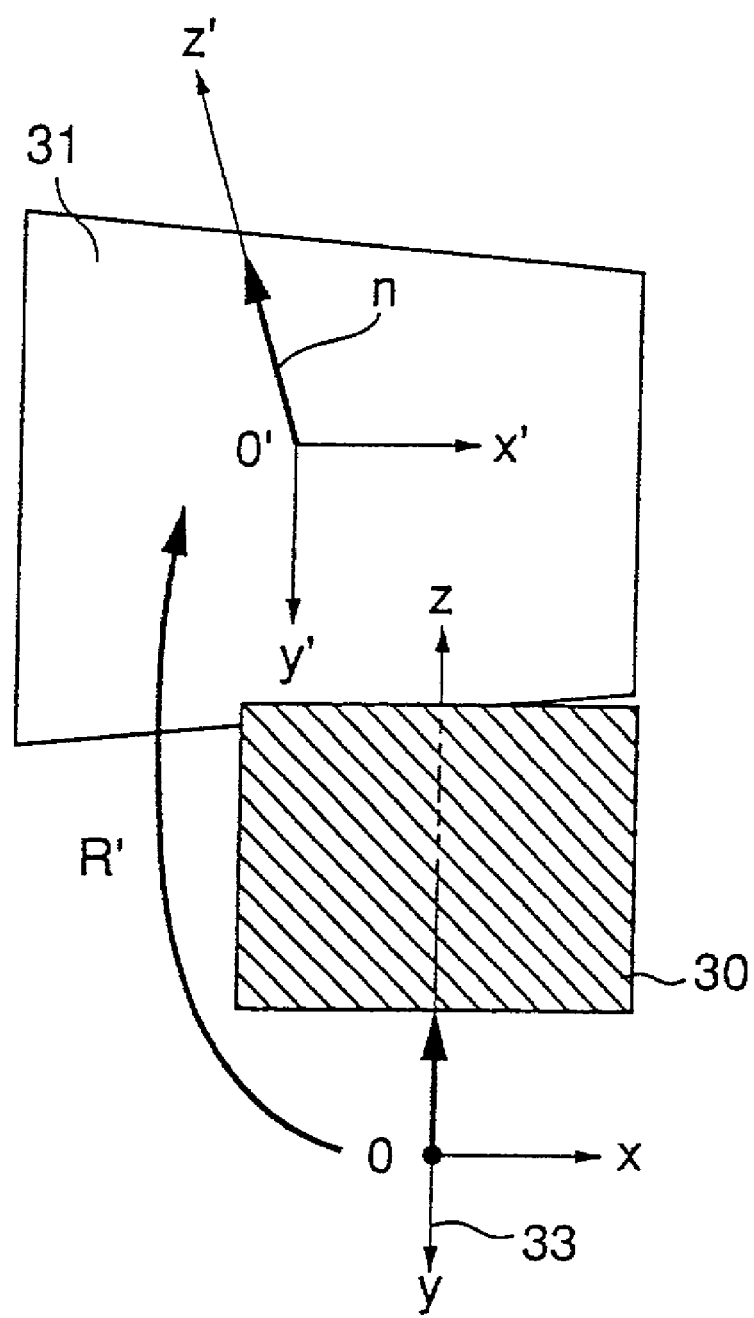
FIG. 16 is a diagram for explaining operation of a parameter computing unit in the image distortion correcting unit of FIG. 11.

Next, a description will be provided of the calculation of the distortion correction parameters. FIG. 16 shows a relationship between the apparatus coordinate system 33 and the unit binormal vector normal to the projection plane 31.

As shown in FIG. 16, the parameter computing unit 222 of the present embodiment calculates a rotation matrix "R'" that represents the coordinate transformation in which the z axis of the apparatus coordinate system 33 (or the imaging device coordinate system), which is the same as the direction of the optical axis of the imaging unit 11 at the viewpoint when taking the standard image, is transformed so as to accord with the direction of the unit binormal vector normal to the projection plane 31, which is parallel to the object plane PL.

The z axis of the apparatus coordinate system is represented by the vector (0, 0, 1). The unit binormal vector normal to the projection plane, which accords with the unit binormal vector "n" normal to the object plane, is represented by the unit binormal vector "n"=(a, b, c). In the present embodiment, the following equation is held.

$$R'\begin{bmatrix}0\\0\\1\end{bmatrix} = \begin{bmatrix}a\\b\\c\end{bmatrix} \tag{19}$$

There are many rotation matrixes "R'" that satisfy the above equation (19). In the present embodiment, the rotation matrix "R'" is defined as follows.

$$R' = R'_y R'_x = \begin{bmatrix} R'_{11} & R'_{12} & R'_{13} \\ R'_{21} & R'_{22} & R'_{23} \\ R'_{31} & R'_{32} & R'_{33} \end{bmatrix} \tag{20}$$

In the above formula (20), "$R'_x$" and "$R'_y$" are represented by $$R'_x = \begin{bmatrix} 1 & 0 & 0 \\ 0 & \cos\alpha & -\sin\alpha \\ 0 & \sin\alpha & \cos\alpha \end{bmatrix},\ R'_y = \begin{bmatrix} \cos\beta & 0 & \sin\beta \\ 0 & 1 & 0 \\ -\sin\beta & 0 & \cos\beta \end{bmatrix} \tag{21}$$

Figure 17:
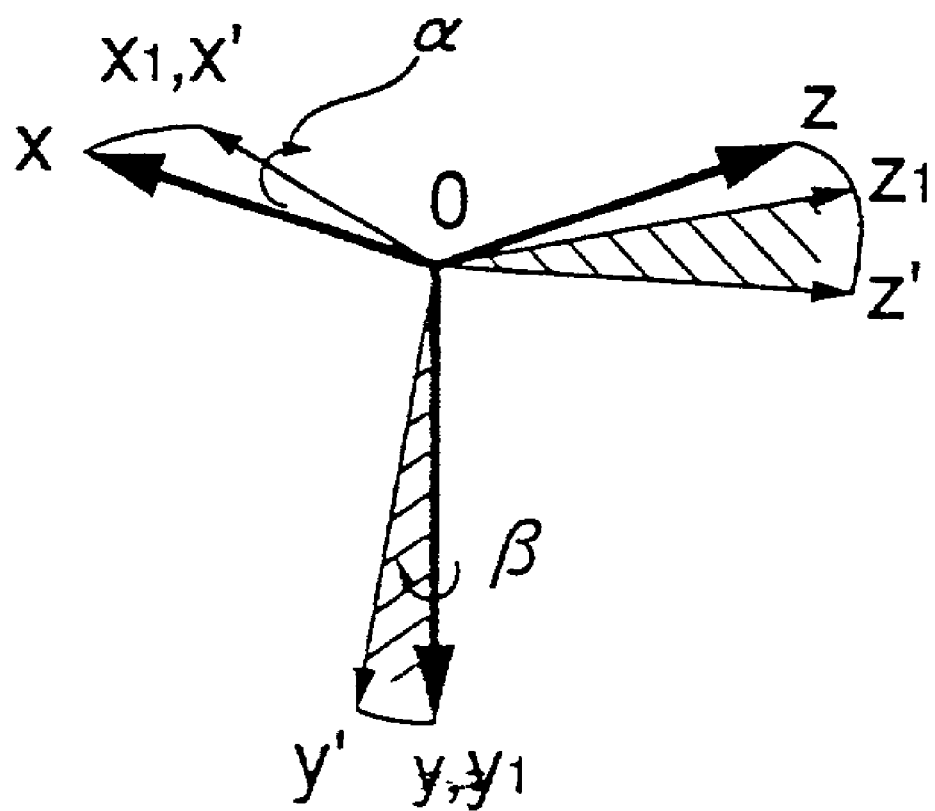
FIG. 17 is a diagram for explaining operation of the parameter computing unit in the image distortion correcting unit of FIG. 11.

FIG. 17 shows a representation of the perspective projection by using the rotation matrix. As shown in FIG. 17, the meaning of the above formulas (20) and (21) is the same as the transformation of the apparatus coordinate system (x, y, z) into a new coordinate system (x', y', z') by the two stages of rotation: (i) and (ii), which follows.

(i) The apparatus coordinate system 33 (x, y, z) is transformed into an intermediate coordinate system (x1, y1, z1) by rotating the apparatus coordinate system 33 around the y axis by a rotation angle "β".

(ii) The intermediate coordinate system (x1, y1, z1) is transformed into the new coordinate system (x', y', z') by rotating the intermediate coordinate system around the x1 axis by a rotation angle "α".

By using the above formulas (19) and (20), the rotation angles "α" and "β" are represented by the following formulas.

$$\alpha = \sin^{-1}(-b) \quad (22)$$

$$\beta = \sin^{-1}\left(\frac{a}{\sqrt{a^2+c^2}}\right) \quad (23)$$

From the above formulas (22) and (23), the rotation angles "α" and "β" are calculated, and the resulting rotation angles "α" and "β" are substituted into the above formulas (20) and (21). This allows the rotation matrix "R'" to be uniquely determined. The rotation matrix "R'" represents the coordinate transformation in which the z axis of the apparatus coordinate system 33 is transformed so as to accord with the direction of the unit binormal vector.

Next, a description will be provided of the calculation of the distortion correction parameters performed by the parameter computing unit 222 in the present embodiment.

As described above, the calculation of the distortion correction parameters is essentially the same as the determination of the perspective projection formula, and each of the pixels of the standard image on the image surface is projected into a pixel on the projection plane by using the perspective projection formula.

To determine the perspective projection formula, a 3D vector "P" expressed on the basis of the apparatus coordinate system 33 at the viewpoint when taking the standard image, the above-described rotation matrix "R'" and the 3D vector "n"=(a, b, c) indicating the direction of the object plane are used. The 3D vector "P" corresponding to one pixel of the standard image on the image surface, as shown in FIG. 15, is extended to the projection plane. Suppose that the point "P", where the extended vector "P" intersects the projection plane, corresponds to a pixel of the image projected onto the projection plane after the coordinate transformation. The 3D vector "P" corresponding to the point "P" on the basis of the apparatus coordinate system 33 is represented by $$P = \frac{k}{ax_s + by_s + cf}\begin{bmatrix} x_s \\ y_s \\ f \end{bmatrix} \quad (k > 0) \quad (24)$$

In the above formula (24), "k" denotes a scaling factor that is indicative of a distance from the optical system center "o" of the imaging unit 11 to the projection plane. Hence, the determination of the scaling factor "k" defines the size of the distortion-corrected image created on the projection plane. The 3D vector "P" in the above formula (24) is expressed on the basis of the apparatus coordinate system 33 at the viewpoint when taking the standard image. By applying the rotation matrix "R'" to the 3D vector "P" as in the following formula, the 3D vector "P" is transformed into a 3D vector "P'" on the basis of the apparatus coordinate system when the imaging unit 11 faces the object plane from the direction perpendicular to the object plane.

$$P' = \begin{bmatrix} X \\ Y \\ Z \end{bmatrix} = R^{i-1}P = \frac{k}{ax_s + by_s + cf}\begin{bmatrix} R'_{11} & R'_{21} & R'_{31} \\ R'_{12} & R'_{22} & R'_{32} \\ R'_{13} & R'_{23} & R'_{33} \end{bmatrix}\begin{bmatrix} x_s \\ y_s \\ f \end{bmatrix} \quad (25)$$

The coordinates (X, Y) of the 3D vector "P'" in the above formula (25) are used as the coordinates of the pixel on the projection plane after the coordinate transformation is performed. Accordingly, each of the pixels of the standard image on the image surface can be projected into the pixel on the projection plane by using the perspective projection formula (25), and the coordinates of each of the pixels of the distortion-corrected image on the projection plane can be obtained. In this manner, the parameter computing unit 222 performs the calculation of the distortion correction parameters by using the perspective projection formula (25).

Finally, in the IDC 22 of FIG. 11, the coordinate transform unit 223 creates a distortion-corrected image on the projection plane by projecting the standard image onto the projection plane through the perspective projection based on the parameters supplied by the parameter computing unit 223.

Specifically, in the present embodiment, the coordinates $(x_s, y_s)$ of each of the pixels of the standard image corresponding to the coordinates (X, Y) after the coordinate transformation are calculated by using the above formula (25), and the pixel value at the coordinate (X, Y) is estimated or interpolated based on the pixel values at the neighboring pixels in the vicinity of the calculated coordinates $(x_s, y_s)$ of that pixel. The interpolation of the pixel value at the coordinate (X, Y) based on the pixel values at the neighboring pixels of the calculated coordinates $(x_s, y_s)$ can be carried out by using a known interpolation method, such as the bilinear interpolation or the B-spline interpolation.

Accordingly, in the image processing method and apparatus of the present embodiment, even when the original image of the object on the object plane is taken from different oblique directions, the correction of the image distortions due to the oblique imaging can be carried out by taking at least two object images (the standard image 7 and the reference image 9 as shown in FIG. 14). By using the SIS 20, one of the plurality of partially overlapping images, having the largest ratio of the object region area to the entire image area, can be easily and suitably selected as the standard image. The image processing method and apparatus of the present embodiment can provide an improved operability for the user.

Further, in the present embodiment, the program code instructions for causing the main control unit 14 to execute the image distortion correction processing of FIG. 5 are stored in, for example, a ROM of the main control unit 14. Upon start of the execution of the image distortion correction processing, the program code instructions are loaded from the ROM to a RAM of the main control unit 14, and the image distortion correction is carried out by the main control unit 14. Hereinafter, the main control unit 14 will be referred to as the computer, for the sake of convenience.

Figure 18A:
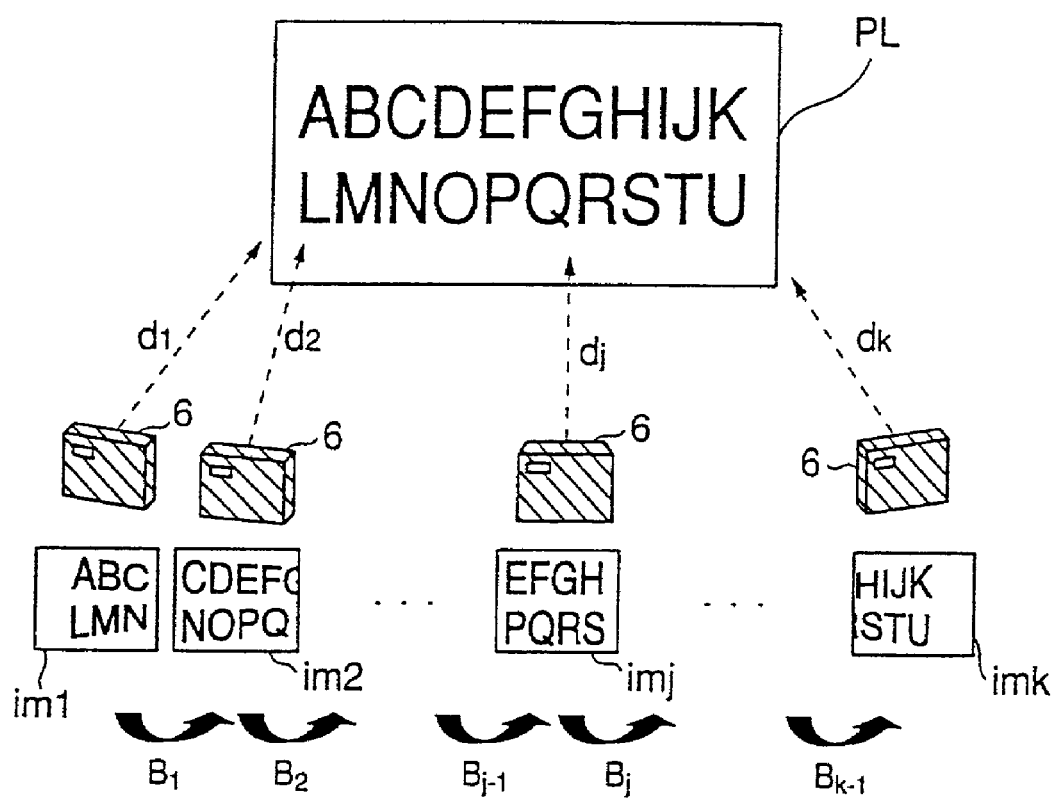
FIG. 18A and FIG. 18B are diagrams for explaining a second preferred embodiment of the image processing method of the invention.
Figure 18B:
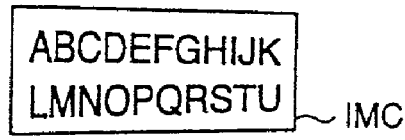

Next, FIG. 18A and FIG. 18B show an image distortion correction of a second preferred embodiment of the image processing method of the invention.

As shown in FIG. 18A, the image processing method of the present embodiment is used to sequentially take "K" partially overlapping still images of an object on the object plane PL at "K" different viewpoints. For example, the image of the object taken from an oblique direction "d1" will be referred to as the image "im1", the image of the object taken from an oblique direction "d2" will be referred to as the image "im2", and so on. The two adjacent images among the "K" images, such as the image "im1" and the image "im2", share a common location of the original image on the object plane PL. In the present embodiment, respective images (one of which is referred to as the image "imj", $1 \leq j \leq K$), which are projected onto an image surface of the image "imk" with respect to each of the "K" images, are combined to the image "imk" so as to form a composite image "IMC" on the image surface of the image "imk" as shown in FIG. 18B. Further, the composite image "IMC" is projected onto the projection plane by using the perspective projection, so that the image distortions caused by the oblique imaging are corrected.

Figure 19:
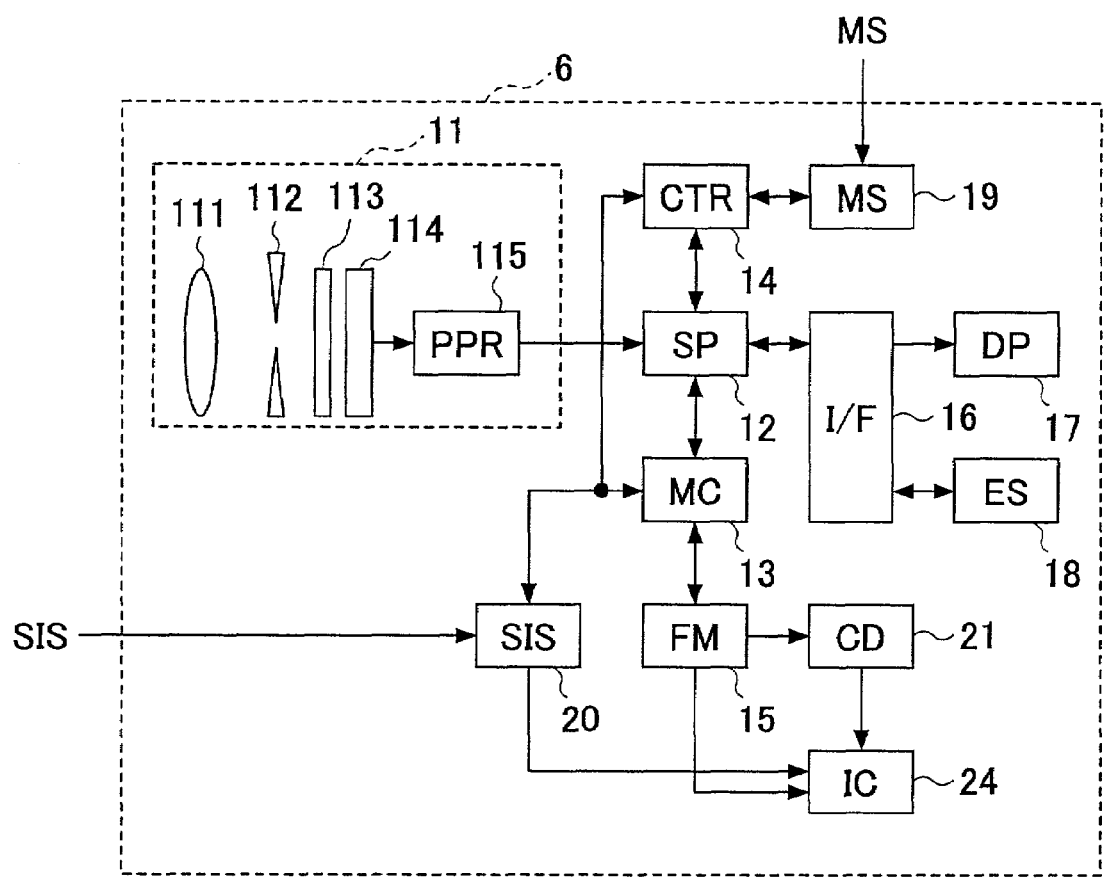
FIG. 19 is a block diagram of a second preferred embodiment of the image processing apparatus of the invention.

FIG. 19 shows a second preferred embodiment of the image processing apparatus of the invention. In FIG. 19, the elements that are essentially the same as corresponding elements in FIG. 3 are designated by the same reference numerals, and a description thereof will be omitted.

As shown in FIG. 19, the image processing apparatus 6 of the present embodiment is essentially the same as the image processing apparatus 1 of the previous embodiment of FIG. 3, except that an image composite unit (IC) 24 is provided instead of the IDC 22 as in the previous embodiment of FIG. 3. In the present embodiment, the IC 24 combines the other partially overlapping images, which are projected onto an image surface of the standard image with respect to each of the other partially overlapping images, so that a composite image is generated on the image surface, so as to correct the image distortions in the standard image. Similar to the previous embodiment of FIG. 3, the CD 21 determines the feature point of one of the plurality of partially overlapping points, and determines a matched point of one of the other partially overlapping images. The IC 24 calculates a direction of the object plane is calculated based on the feature point and the matched point determined by the CD 21.

Figure 20:
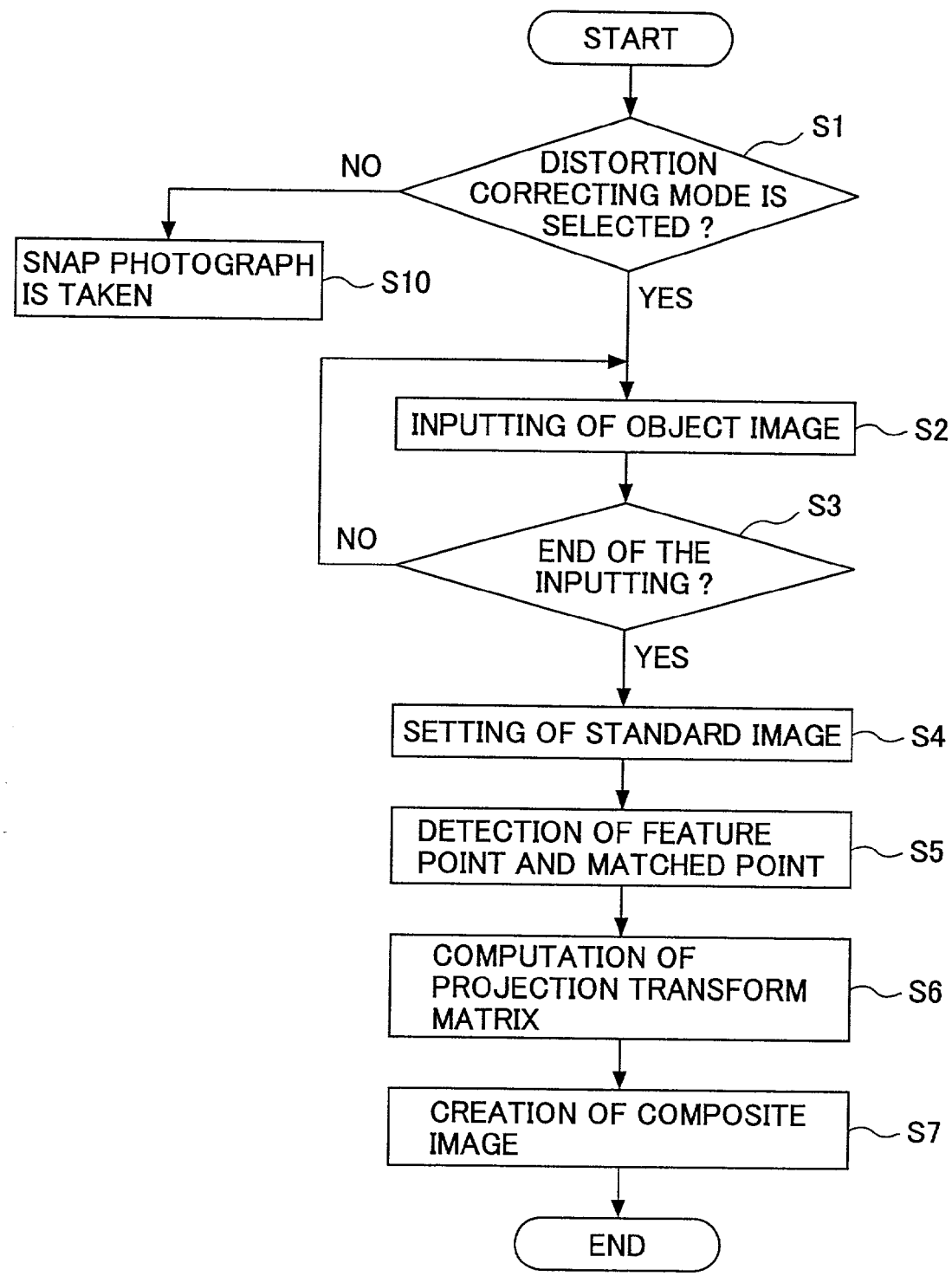
FIG. 20 is a flowchart for explaining operation of the image processing apparatus of the present embodiment.

FIG. 20 is a flowchart for explaining operation of the image processing apparatus 6 of the present embodiment.

As shown in FIG. 20, the main control unit 14 at step S1 determines whether the distortion correcting mode is selected by the user by turning ON the mode setting key 104. When the result at the step S1 is negative, step S10 sets the image processing apparatus 1 in the normal imaging mode wherein a snap photograph of a desired object is taken.

When the result at the step S1 is affirmative, step S2 requests the user to input the object image, which is taken from the original image of an object on the object plane PL by using the imaging unit 11. It is necessary that a plurality of object images be input to the image processing apparatus 1, the plurality of object images including at least a pair of partially overlapping first and second images that are taken from different oblique directions, and the two images sharing a common location of the original image on the object plane PL.

Step S3 determines whether the inputting of the object image to the image processing apparatus 1 is finished according to the user's operation. When the result at the step S3 is negative, the control is transferred to the step S2. The inputting of the object image to the image processing apparatus 1 is repeated until the result at the step S3 is affirmative. When the result at the step S3 is affirmative, the control is transferred to the next step S4. In the present embodiment, the above-mentioned operation is performed by turning ON the mode setting key 104 again.

After the inputting of the plurality of object images (or the partially overlapping first and second images) to the image processing apparatus 1 is performed, step S4 performs the setting of a standard image. In this step, one of the plurality of object images is manually or automatically selected as the standard image that contains the smallest amount of image distortions among the plurality of partially overlapping images. In the present embodiment, the standard image setting unit (SIS) 20 carries out the setting of the standard image at the step S4, which is the same as that in the previous embodiment of FIG. 5. For the sake of convenience, suppose that the image "imj" in the example of FIG. 18 is selected as the standard image, and that the image "imj" has the smallest amount of image distortions among the plurality of partially overlapping images "im1" through "imk".

After the step S4 is performed, the main control unit (CTR) 14 at step S5 controls the correspondence detecting unit (CD) 21 so that the CD 21 determines a feature point of the standard image (or the selected one of the plurality of partially overlapping images) corresponding to the common location of the original image, and determines a matched point of one of the other partially overlapping images corresponding to the feature point. After the step S5 is performed, step S6 performs the computation of the perspective projection transform matrix. After the step S6 is performed, step S7 generates a composite image on the image surface of the standard image so as to correct the image distortions in the standard image. After the step S7 is performed, the process of FIG. 20 ends.

In the present embodiment, the IC 24 performs the computation of the perspective projection transform matrix and the creation of the composite image, which will be described later.

Figure 21:
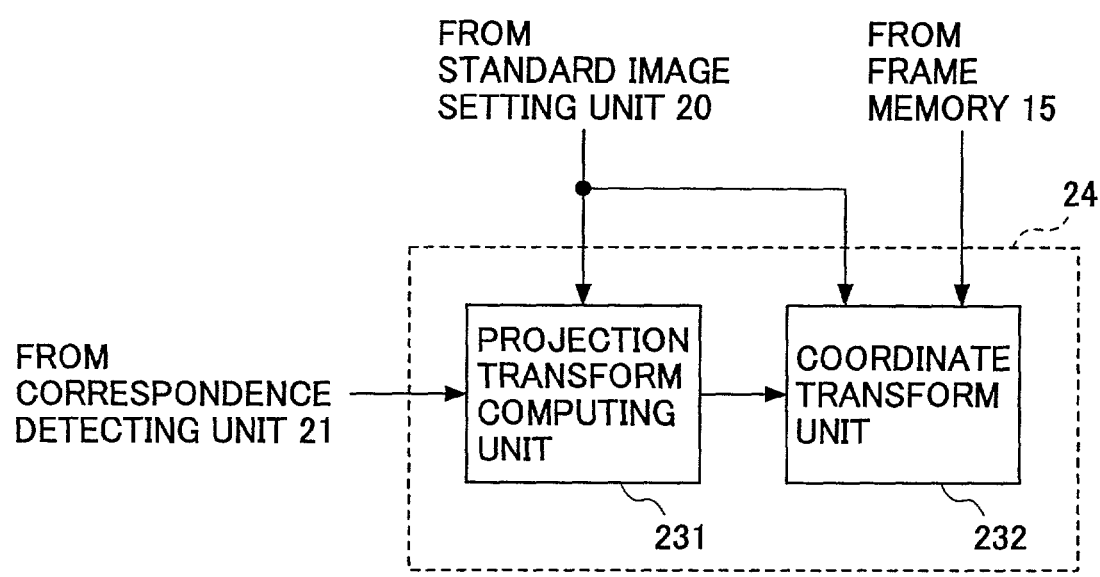
FIG. 21 is a block diagram of an image composition unit in the image processing apparatus of FIG. 19.

FIG. 21 is a block diagram of the image composition unit (IC) 24 in the image processing apparatus of FIG. 19.

As shown in FIG. 21, the IC 24 generally includes a projection transform computing unit 231 and a coordinate transform unit 241. In the image processing apparatus 6 of the present embodiment, the SIS 20 and CD 21 are connected to inputs of the projection transform computing unit 231. The SIS 20, the FM 15 and the projection transform computing unit 231 are connected to inputs of the coordinate transform unit 241.

In the IC 24 of FIG. 21, the projection transform computing unit 231 calculates the 3D data of the object plane and the 3D data of the respective image surfaces of the "K" images based on the relation between the feature point and the matched point supplied by the correspondence detecting unit (CD) 21. The projection transform computing unit 231 calculates the distortion correction parameters based on the 3D data of the object plane and the 3D data of the respective image surfaces.

Further, the coordinate transform unit 232 creates a distortion-corrected composite image on the projection plane by projecting the composite image onto the projection plane through the perspective projection based on the parameters supplied by the projection transform computing unit 231. For the creation of the distortion-corrected composite image, the coordinate transform unit 232 uses the (K-1) perspective projection matrixes $B_1, B_2, \ldots, B_{K-1}$ for the (K-1) pairs of the standard image and the reference image, which are supplied by the FM 15.

More specifically, the perspective projection matrix for projecting the image "imn" (n=1 to k-1) onto the image "im(n+1)" is represented by "$B_n$", and the perspective projection matrix for projecting the image "imn" onto the image "imj" is represented by $$B_{n \to j}$$

The projection transform computing unit 231 calculates the perspective projection matrixes based on the following formula:

$$B_{n-j} = \begin{cases} \prod_{l=n}^{j-1} B_l & (n < j) \\ \left( \prod_{l=j}^{n-1} B_l \right)^{-1} & (n > j) \end{cases} \quad (26)$$

The projection transform computing unit 231 calculates a set of 3D parameters {R, t, n} of the object plane and the image surfaces of the standard image and the reference image for each (called the image "J") of the "K" images based on the relation between the feature point and the matched point supplied by the CD 21. The projection transform computing 231 uses the following perspective projection matrix B for each of the "K" images, and performs the calculations of the above formula (26) to obtain the 3D parameters {R, t, n} for each of the "K" images.

The projection transform computing 231 of the present embodiment performs the calculations of the above formula (26) based on the 3D data of the object plane and the 3D data of the image surfaces (or the 3D parameters {R, t, n}), in order to obtain the distortion correction parameters.

The coordinate transform unit 232 of the present embodiment generates the distortion-corrected composite image on the projection plane by projecting the composite image onto the projection plane through the perspective projection based on the 3D parameters supplied by the projection transform computing unit 231. More specifically, in the present embodiment, the coordinates $(x_s, y_s)$ of each of the pixels of the standard image corresponding to the coordinates (X, Y) after the coordinate transformation are calculated by using the following formula, $$\begin{bmatrix} x \\ y \\ 1 \end{bmatrix} = sB_{n-j}^{-1} \begin{bmatrix} X \\ Y \\ 1 \end{bmatrix} \quad (27)$$

In the above formula (27), "s" is a coefficient that makes the value of the third element of the left-side vector of the formula (27) equal to 1. Next, the pixel value at the coordinate (X, Y) is estimated or interpolated based on the pixel values at the neighboring pixels in the vicinity of the calculated coordinates $(x_s, y_s)$ of that pixel. The interpolation of the pixel value at the coordinate (X, Y) based on the pixel values at the neighboring pixels of the calculated coordinates $(x_s, y_s)$ can be carried out by using the known interpolation method, such as the bilinear interpolation or the B-spline interpolation.

In the above-described embodiment, the standard image is selected from the plurality of partially overlapping images after the inputting of the partially overlapping images (the object images) is performed. Alternatively, the selection of the standard image may be performed before the inputting of the partially overlapping images (the object images) is performed. A description will now be given of a third preferred embodiment of the image processing apparatus of the invention in which the selection of the standard image is performed before the inputting of the object images is performed.

Figure 22:
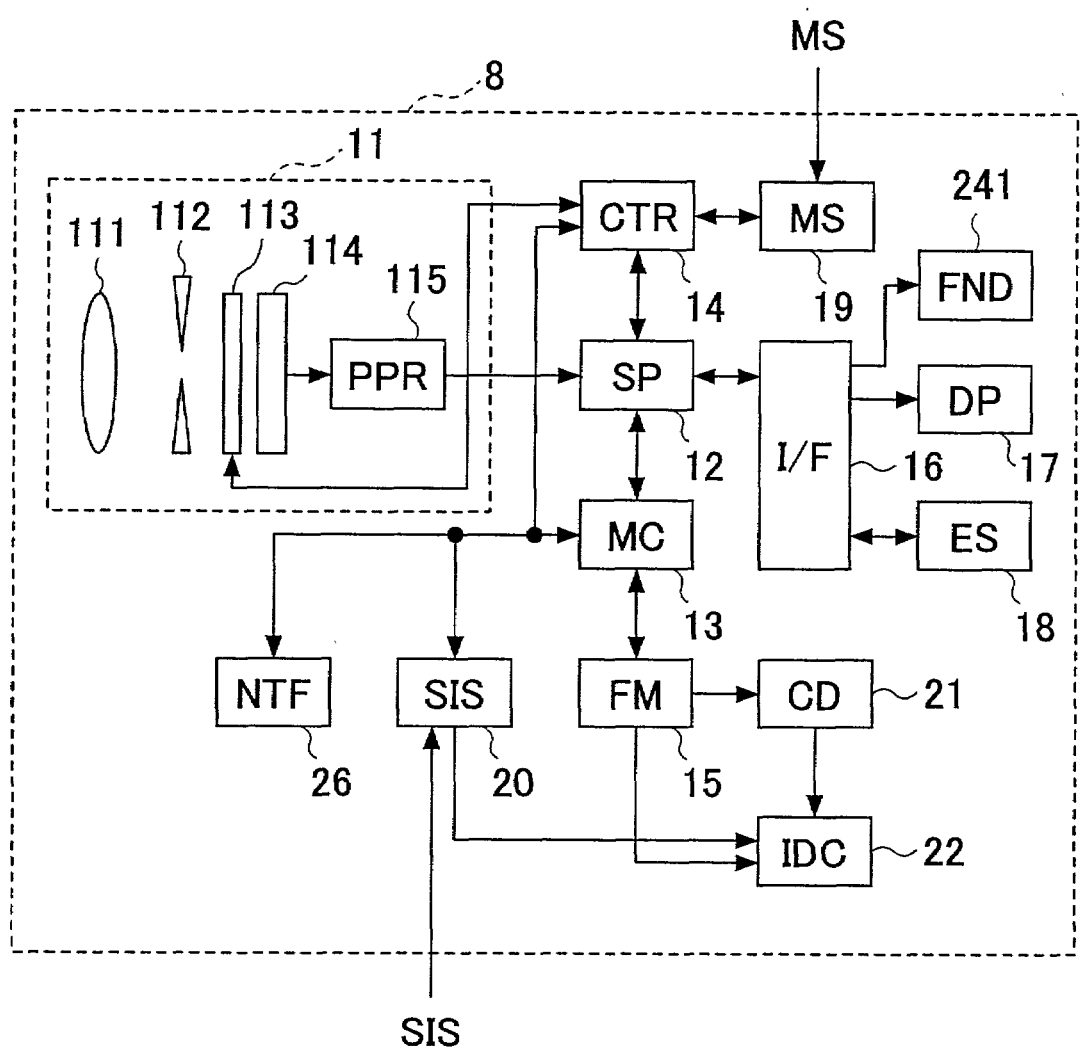
FIG. 22 is a block diagram of a third preferred embodiment of the image processing apparatus of the invention.

FIG. 22 is a block diagram of the third preferred embodiment of the image processing apparatus of the invention. In FIG. 22, the elements that are essentially the same as corresponding elements in FIG. 3 are designated by the same reference numerals, and a description thereof will be omitted.

As shown in FIG. 22, the image processing apparatus 8 of the present embodiment is essentially the same as the image processing apparatus 1 of the previous embodiment of FIG. 3, except that a notification unit (NTF) 26 and a finder (FND) 241 are provided in addition to the elements in the previous embodiment of FIG. 3. In the present embodiment, the SIS 20 is configured such that a user is requested to select the standard image when taking the original image from one of the oblique directions. The notification unit 26 notifies the user that the standard image is currently taken, which will be described later.

In the image processing apparatus 8 of FIG. 22, the notification unit 26 is connected to each of the main control unit 14 and the SIS 20. Further, the shutter 113 of the imaging unit 11 and the interface unit 16 are connected to the main control unit 14, and the finder 241 and the interface unit 16 are connected to each other.

Figure 23:
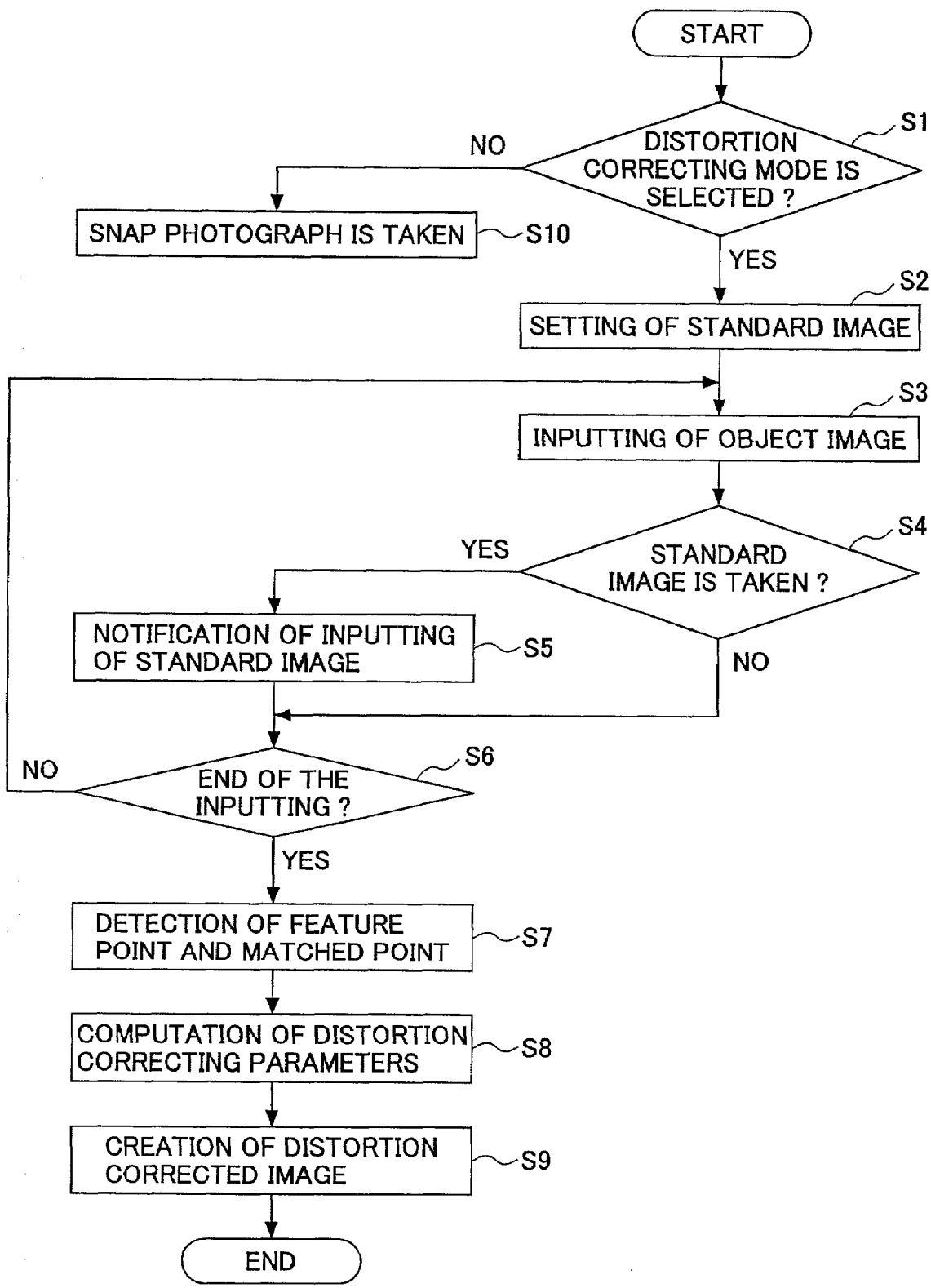
FIG. 23 is a flowchart for explaining operation of the image processing apparatus of the present embodiment.
Figure 24:
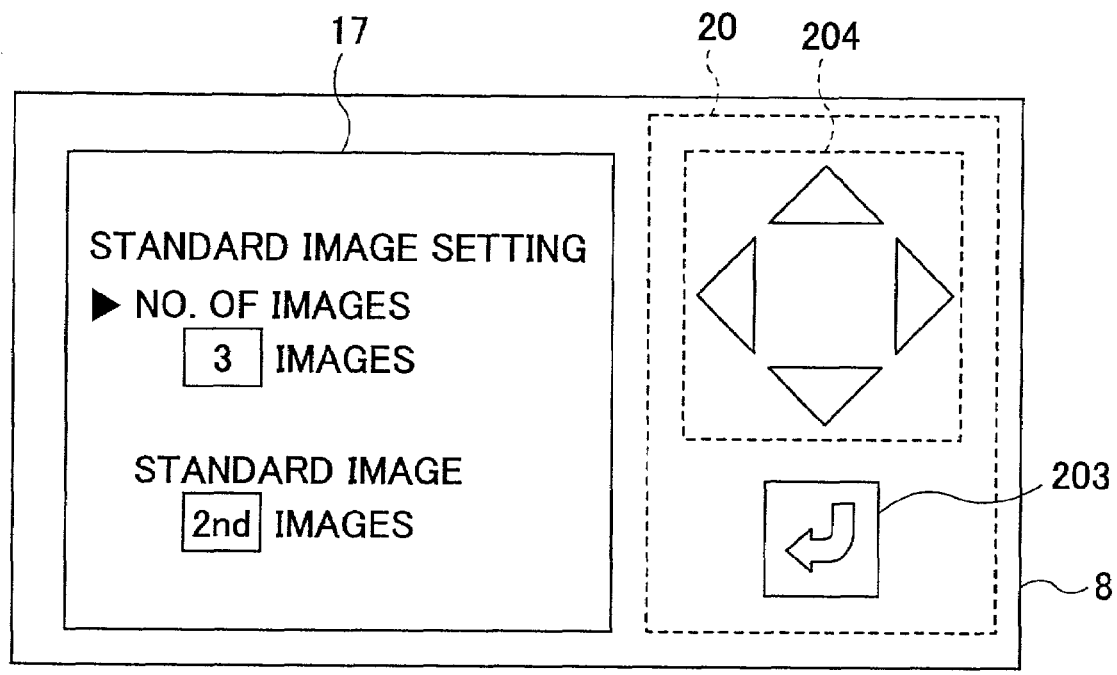
FIG. 24 is a diagram for explaining standard image setting operations that are provided to a standard image setting unit in the image processing apparatus of FIG. 22.
Figure 25:
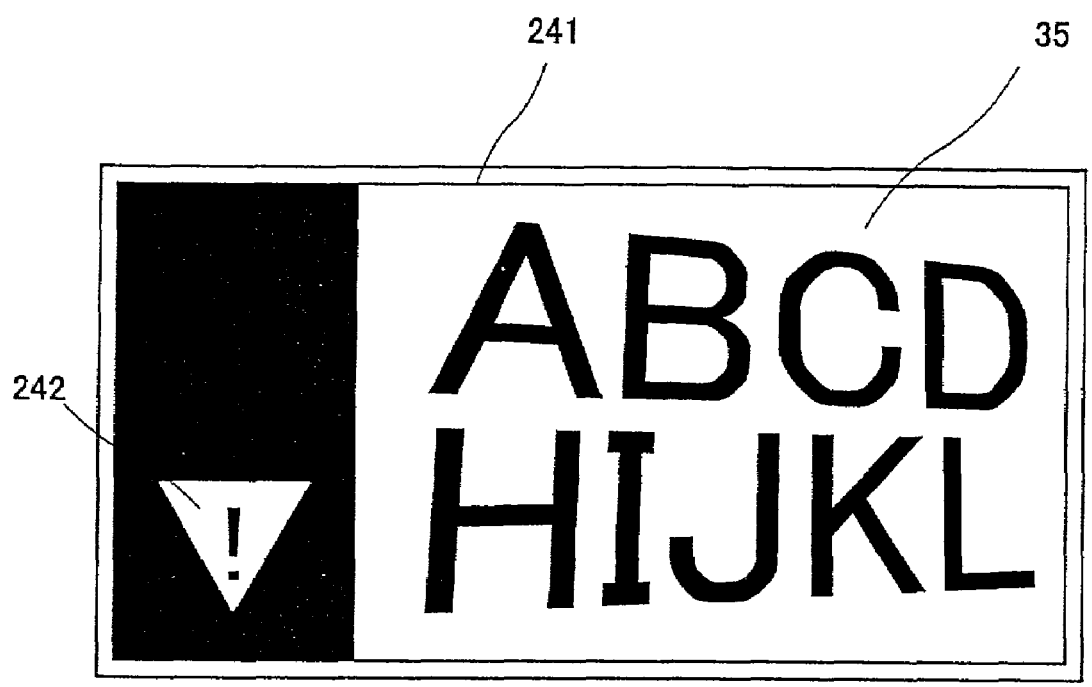
FIG. 25 is a diagram for explaining operation of a notification unit in the image processing apparatus of FIG. 22.

FIG. 23 is a flowchart for explaining operation of the image processing apparatus 8 of the present embodiment. FIG. 24 is a diagram for explaining standard image setting operations that are provided to the SIS 20 in the image processing apparatus 8 of FIG. 22. FIG. 25 is a diagram for explaining operation of the notification unit 26 in the image processing apparatus 8 of FIG. 22.

As shown in FIG. 23, the main control unit 14 at step S1 determines whether the distortion correcting mode is selected by the user by turning ON the mode setting key 104. When the result at the step S1 is negative, step S10 sets the image processing apparatus 1 in the normal imaging mode wherein a snap photograph of a desired object is taken.

When the result at the step S1 is affirmative, step S2 controls the SIS 20 so that the SIS 20 performs the setting of a standard image. In this step, one of the plurality of object images is manually or automatically selected as the standard image that contains the smallest amount of image distortions among the plurality of partially overlapping images. In the present embodiment, the SIS 20 carries out the setting of the standard image at the step S2, which is the same as that in the previous embodiment of FIG. 5. As shown in FIG. 24, the SIS 20 is provided with cursor keys 204 and the enter key 203. At the step S2, the operational message "STANDARD IMAGE SETTING" is displayed on the display unit 17, as well as the number of the object images taken by the user, and the identification of the standard image set by the user.

After the step S2 is performed, step S3 requests the user to input the object image, which is taken from the original image of an object on the object plane PL by using the imaging unit 11. When the object image is input to the image processing apparatus 8, the main control unit at step S4 determines whether the standard image is taken from the original image by the user. When the enter key 203 is turned ON by the user after the setting of the standard image is done, the result at the step S4 is affirmative, and the control is transferred to the next step S5. Otherwise the result at the step S4 is negative, and the control is transferred to the step S6 and the step S5 is not performed.

Step S5 controls the finder 241 so that the finder 241 notifies the user that the standard image is currently taken. As shown in FIG. 25, an appropriate indicator 242 is displayed on the finder 241 at a sidewise location of the object image 35 within the finder 241.

After the step S5 is performed, step S6 determines whether the inputting of the object image to the image processing apparatus 1 is 5 finished according to the user's operation. When the result at the step S6 is negative, the control is transferred to the step S3. The inputting of the object image to the image processing apparatus 1 is repeated until the result at the step S6 is affirmative. When the result at the step S6 is affirmative, the control is transferred to the next step S7.

After the inputting of the plurality of object images (or the partially overlapping first and second images) to the image processing apparatus 1 is performed, the main control unit (CTR) 14 at step S7 controls the CD 21 so that the CD 21 determines a feature point of the standard image (or the selected one of the plurality of partially overlapping images) corresponding to the common location of the original image, and determines a matched point of one of the other partially overlapping images corresponding to the feature point. After the step S7 is performed, step S8 performs the computation of the perspective projection transform matrix. After the step S8 is performed, step S9 generates controls at step S7 the IDC 22 so that the IDC 22 generates a distortion-corrected image on the projection plane, which is parallel to thee object plane, by projecting the standard image onto the projection plane through a perspective projection based on the calculated direction of the object plane. That is, the distortion-corrected image created by the IDC 22 is essentially the same as the image of the object that is taken by the imaging unit 11 from the direction perpendicular to the object plane, not from the oblique direction. After the step S9 is performed, the process of FIG. 23 ends.

According to the image processing apparatus 8 of the present embodiment, it is possible to provide an improved operability for the user in performing the selection of the standard image from the plurality of partially overlapping images.

Figure 26:
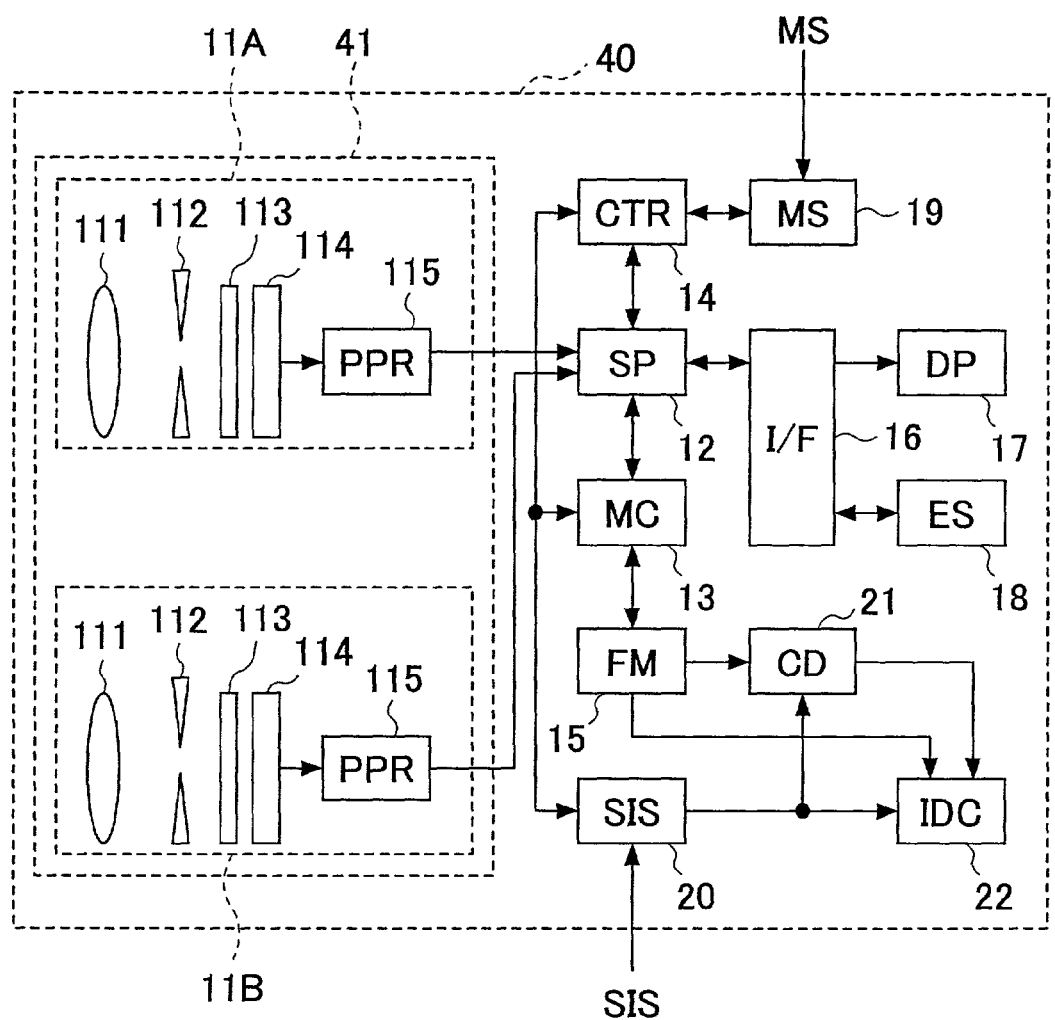
FIG. 26 is a block diagram of a fourth preferred embodiment of the image processing apparatus of the invention.

FIG. 26 is a block diagram of a fourth preferred embodiment of the image processing apparatus of the invention.

As shown in FIG. 26, the image processing apparatus 40 of the present embodiment generally includes an imaging device 41, the signal processing unit (SP) 12, the memory control unit (MC) 13, the main control unit (CTR) 14, the frame memory (FM) 15, the interface unit (I/F) 16, the display unit (DP) 17, the external storage (ES) 18, the mode setting unit (MS) 19, the standard image setting unit (SIS) 20, the correspondence detecting unit (CD) 21, and the image distortion correcting unit (IDC) 22. In the present embodiment, the imaging device 41 is configured to include a first imaging unit 11A and a second imaging unit 11B. Each of the first and second imaging units 11A and 11B includes the optical system elements 111 through 115 that are essentially the same as corresponding elements of the imaging unit 11 in the previous embodiment of FIG. 3.

Figure 27:
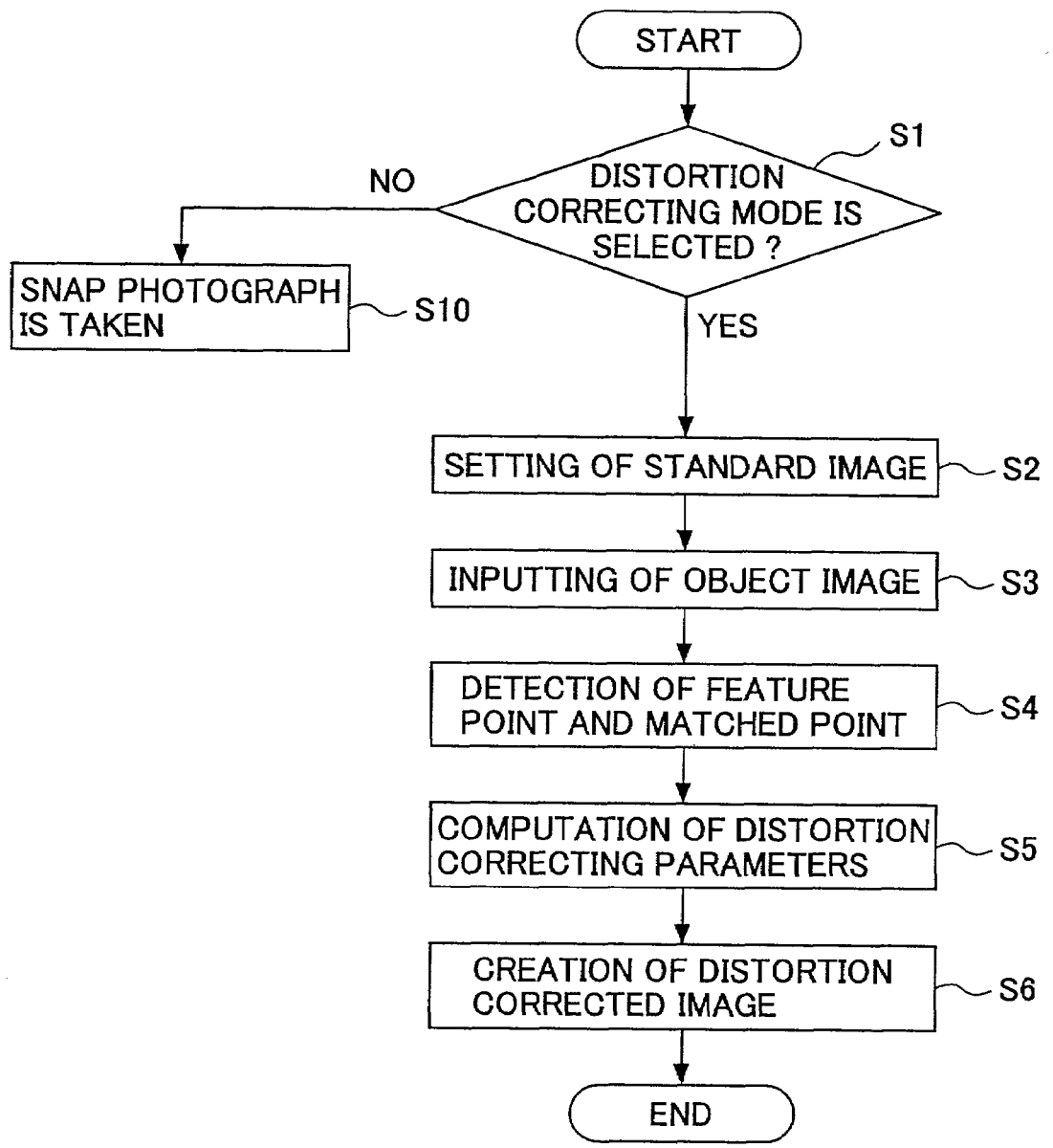
FIG. 27 is a flowchart for explaining operation of the image processing apparatus of the present embodiment.
Figure 28:
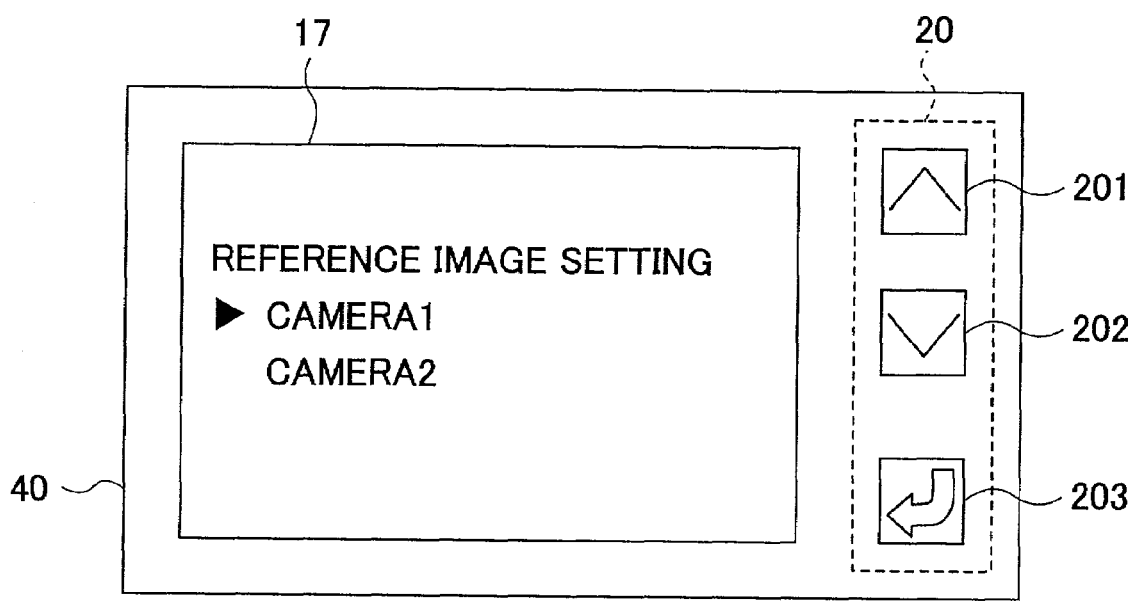
FIG. 28 is a diagram for explaining standard image setting operations that are provided to a standard image setting unit in the image processing apparatus of FIG. 26.

FIG. 27 is a flowchart for explaining operation of the image processing apparatus 40 of the present embodiment. FIG. 28 is a diagram for explaining standard image setting operations that are provided to the SIS 20 in the image processing apparatus 40 of FIG. 26.

As shown in FIG. 27, the main control unit 14 at step S1 determines whether the distortion correcting mode is selected by the user by turning ON the mode setting key 104. When the result at the step S1 is negative, step S10 sets the image processing apparatus 1 in the normal imaging mode wherein a snap photograph of a desired object is taken.

When the result at the step S1 is affirmative, step S2 controls the SIS 20 so that the SIS 20 performs the setting of a standard image. In this step, one of the plurality of object images is manually or automatically selected as the standard image that contains the smallest amount of image distortions among the plurality of partially overlapping images. In the present embodiment, the SIS 20 carries out the setting of the standard image at the step S2, which is the same as that in the previous embodiment of FIG. 5. As shown in FIG. 28, the SIS 20 is provided with the up scroll key 201, the down scroll key 202 and the enter key 203. At the step S2, the operational message "STANDARD IMAGE SETTING" is appears on the display unit 17 together with the two indicators "CAMERA 1" (corresponding to the first imaging unit 11A) and "CAMERA 2" (corresponding to the second imaging unit 11B) for the user's choice of the setting of the standard image.

After the step S2 is performed, step S3 requests the user to input the object image, which is taken from the original image of an object on the object plane PL by using the selected one of the imaging units 11A and 11B. When the object image is input to the image processing apparatus 8, the main control unit determines that the standard image is taken from the original image by the user. When the enter key 203 is turned ON by the user after the setting of the standard image is done, the control is transferred to the next step S4.

After the inputting of the plurality of object images (or the partially overlapping first and second images) to the image processing apparatus 1 is performed, the main control unit (CTR) 14 at step S4 controls the CD 21 so that the CD 21 determines a feature point of the standard image (or the selected one of the plurality of partially overlapping images) corresponding to the common location of the original image, and determines a matched point of one of the other partially overlapping images corresponding to the feature point. After the step S4 is performed, step S5 performs the computation of the perspective projection transform matrix. After the step S5 is performed, step S6 controls the IDC 22 so that the IDC 22 generates a distortion-corrected image on the projection plane, which is parallel to thee object plane, by projecting the standard image onto the projection plane through a perspective projection based on the calculated direction of the object plane. After the step S6 is performed, the process of FIG. 27 ends.

According to the image processing apparatus 40 of the present embodiment, the imaging device 41, including the first and second imaging units 11a and 11B, is used, and it is possible to provide a further improved operability for the user in performing the selection of the standard image from the plurality of partially overlapping images.

Further, the imaging device 41 in the image processing apparatus 40 of FIG. 26 may include three or more imaging units, each including the optical system that is essentially the same as that of the previous embodiment of FIG. 3. The imaging device 41 of the present embodiment may be applied to the image processing apparatus 6 of the previous embodiment of FIG. 19.

Further, in the above-described embodiments, the plurality of partially overlapping images, which are recorded onto a storage medium such as a hard disk or a CD-ROM, may be read and loaded to the external storage (ES) 18 of the image processing apparatus. The image distortion correcting processing that is the same as that of the above-described embodiments can be carried out with the plurality of partially overlapping images stored in the ES 18. Further, in the above-described embodiments, the MS 19, the SIS 20, the CD 21, the IDC 22, and the IC 24 may be provided in the image processing apparatus such that they are separated from the imaging unit 11 or the imaging device 41.

Figure 29:
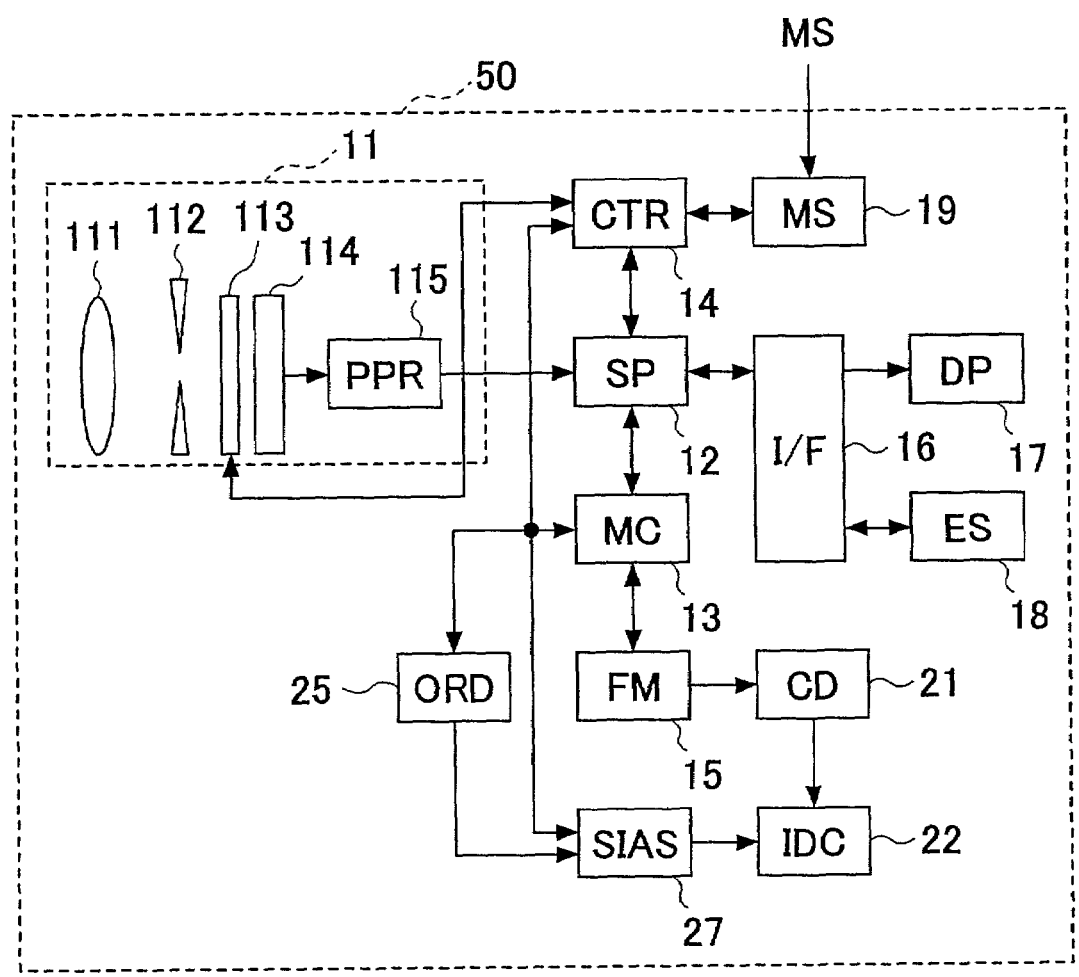
FIG. 29 is a block diagram of a fifth preferred embodiment of the image processing apparatus of the invention.

FIG. 29 is a block diagram of a fifth preferred embodiment of the image processing apparatus of the invention.

As shown in FIG. 29, the image processing apparatus 50 of the present embodiment is configured such that an object region determining unit (ORD) 25 and a standard image automatic setting unit (SIAS) 27 are provided instead of the SIS 20 of FIG. 3, the ORD 25 and the SIAS 27 are connected to the main control unit 14, an output of the ORB 25 is connected to the SIAS 27, and an output of the SIAS 27 is connected to the IDC 22.

Figure 30:
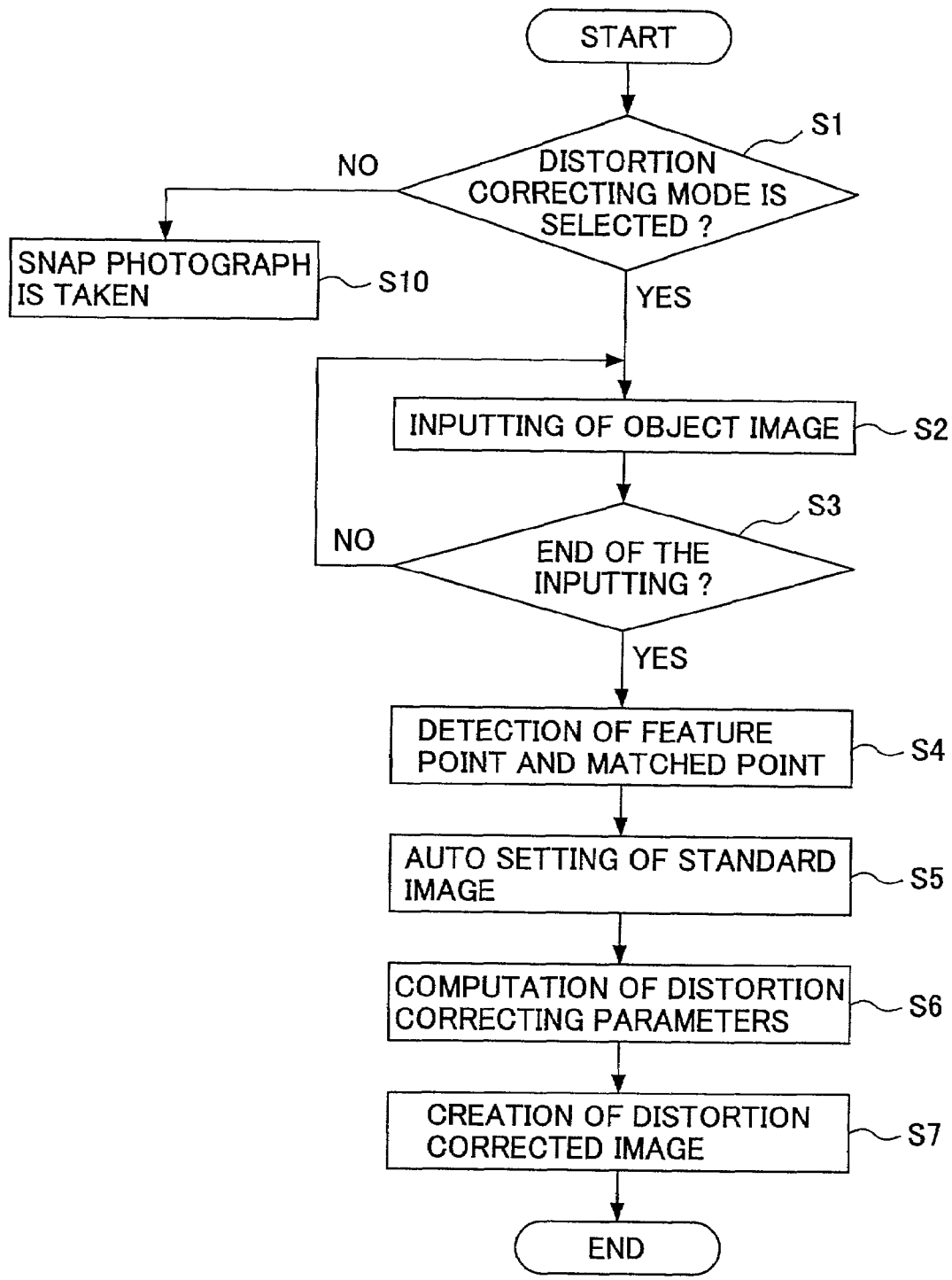
FIG. 30 is a flowchart for explaining operation of the image processing apparatus of the present embodiment.

FIG. 30 is a flowchart for explaining operation of the image processing apparatus 50 of the present embodiment.

As shown in FIG. 30, the main control unit 14 at step S1 determines whether the distortion correcting mode is selected by the user by turning ON the mode setting key 104. When the result at the step S1 is negative, step S10 sets the image processing apparatus 1 in the normal imaging mode wherein a snap photograph of a desired object is taken.

When the result at the step S1 is affirmative, step S2 requests the user to input, to the image processing apparatus 50, the object image taken from the original image of the object on the object plane. It is necessary that the plurality of object images be input to the image processing apparatus 50, the plurality of object images including at least a pair of partially overlapping first and second images which share a common location of the original image on the object plane.

After the step S2 is performed, step S3 determines whether the inputting of the object image to the image processing apparatus 50 is finished according to the user's operation. When the result at the step S3 is negative, the control is transferred to the step S2. The inputting of the object image to the image processing apparatus 50 is repeated until the result at the step S3 is affirmative.

When the result at the step S3 is affirmative, the main control unit 14 at step S4 controls the CD 21 so that the CD 21 the CD 21 determines a feature point of the standard image (or the selected one of the plurality of partially overlapping images) corresponding to the common location of the original image, and determines a matched point of one of the other partially overlapping images corresponding to the feature point.

After the step S4 is performed, step S5 controls the SIAS 27 so that the SIAS 27 performs the automatic setting of a standard image. In this step, one of the plurality of object images is automatically selected as the standard image that contains the smallest amount of image distortions among the plurality of partially overlapping images. In the present embodiment, the SIAS 20 carries out the automatic setting of the standard image, at the step S5, based on the feature point and the matched point determined by the CD 21.

After the step S5 is performed, step S6 controls the IDC 22 so that the IDC 22 performs the computation of the image distortion correcting parameters based on the feature point and the matched point determined by the CD 21. After the step S6 is performed, step S7 controls the IDC 22 so that the IDC 22 generates a distortion-corrected image on the projection plane, which is parallel to thee object plane, by projecting the standard image onto the projection plane through a perspective projection based on the calculated direction of the object plane. After the step S7 is performed, the process of FIG. 30 ends.

According to the image processing apparatus 50 of the present embodiment, the standard image automatic setting unit 27 is provided to automatically select one of the plurality of partially overlapping images as the standard image based on the feature point and the matched point determined by the CD 21, and it is possible to provide a further improved operability for the user in performing the selection of the standard image from the plurality of partially overlapping images.

Figure 31A:
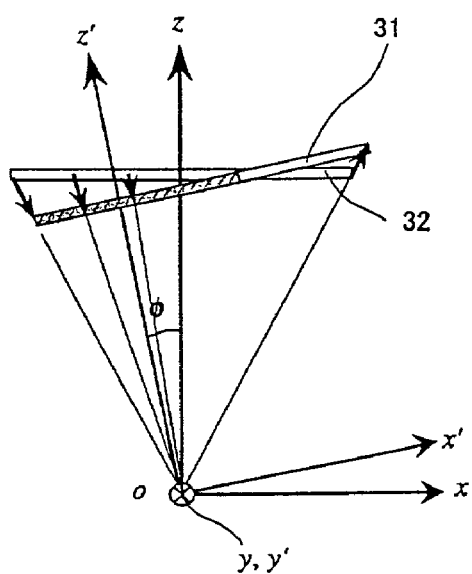
FIG. 31A and FIG. 31B are diagrams for explaining an image distortion that depends on the degradation of the resolution of the image processing apparatus.
Figure 31B:
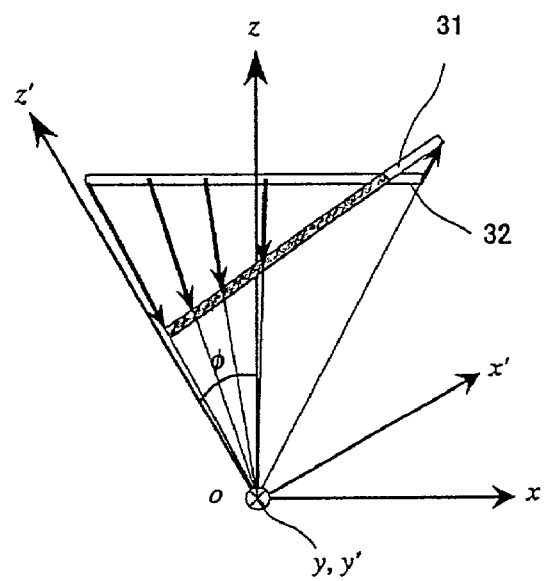

FIG. 31A and FIG. 31B are diagrams for explaining an image distortion that depends on the degradation of the resolution of the image processing apparatus.

The IDC 22 of the image processing apparatus 50 of FIG. 29 performs the coordinate transformation according to the above formula (25) so that the creation of a distortion-corrected image is performed. Generally, the operation of the image distortion correction is varied depending on the degradation of the resolution of the image processing apparatus. For the sake of simplicity of description, suppose that the inclination angle φ between the direction of the object plane and the direction of the image surface is variable only around the y-axis direction, and that the size of the projection plane 31, which is parallel to the object plane, is equal to the size of the image surface 32.

As shown in FIG. 31A, when the inclination angle φ is relatively small, the point in the vicinity of the left-end edge of the image surface 32 is projected onto the projection plane 31, which is indicated by a change of the vector toward the origin "o" of the coordinate system. In this case, the resolution of the object image will be degraded by the coordinate transformation.

As shown in FIG. 31B, when the inclination angle φ is relatively large, the point in the vicinity of the left-end edge of the image surface 32 is projected onto the projection plane 31, which is indicated by a larger change of the vector toward the origin "o" of the coordinate system. In this case, the range in which the resolution of the object image will be degraded by the coordinate transformation is increased as indicated by the shaded area in FIG. 31B.

In the image processing apparatus 50 of FIG. 29, the ORD 25 acquires an object region of the object image, taken by the imaging unit 11, by using the image segmentation process, which is known from the above-mentioned document "Computer Image Processing and Recognition". In the document, four kinds of the image segmentation method: (a) clustering is performed on the image (e.g., the region division method); (b) clustering is performed on the characteristic space (e.g., the histogram based region division method); (c) edges of the image are used (e.g., contour line tracing); (d) texture analysis are explained. An appropriate one of the image segmentation methods is applied to the ORD 25 of the image processing apparatus 50. When the image segmentation is performed, the image of the object is divided into regions of picture elements, the individual regions having distinctive intensity characteristics depending on the image taken by the imaging device. If the object surface is rectangular and the coordinates of the vertexes of the four corners of the object in the image are externally supplied to the ORD 25, the object region can be uniquely determined by the ORD 25.

In the image processing apparatus 50 of FIG. 29, the data signal indicating the object region determined by the ORD 25 is supplied to the IDC 22 through the SIAS 27. In response to the received data signal, the IDS 22 automatically selects the object image having the largest ratio of the area of the object region to the entire area of the image as the standard image from among the plurality of object images (or the partially overlapping first and second images).

Figure 32:
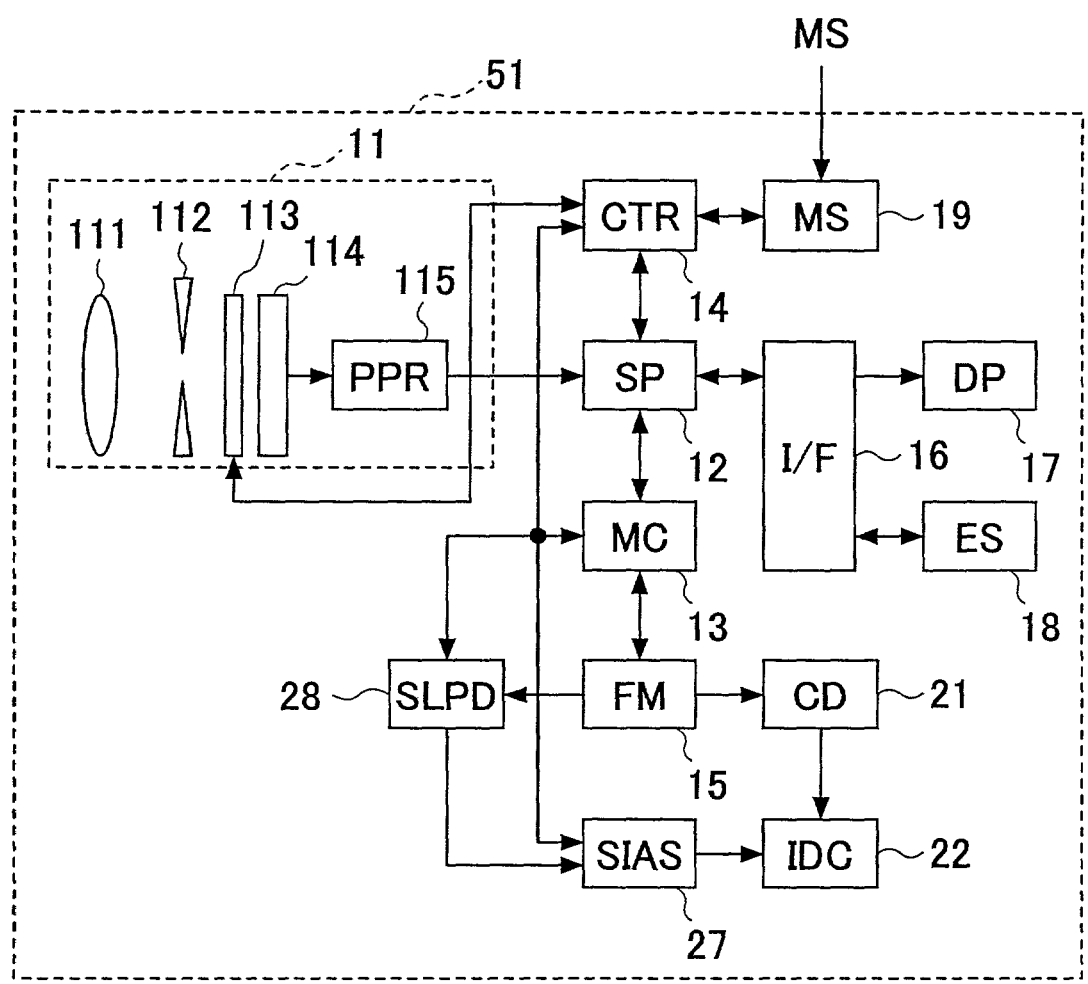
FIG. 32 is a block diagram of a variation of the fifth preferred embodiment of the image processing apparatus.

FIG. 32 is a block diagram of a variation of the fifth preferred embodiment of the image processing apparatus. As shown in FIG. 32, the image processing apparatus 51 of the present embodiment is configured such that a straight-line pattern detecting unit (SLPD) 28 is provided instead of the ORD 25 of FIG. 29, the SLPD 28 and the SIAS 27 are connected to the main control unit 14, and the SLPD 28 is connected to the IDC 22 through the SIAS 27.

In the image processing apparatus 51 of FIG. 32, the SLPD 28 detects a direction of a straight-line pattern contained in the object image, taken from the original image of the object on the object plane by applying the straight-line pattern to the following formula.

$$ax+by+c=0 \ (a^2+b^2=1) \quad (28)$$

Based on the direction of the straight-line pattern detected by the SLPD 28, the IDC 22 automatically selects one of the plurality of object images (or the partially overlapping first and second images) as the standard image.

Figure 33:
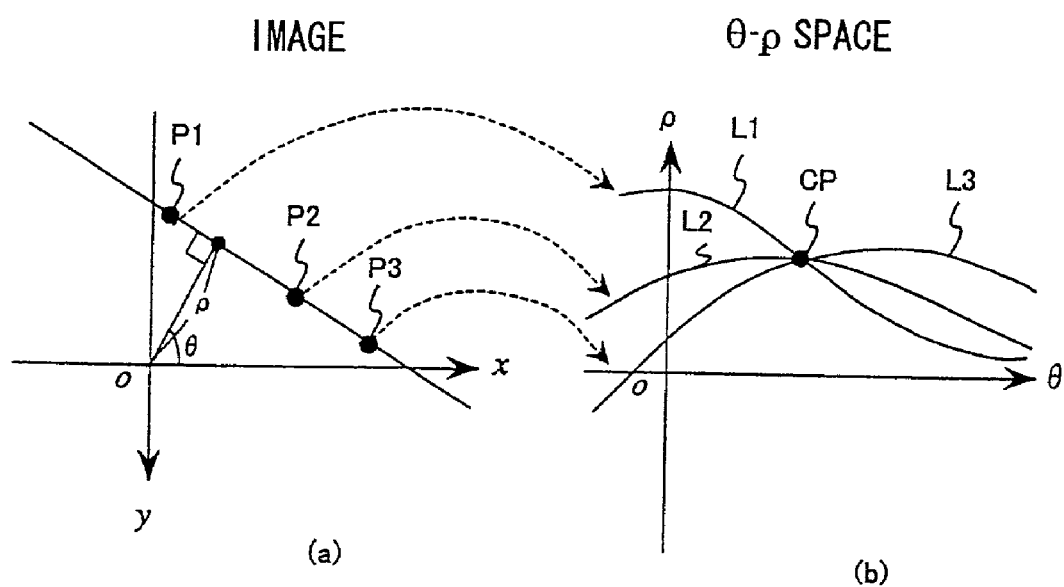
FIG. 33 is a diagram for explaining Hough transform used by the image processing method of the present embodiment.

FIG. 33 is a diagram for explaining Hough transform used by the image processing method of the present embodiment.

Alternatively, in the image processing apparatus 51 of FIG. 32, the SLPD 28 detects a direction of a straight-line pattern contained in the object image, taken from the original image of the object on the object plane by subjecting each object image to the Hough transform as shown in FIG. 33.

As indicated by FIG. 33(*a*) and (*b*), a sequence of points P1, P2 and P3 on the object image are projected onto the θ-ρ space. In the θ-ρ space, a corresponding line (L1, L2 or L3) for each point is represented by a combination of the angle θ of the point in the x-y coordinate system and the length ρ of a line segment between the origin "o" of the x-y coordinate system and the point. As shown in FIG. 33(*b*), the intersection point CP (θ,ρ) of the transformed lines is assumed, and the SLPD 28 of the present embodiment detects a direction of a straight-line pattern contained in the object image, taken from the original image of the object on the object plane by using the following formula.

$$\rho = x\cos\theta + y\cos\theta \quad (29)$$

In the present embodiment, based on the direction of the straight-line pattern detected by the SLPD 28, the IDC 22 automatically selects one of the plurality of object images (or the partially overlapping first and second images) as the standard image.

Figure 34:
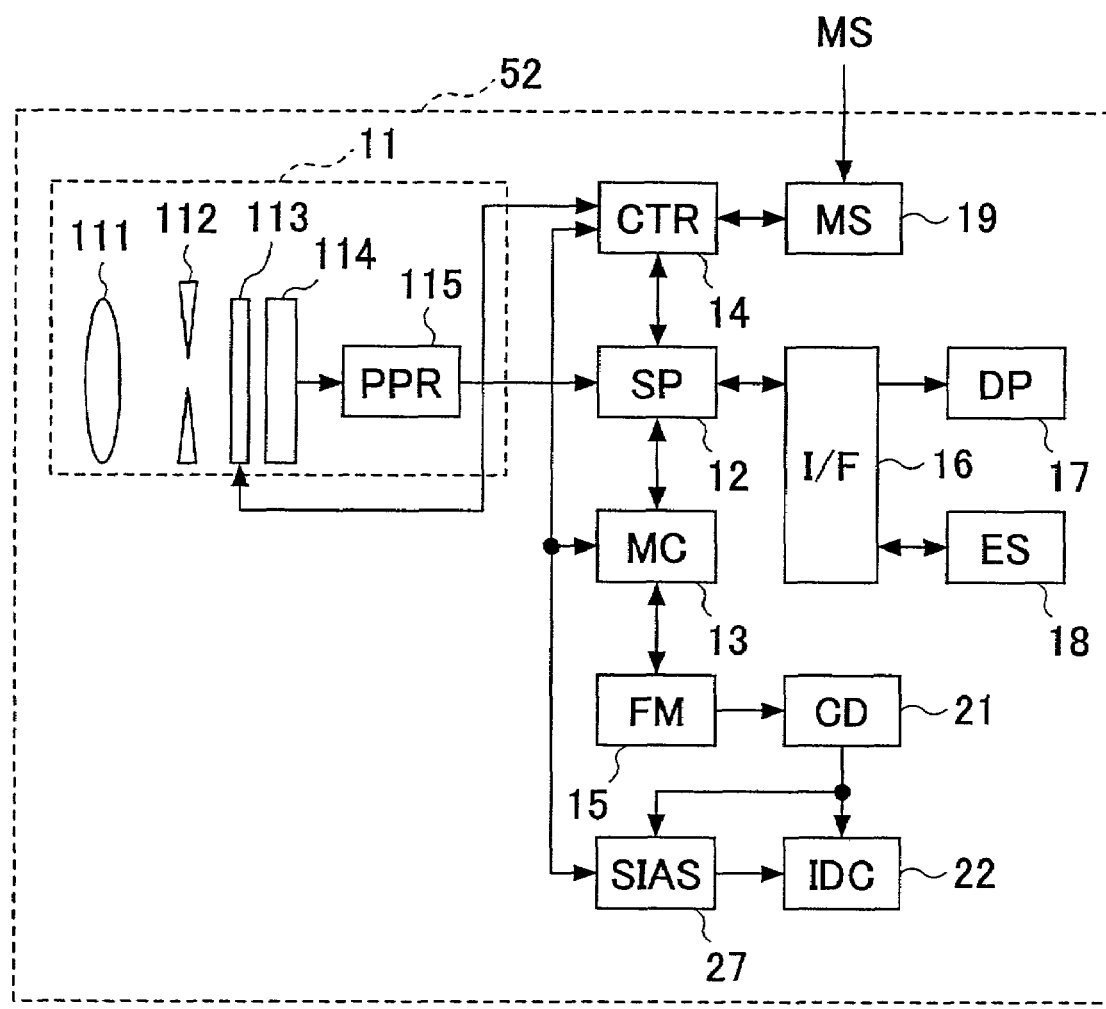
FIG. 34 is a block diagram of another variation of the fifth preferred embodiment of the image processing apparatus.

FIG. 34 is a block diagram of another variation of the fifth preferred embodiment of the image processing apparatus.

As shown in FIG. 34, the image processing apparatus 52 of the present embodiment is configured such that only the standard image automatic setting unit (SIAS) 27 is provided while the ORD 25 of FIG. 29 or the SLPD 28 of FIG. 32 is not provided, and the SIAS 27 is connected to the IDC 22.

In the present embodiment, the SIAS 27 is provided to automatically select one of the plurality of partially overlapping images as the standard image based on the feature point and the matched point determined by the CD 21, and it is possible to provide an improved operability for the user in performing the selection of the standard image from the plurality of partially overlapping images. The IDC 22 performs the coordinate transformation according to the above formula (25) so that the creation of a distortion-corrected image is performed.

Figure 35:
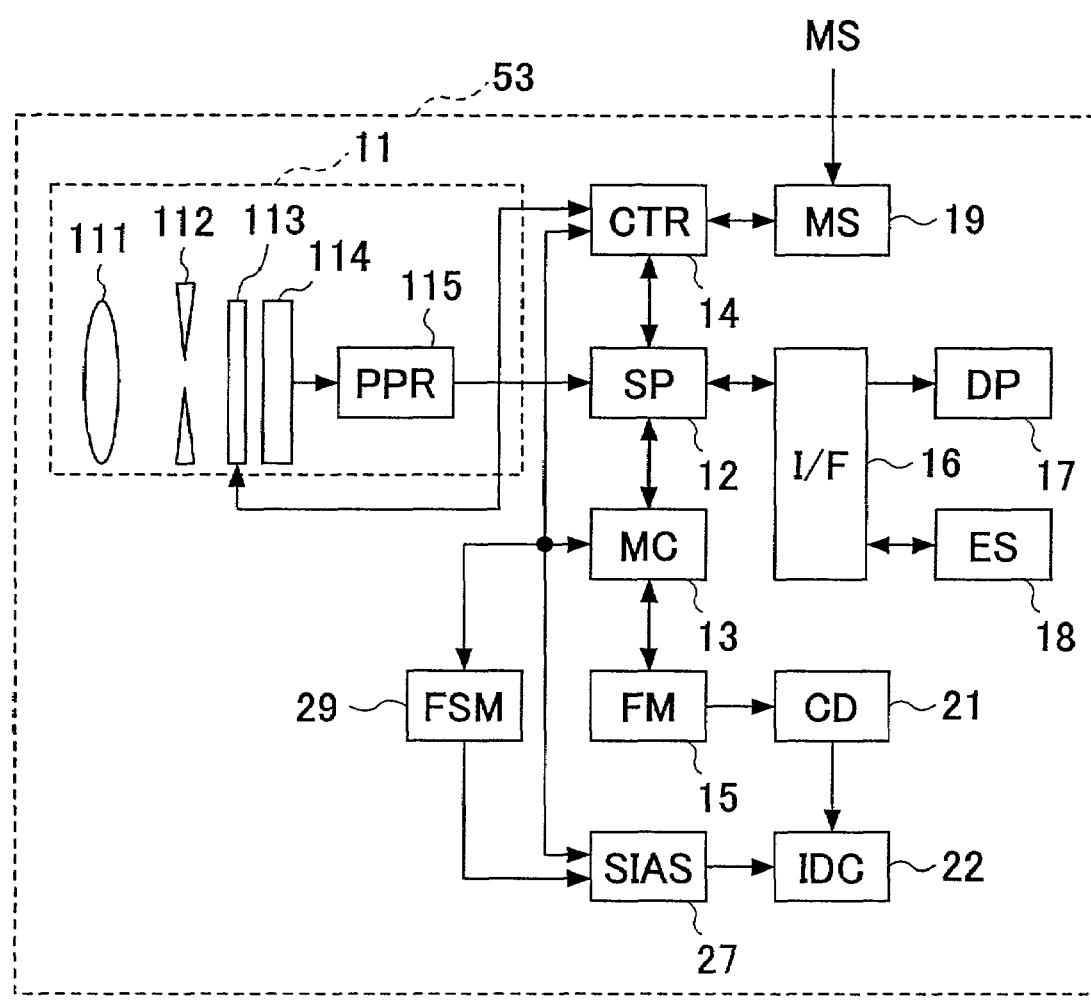
FIG. 35 is a block diagram of another variation of the fifth preferred embodiment of the image processing apparatus.

FIG. 35 is a block diagram of another variation of the fifth preferred embodiment of the image processing apparatus.

As shown in FIG. 35, the image processing apparatus 53 of the present embodiment is configured such that a flat-surface measuring unit (FSM) 29 is provided in addition to the SIAS 27 (which is provided instead of the ORD 25 of FIG. 29 or the SLPD 28 of FIG. 32), the FSM 29 is connected to the SIAS 27, and the SIAS 27 is connected to the IDC 22.

Figure 36:
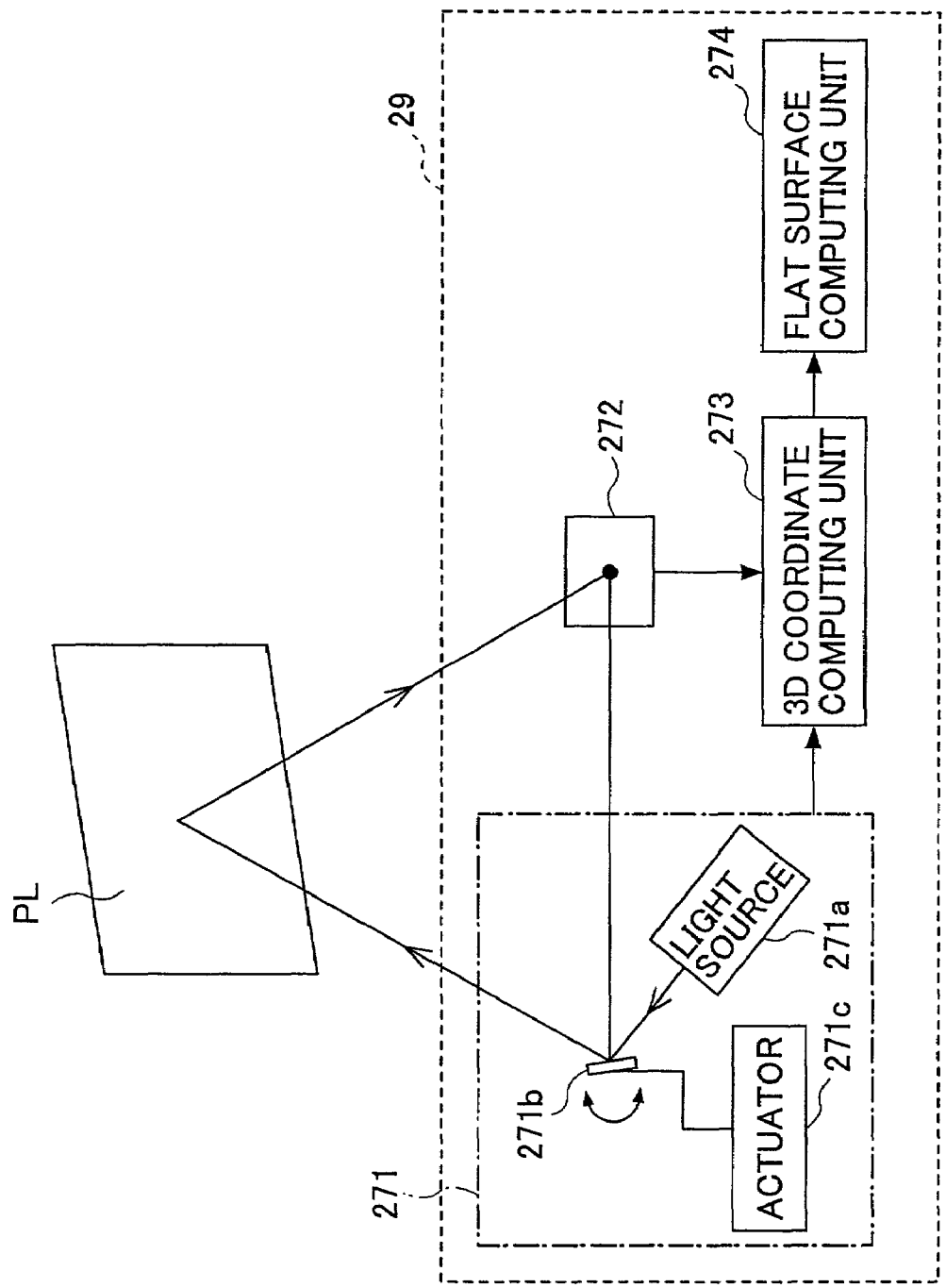
FIG. 36 is a block diagram of a flat surface measuring unit in the image processing apparatus of FIG. 35.

In the present embodiment, the FSM 29 measures a direction of the object plane when the imaging unit 11 takes the object image from the original image. FIG. 36 is a block diagram of the flat surface measuring unit (FSM) 29 in the image processing apparatus 53 of FIG. 35. As shown in FIG. 36, the FSM 29 generally includes a spot light source 271, a photodetector 272, a 3D coordinate computing unit 273, and a flat surface computing unit 274. The spot light source 271 includes a light source 271*a* (for example, a light emitting diode or a semiconductor laser), a scanning mirror 271*b* (for example, a polygonal mirror), and a scanning mirror actuator 271*c*.

As shown in FIG. 36, in the FSM 29 of the present embodiment, the light emitted by the light source 271*a* is reflected at the scanning mirror 271*b* to the object plane PL. The actuator 271*c* controls the direction of the scanning mirror 271*b* so that a light spot is formed on the object plane PL by the reflected light beam from the scanning mirror 271*b*. The photodetector 272 is provided at a given location relative to the spot light source 271, and the photodetector 272 is constituted by a position sensitive detector (PSD) or a charge-coupled device (CCD) arranged at the given location. A reflection light beam from the light spot on the object plane PL is received at the photodetector 272, and the photodetector 272 detects a direction of the reflection light beam received from the object plane PL.

Alternatively, the above-described photodetector 272 may be constituted by using the photoelectric conversion unit 114 of the imaging unit 11.

The 3D coordinate computing unit 273 calculates the 3D coordinates (X, Y, Z) of the object plane PL on the basis of the apparatus coordinate system of the image processing apparatus 53, based on the direction of the light beam emitted by the spot light source 271, the positional relationship of the spot light source 271 and the photodetector 272, and the detected direction of the reflection light beam obtained at the photodetector 272. The flat-surface computing unit 274 generates an estimated surface equation $$aX+bY+cZ+d=0 \ (a^2+b^2+c2=1, \ c>0) \quad (30)$$

based on the calculated 3D coordinates supplied by the 3D coordinate computing unit 273. The flat-surface computing unit 274 calculates the four parameters (a, b, c, d) of the surface equation by using the least square method. As a result of the calculation, the flat-surface computing unit 274 generates an inclination angle φ that corresponds to the direction of the object plane PL in accordance with the following formula $$\phi = \cos^{-1} c \quad (31)$$

In the image processing apparatus 53 of FIG. 35, the FSM 29 supplies the calculated direction of the object plane with respect to each of the plurality of partially overlapping images, to the SIAS 27. In the present embodiment, the SIAS 27 is provided to automatically select one of the plurality of partially overlapping images as the standard image that has the smallest inclination angle φ among the plurality of partially overlapping images, based on the measured direction of the object plane supplied by the FSM 29, and it is possible to provide an improved operability for the user in performing the selection of the standard image from the plurality of partially overlapping images.

Figure 37:
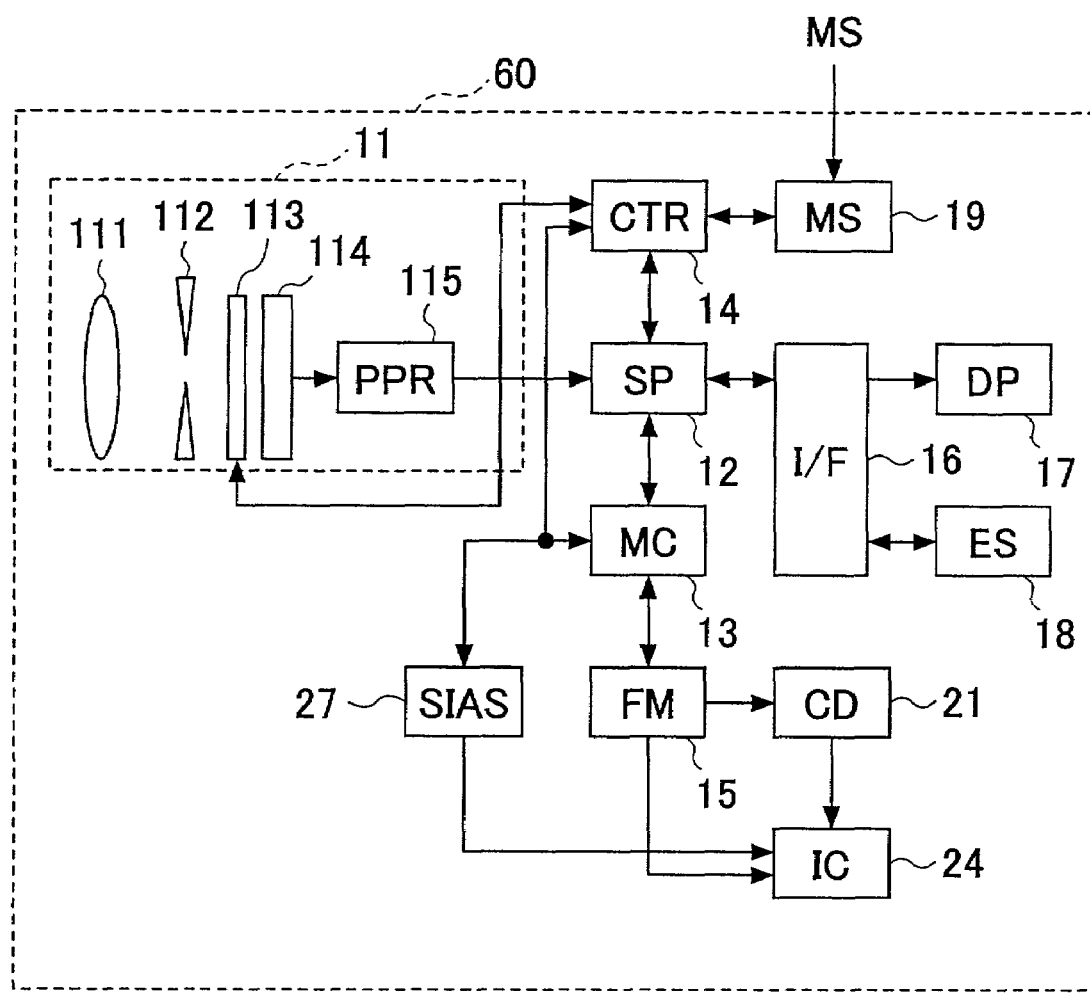
FIG. 37 is a block diagram of a sixth preferred embodiment of the image processing apparatus of the invention.

FIG. 37 is a block diagram of a sixth preferred embodiment of the image processing apparatus of the invention.

As shown in FIG. 37, the image processing apparatus 60 of the present embodiment is essentially the same as the image processing apparatus 6 of FIG. 19, except that the standard image automatic setting unit (SIAS) 27 is provided instead of the SIS 20 as in the previous embodiment of FIG. 19.

Figure 38:
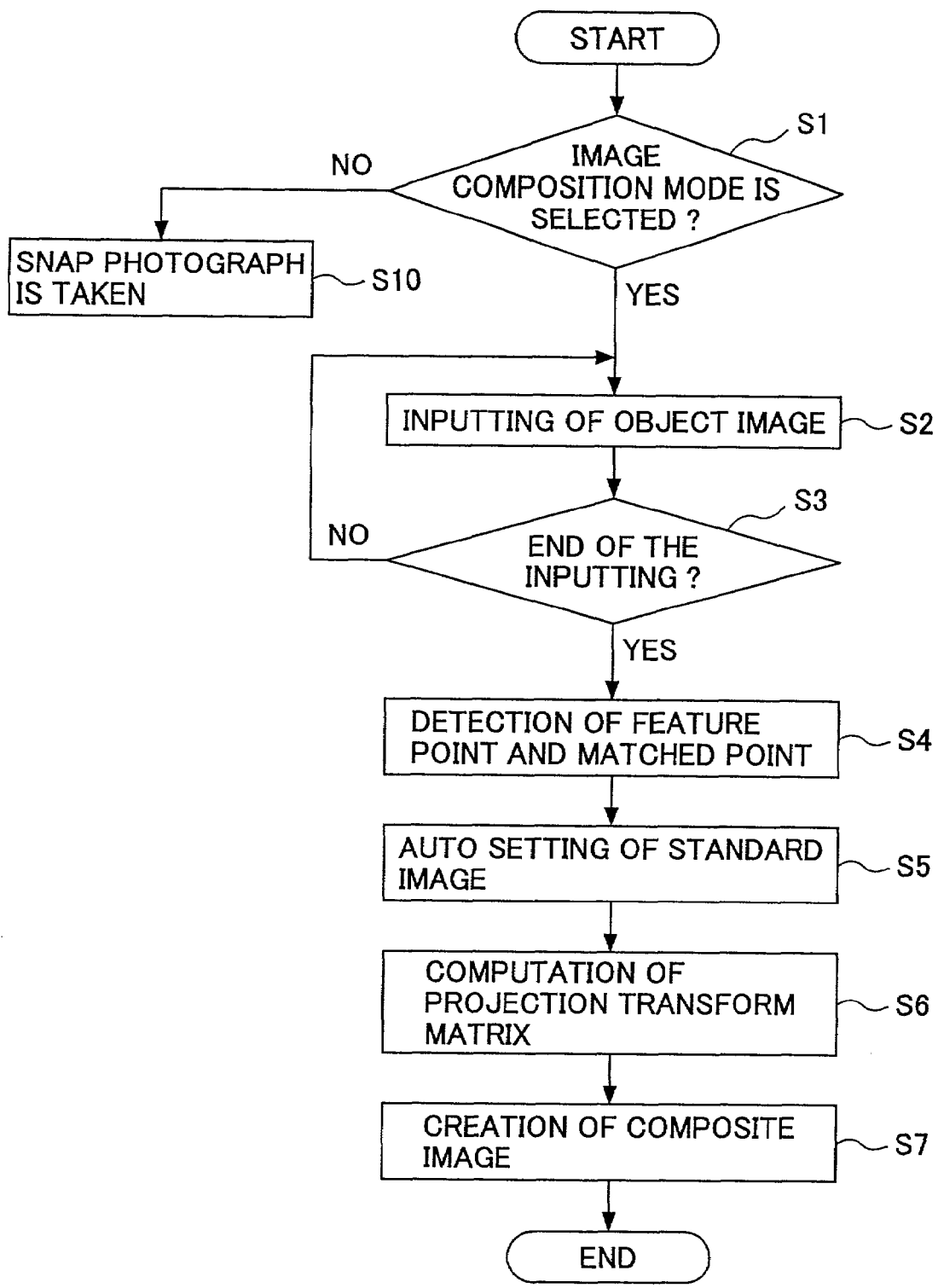
FIG. 38 is a flowchart for explaining operation of the image processing apparatus of the present embodiment.

FIG. 38 is a flowchart for explaining operation of the image processing apparatus 60 of the present embodiment. The image distortion correction processing performed by the image processing apparatus 60 of the present embodiment is essentially the same as the image distortion correction processing performed by the image processing apparatus 50 which is shown in FIG. 30, except that the step S6 performs the computation of the perspective projection transform matrix, and that the step S7 generates a composite image on the image surface of the standard image so as to correct the image distortions in the standard image.

In the present embodiment, the SIAS 27 is provided to automatically select one of the plurality of partially overlapping images as the standard image based on the feature point and the matched point determined by the CD 21, and the IC 24 performs the computation of the perspective projection transform matrix and the creation of the composite image.

Figure 39:
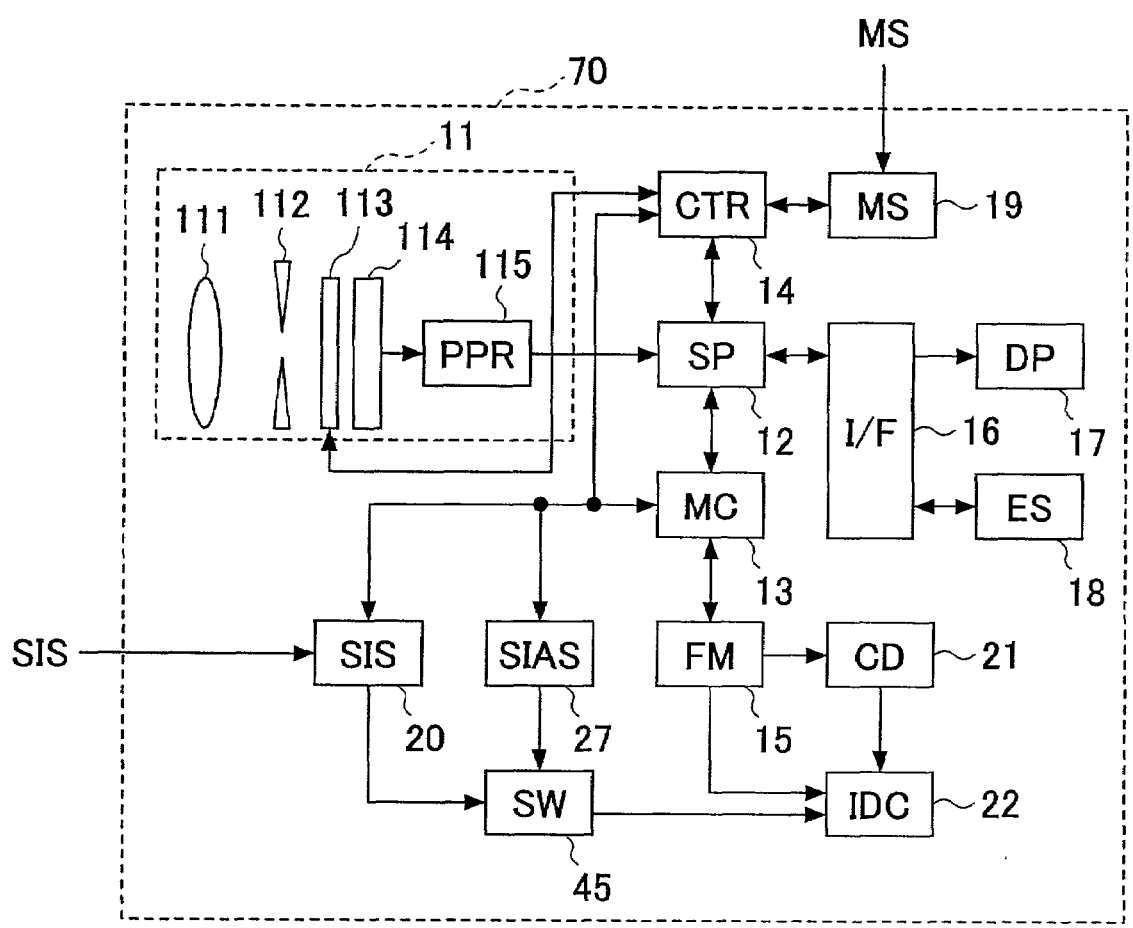
FIG. 39 is a block diagram of a seventh preferred embodiment of the image processing apparatus of the invention.

FIG. 39 is a block diagram of a seventh preferred embodiment of the image processing apparatus of the invention.

As shown in FIG. 39, the image processing apparatus 70 of the present embodiment is essentially the same as the image processing apparatus 1 of FIG. 3, except that the standard image automatic setting unit (SIAS) 27 and a switching unit (SW) 45 are additionally provided. The main control unit (CTR) 14 controls the SIAS 27. The SIS 20 and the SIAS 27 are connected to inputs of the SW 45, and an output of the SW 45 is connected to the IDC 22.

Figure 40:
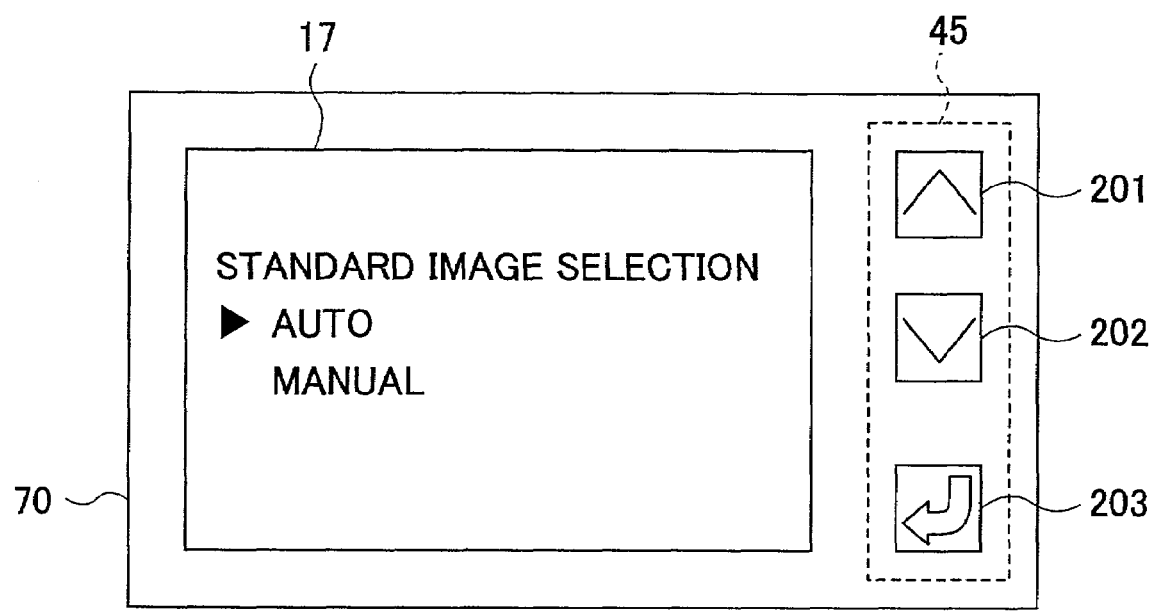
FIG. 40 is a diagram for explaining operation of a switching unit in the image processing apparatus of FIG. 39.

In the present embodiment, the SW 45 is provided to select one of the SIS 20 and the SIAS 27 for setting of the standard image among the plurality of partially overlapping images. FIG. 40 shows is a diagram for explaining operation of the switching unit 45 in the image processing apparatus 70 of FIG. 39. As shown in FIG. 40, the switching unit 45 is provided with the up scroll key 201, the down scroll key 202 and the enter key 203. When a menu key (not shown), which is indicated on the display unit 17, is turned ON by the user, the operational message "STANDARD IMAGE SELECTION" appears on the display unit 17 together with the two indicators "AUTO" and "MANUAL" for the user's choice for setting of the standard image setting method. By using the scroll key 201 or 202, the desired standard image setting method is selected from the two indicators "AUTO" and "MANUAL" by the user, and the enter key 203 is turned ON. Then, either the manual setting of the standard image by the SIS 20 or the automatic setting of the standard image by the SIAS 27 is activated by the switching unit 45 based on the user's selection, and the activated one is connected to the IDC 22 through the switching unit 45.

Figure 41:
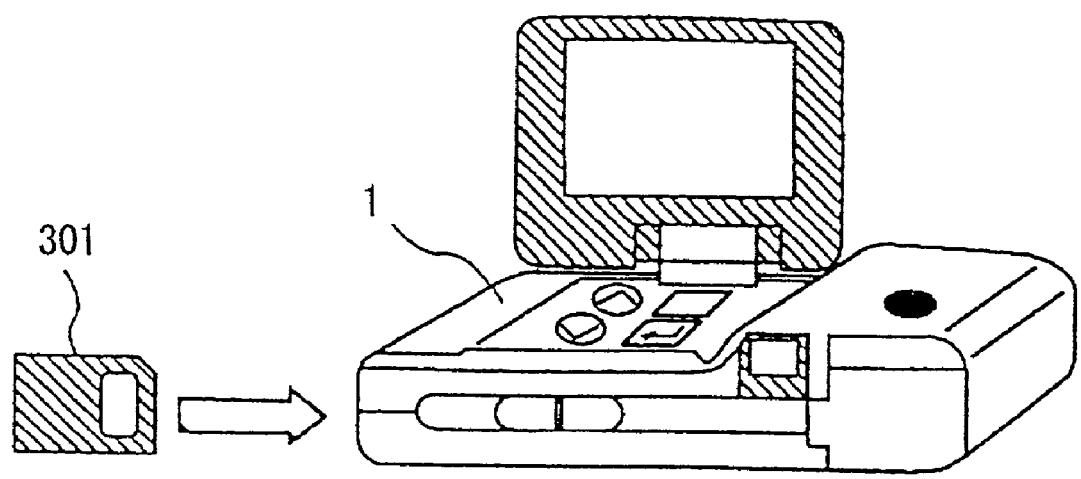
FIG. 41 is a diagram showing a computer-readable storage medium for use in the image processing apparatus of the invention.

FIG. 41 shows a computer-readable storage medium for use in the image processing apparatus of the invention. As shown in FIG. 41, a computer-readable storage medium 301, which stores the program code instructions for causing the main control unit 14 (or the computer) of the image processing apparatus 1 of the present invention, may be used with the image processing apparatus. The program code instructions, stored in the storage medium 301, are provided to execute the image distortion correcting processing of the invention. The program code instructions of the storage medium 301 are read by the main control unit 14, and they are loaded into the RAM of the main control unit 14. Then, the execution of the image distortion correcting processing is started by the main control unit 14.

Figure 42:
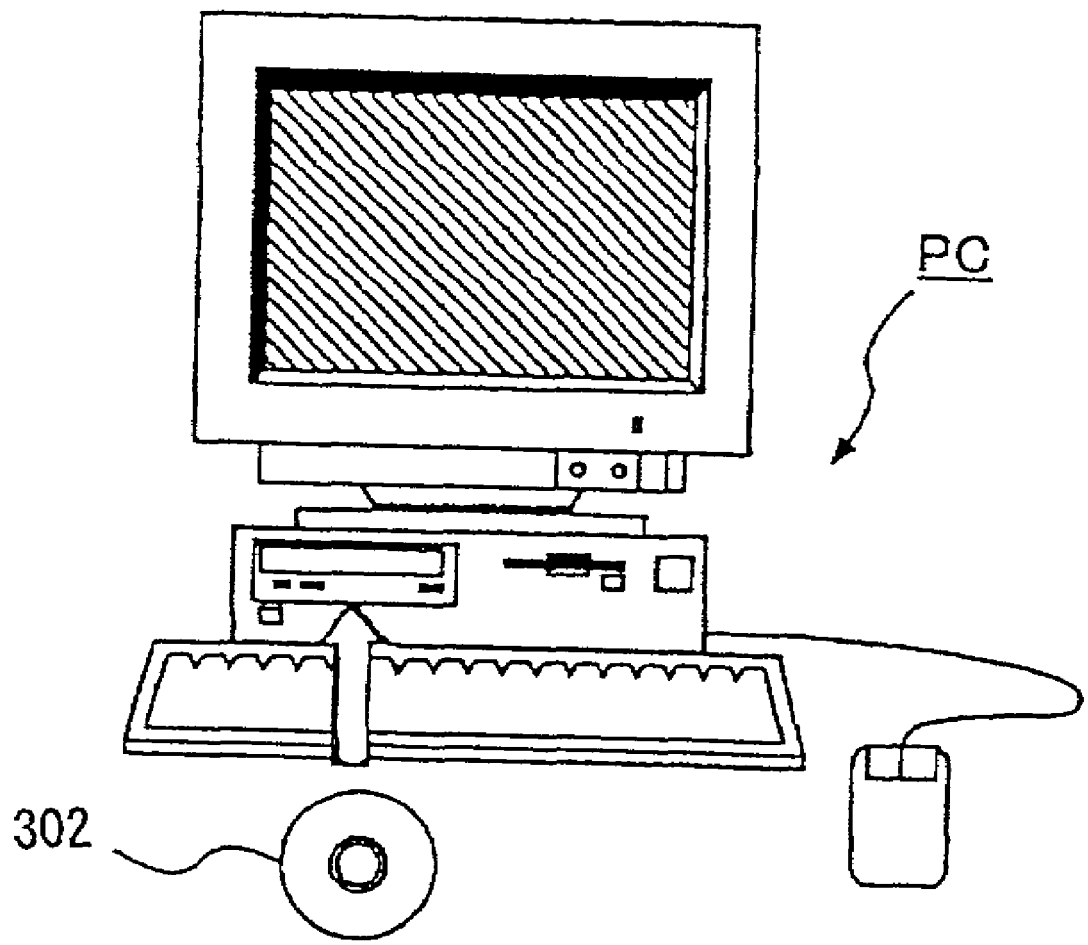
FIG. 42 is a diagram showing a computer-readable storage medium for use in a personal computer to which image processing method of the invention is applied.

FIG. 42 shows a computer-readable storage medium for use in a personal computer to which the image processing method of the invention is applied.

As shown in FIG. 34, the image processing method of the present invention is applied to a personal computer PC. The program code instructions for causing the CPU of the PC to execute the image distortion correction processing of the invention are stored in a computer-readable storage medium, which is, for example, a CD-ROM 302. The program code instructions of the CD-ROM 302 are read by the CPU of the personal computer PC by using a disk drive of the PC and the program code instructions are loaded into the RAM of the PC before a start of the execution of the image distortion correction processing. Then, the execution of the image distortion correction processing is started by the CPU of the personal computer PC.

Alternatively, the program code instructions, read from the CD-ROM 302, may be temporarily stored in a secondary storage (not shown) of the personal computer PC. At a start of the execution of the image distortion correction processing when the necessity occurs, the program code instructions are loaded into the RAM of the personal computer PC.

The image signals, which indicate the respective images of the object taken by the image processing apparatus 1, are transmitted to the image memory of the personal computer PC via a communication port, and the image signals are processed by the CPU of the personal PC. Alternatively, the image signals, which indicate the respective images of the object taken by the image processing apparatus 1, may be temporarily stored in a secondary recording medium, such as an IC memory. When the necessity occurs, the image signals, stored in the IC memory, are loaded into the image memory of the personal computer PC. The user on the image processing apparatus of the present invention sends a command to the CPU of the personal computer PC (or the program code instructions) by using an input device, such as a mouse or a keyboard, and receives a message from the CPU of the personal computer PC by using an output device, such as a display monitor or a printer.

It should be noted that the image processing method and apparatus of the invention may be implemented in any of several configurations. The imaging unit 11 and the image processing apparatus 1 may be incorporated into a digital still camera. Alternatively, the imaging unit 11 and a portion of the image processing apparatus 1 may be incorporated into a digital still camera, and the remaining portion of the image processing apparatus 1 may be incorporated as the program code instructions stored in a computer-readable storage medium. Alternatively, the imaging unit 11 may be incorporated into a digital still camera, and the image processing apparatus 1 may be incorporated as a personal computer connected to the digital still camera or connected to the IC memory.

Further, when the image processing apparatus is divided into a block that is incorporated into a digital still camera and a block that is incorporated into a separate image processing apparatus, an arbitrary one of various possible configurations of the image processing system, in which the image processing apparatus is divided into such blocks while the manufacturing cost and the purpose of the application are taken into consideration, can be chosen freely.

The present invention is not limited to the above-described embodiments, and variations and modifications may be made without departing from the scope of the present invention. For example, the respective elements of the image processing apparatus of the invention may be incorporated as the program code instructions stored in a portable computer readable medium, such as floppy disk or CD-RW, and, when the necessity occurs, the program code instructions may be loaded from the portable computer readable medium into the computer. Alternatively, the respective elements of the image processing apparatus of the invention may be incorporated as the program code instructions stored in an external storage of the computer, and when the necessity occurs, the program code instructions may be loaded from the external storage into the computer.

What is claimed is:

1. An image processing method for correcting image distortions, comprising the steps of:
  inputting a plurality of partially overlapping images of a tangible object on an object plane, the plurality of partially overlapping images sharing a common location of the tangible object and being created by capturing the tangible object on the tangible object plane from different directions to the tangible object plane;
  determining a feature point of one of the plurality of partially overlapping images corresponding to the common location of the tangible object, and determining a matched point of one of the other partially overlapping images corresponding to the feature point so that a direction of the tangible object plane is calculated based on the feature point and the matched point, the tangible object plane being defined by a spatial orientation of the tangible object;
  selecting one of the plurality of partially overlapping images as a standard image whose image distortions are to be corrected, the selection being based on one of (1) a direction of a straight-line pattern contained in each image, (2) the feature point and the matched point determined in the determining step, and (3) a calculated direction of the object plane for each of the partially overlapping images; and
  generating a distortion-corrected image on a projection plane by projecting the standard image onto the projection plane based on the direction of the tangible object plane such that image distortions in the standard image are eliminated.

2. The image processing method according to claim 1, wherein in said selecting step, one of the plurality of partially overlapping images is automatically selected as the standard image based on the direction of the straight-line pattern contained in each image.

3. The image processing method according to claim 1 wherein in said selecting step, one of the plurality of partially overlapping images is automatically selected as the standard image based on the feature point and the matched point determined by said determining step.

4. The image processing method according to claim 1, wherein in said selecting step, one of the plurality of partially overlapping images is automatically selected as the standard image based on the calculated direction of the object plane for each of the partially overlapping images.

5. The image processing method of claim 1, wherein said standard image is projected with a perspective projection matrix operation.

6. The image processing method of claim 5, wherein said perspective projection matrix is calculated based on coordinates of at least four combinations of feature points of the standard image and matched points corresponding thereto.

7. The image processing method according to claim 1, wherein the tangible object is an image on a planar object plane.

8. The image processing method according to claim 1, wherein the projection plane is parallel to the tangible object plane.

9. The image processing method according to claim 1, wherein the plurality of partially overlapping images are created by capturing the tangible object on the object plane using a same imaging unit.

10. The image processing method according to claim 1, wherein the plurality of partially overlapping images are created by capturing the tangible object on the object plane at different time instants using a same image unit.

11. The image processing method according to claim 1, wherein the plurality of partially overlapping images are created by moving a same imaging unit to capture the tangible object on the object plane from different directions to the tangible object plane.

12. An image processing method for correcting image distortions, comprising the steps of:
  inputting a plurality of partially overlapping images of a tangible object on an object plane, the plurality of partially overlapping images sharing a common location of the tangible object and being created by capturing the tangible object on the tangible object plane from different directions to the tangible object plane;
  determining a feature point of one of the plurality of partially overlapping images corresponding to the common location of the tangible object, and determining a matched point of one of the other partially overlapping images corresponding to the feature point of said one of the plurality of partially overlapping images so that a direction of the tangible object plane is calculated based on the feature point and the matched point, the tangible object plane being defined by a spatial orientation of the tangible object;
  selecting one of the plurality of partially overlapping images as a standard image that contains a smallest amount of image distortions among the plurality of partially overlapping images; and
  combining the other partially overlapping images, which are projected onto an image surface of the standard image with respect to each of the other partially overlapping images, so that a composite image is generated on the image surface so as to correct image distortions in the standard image.

13. The image processing method of claim 12, wherein said other partially overlapping images are projected with a perspective projection matrix operation.

14. The image processing method of claim 13, wherein a least-square-method is used to find parameters of said perspective projection matrix.

15. The image processing method according to claim 12 wherein the plurality of partially overlapping images are created by capturing the tangible object on the object plane using a same imaging unit.

16. The image processing method according to claim 12, wherein the plurality of partially overlapping images are created by capturing the tangible object on the object plane at different time instants using a same image unit.

17. The image processing method according to claim 12, wherein the plurality of partially overlapping images are created by moving a same imaging unit to capture the tangible object on the object plane from different directions to the tangible object plane.

18. An image processing apparatus for correcting image distortions, comprising:
  an input unit inputting a plurality of partially overlapping images of a tangible object on an object plane, the plurality of partially overlapping images sharing a common location of the tangible object and being created by capturing the tangible object on the tangible object plane from different directions to the tangible object plane;

a correspondence detecting unit determining a feature point of one of the plurality of partially overlapping images corresponding to the common location of the tangible object, and determining a matched point of one of the other partially overlapping images corresponding to the feature point of said one of the plurality of partially overlapping images so that a direction of the tangible object plane is calculated based on the feature point and the matched point, the tangible object plane being defined by a spatial orientation of the tangible object;

a standard image setting unit selecting one of the plurality of partially overlapping images as a standard image that contains a smallest amount of image distortions among the plurality of partially overlapping images; and an image composition unit combining the other partially overlapping images, which are projected onto an image surface of the standard image with respect to each of the other partially overlapping images, so that a composite image is generated on the image surface so as to correct image distortions in the standard image.

19. The image processing apparatus according to claim 18, wherein said standard image setting unit is configured such that a user is required to select the standard image when taking the original image from one of the oblique directions, and wherein said image processing apparatus further comprises a notification unit which notifies the user that the standard image is currently taken.

20. The image processing apparatus of claim 18, wherein said other partially overlapping images are projected with a perspective projection matrix operation.

21. The image processing apparatus of claim 18, wherein the plurality of partially overlapping images are created by capturing the tangible object on the object plane using a same imaging unit.

22. The image processing apparatus of claim 18, wherein the plurality of partially overlapping images are created by capturing the tangible object on the object plane at different time instants using a same image unit.

23. The image processing apparatus of claim 18, wherein the plurality of partially overlapping images are created by moving a same imaging unit to capture the tangible object on the object plane from different directions to the tangible object plane.

24. An image processing apparatus for correcting image distortions, comprising:

an input unit inputting a plurality of partially overlapping images of a tangible object on an object plane, the plurality of partially overlapping images sharing a common location of the tangible object and being created by capturing the tangible object on the tangible object plane from different directions to the tangible object plane;

a correspondence detecting unit determining a feature point of one of the plurality of partially overlapping images corresponding to the common location of the tangible object, and determining a matched point of one of the other partially overlapping images corresponding to the feature point so that a direction of the tangible object plane is calculated based on the feature point and the matched point, the tangible object plane being defined by a spatial orientation of the tangible object;

a standard image setting unit selecting one of the plurality of partially overlapping images as a standard image whose image distortions are to be corrected, the selection being based on one of (1) a direction of a straight-line pattern contained in each image, (2) the feature point and the matched point determined by the correspondence detecting unit, and (3) a calculated direction of the object plane for each of the partially overlapping images; and a distortion correcting unit generating a distortion-corrected image on a projection plane by projecting the standard image onto the projection plane based on the direction of the tangible object plane such that image distortions in the standard image are eliminated.

25. The image processing apparatus according to claim 24, further comprising a plurality of imaging units which respectively input the plurality of partially overlapping images that are generated by taking the tangible object from the oblique directions.

26. The image processing apparatus according to claim 24, wherein said standard image setting unit is configured such that one of the plurality of partially overlapping images is automatically selected as the standard image based on the direction of the straight-line pattern contained in each image.

27. The image processing apparatus according to claim 24, wherein said standard image setting unit is configured such that one of the plurality of partially overlapping images is automatically selected as the standard image based on the feature point and the matched point determined by said correspondence detecting unit.

28. The image processing apparatus according to claim 24, wherein said standard image setting unit is configured such that one of the plurality of partially overlapping images is automatically selected as the standard image based on the calculated direction of the object plane for each of the partially overlapping images.

29. The image processing apparatus of claim 24, wherein said standard image is projected with a perspective projection matrix operation.

30. The image processing apparatus of claim 24, wherein the plurality of partially overlapping images are created by capturing the tangible object on the object plane using a same imaging unit.

31. The image processing apparatus of claim 24, wherein the plurality of partially overlapping images are created by capturing the tangible object on the object plane at different time instants using a same image unit.

32. The image processing apparatus of claim 24, wherein the plurality of partially overlapping images are created by moving a same imaging unit to capture the tangible object on the object plane from different directions to the tangible object plane.

33. A computer-readable storage medium storing program code instructions for causing a computer to execute an image distortion correction processing to correct image distortions, comprising:

first program code means for causing the computer to input a plurality of partially overlapping images of a tangible object on an object plane, the plurality of partially overlapping images sharing a common location of the tangible object and being created by capturing the tangible object on the tangible object plane from different directions to the tangible object plane;

second program code means for causing the computer to determine a feature point of one of the plurality of partially overlapping images corresponding to the common location of the tangible object, and to determine a matched point of one of the other partially overlapping images corresponding to the feature point so that a direction of the tangible object plane is calculated based on the feature point and the matched point, the tangible object plane being defined by a spatial orientation of the tangible object;

third program code means for causing the computer to select one of the plurality of partially overlapping images as a standard image whose image distortions are to be corrected, the selection being based on one of (1) a direction of a straight-line pattern contained in each image, (2) the feature point and the matched point determined by the second program code means, and (3) a calculated direction of the object plane for each of the partially overlapping images; and fourth program code means for causing the computer to generate a distortion-corrected image on a projection plane by projecting the standard image onto the projection plane based on the direction of the tangible object plane such that image distortions in the standard image are eliminated.

34. The computer readable storage medium of claim 33, wherein said distortion-corrected image is generated with a perspective projection matrix operation.

35. The computer readable storage medium of claim 33, wherein the plurality of partially overlapping images are created by capturing the tangible object on the object plane using a same imaging unit.

36. The computer readable storage medium of claim 33, wherein the plurality of partially overlapping images are created by capturing the tangible object on the object plane at different time instants using a same image unit.

37. The computer readable storage medium of claim 33, wherein the plurality of partially overlapping images are created by moving a same imaging unit to capture the tangible object on the object plane from different directions to the tangible object plane.

38. A computer-readable storage medium storing program code instructions for causing a computer to execute an image distortion correction processing to correct image distortions, comprising:

first program code means for causing the computer to input a plurality of partially overlapping images of a tangible object on an object plane, the plurality of partially overlapping images sharing a common location of the tangible object and being created by capturing the tangible object on the tangible object plane from different directions to the tangible object plane;

second program code means for causing the computer to determine a feature point of one of the plurality of partially overlapping images corresponding to the common location of the tangible object, and to determine a matched point of one of the other partially overlapping images corresponding to the feature point of said one of the plurality of partially overlapping images so that a direction of the tangible object plane is calculated based on the feature point and the matched point, the tangible object plane being defined by a spatial orientation of the tangible object;

third program code means for causing the computer to select one of the plurality of partially overlapping images as a standard image that contains a smallest amount of image distortions among the plurality of partially overlapping images; and fourth program code means for causing the computer to combine the other partially overlapping images, which are projected onto an image surface of the standard image with respect to each of the other partially overlapping images, so that a composite image is generated on the image surface so as to correct image distortions in the standard image.

39. The computer readable storage medium of claim 38, wherein said other partially overlapping images are projected with a perspective projection matrix operation.

40. The computer readable storage medium of claim 38, wherein the plurality of partially overlapping images are created by capturing the tangible object on the object plane using a same imaging unit.

41. The computer readable storage medium of claim 38, wherein the plurality of partially overlapping images are created by capturing the tangible object on the object plane at different time instants using a same image unit.

42. The computer readable storage medium of claim 38, wherein the plurality of partially overlapping images are created by moving a same imaging unit to capture the tangible object on the object plane from different directions to the tangible object plane.

* * * * *